US008283281B2

(12) United States Patent
Ohmura et al.

(10) Patent No.: US 8,283,281 B2
(45) Date of Patent: Oct. 9, 2012

(54) CATALYST FOR PURIFICATION OF AUTOMOBILE EXHAUST GAS AND METHOD FOR MANUFACTURING THE SAME

(75) Inventors: Tetsushi Ohmura, Nisshin (JP); Akihiko Suda, Seto (JP); Yoshihide Watanabe, Kiyosu (JP)

(73) Assignee: Kabushiki Kaisha Toyota Chuo Kenkyusho, Aichi-Gun (JP)

( * ) Notice: Subject to any disclaimer, the term of this patent is extended or adjusted under 35 U.S.C. 154(b) by 4 days.

(21) Appl. No.: 12/801,836

(22) Filed: Jun. 28, 2010

(65) Prior Publication Data

US 2011/0245075 A1 Oct. 6, 2011

(30) Foreign Application Priority Data

Jun. 30, 2009 (JP) ................................. 2009-155604
Sep. 18, 2009 (JP) ................................. 2009-217451

(51) Int. Cl.
B01J 23/00 (2006.01)
B01J 21/00 (2006.01)

(52) U.S. Cl. ........ 502/326; 502/258; 502/261; 502/327; 502/355; 502/415; 502/439

(58) Field of Classification Search .................. 502/258, 502/261, 326, 327, 355, 415, 439
See application file for complete search history.

(56) References Cited

U.S. PATENT DOCUMENTS

| 3,953,368 | A | * | 4/1976 | Sinfelt | 502/223 |
| 4,201,714 | A | * | 5/1980 | Hughes | 549/206 |
| 4,201,728 | A | * | 5/1980 | Hughes | 568/454 |
| 5,149,854 | A | * | 9/1992 | Nappier | 556/49 |
| 5,945,369 | A | * | 8/1999 | Kimura et al. | 502/304 |
| 6,673,739 | B2 | * | 1/2004 | Yamazaki et al. | 502/216 |
| 7,169,735 | B2 | * | 1/2007 | Sagae | 502/326 |
| 7,200,591 | B2 | * | 4/2007 | Silverbrook et al. | 1/1 |
| 7,582,586 | B2 | * | 9/2009 | Fanson et al. | 502/185 |
| 7,655,137 | B2 | * | 2/2010 | Zhou et al. | 208/134 |
| 7,713,907 | B2 | * | 5/2010 | Elam et al. | 502/263 |
| 7,820,585 | B2 | * | 10/2010 | Hirata | 502/261 |
| 2002/0081243 | A1 | * | 6/2002 | He | 422/177 |
| 2003/0083528 | A1 | * | 5/2003 | Bohnen et al. | 568/451 |

(Continued)

FOREIGN PATENT DOCUMENTS

EP 2 140 940 A2 1/2010

(Continued)

OTHER PUBLICATIONS

Yao et al., "Infrared spectra of chemisorbed CO on Rh/γ-Al₂O₃: Site distributions and molecular mobility," *J. Chem. Phys.*, vol. 68, No. 11, Jun. 1, 1978, pp. 4774-4780.

(Continued)

*Primary Examiner* — Cam N. Nguyen

(74) *Attorney, Agent, or Firm* — Oliff & Berridge, PLC

(57) ABSTRACT

A catalyst for purification of automobile exhaust gas comprising: a support and rhodium supported on the support in an atomic state, wherein an amount of the rhodium supported is 0.05 to 0.30% by mass relative to the total amount of the support and the rhodium, 50 at. % or more of the rhodium is supported on the support as two-atom clusters of rhodium, and an average distance between adjacent ones of the two-atom clusters is 1.0 nm or more.

16 Claims, 28 Drawing Sheets

U.S. PATENT DOCUMENTS

2003/0171623 A1* 9/2003 Puckette et al. ............... 568/454
2007/0207920 A1  9/2007 Hirata et al.
2009/0247397 A1  10/2009 Mashima et al.

FOREIGN PATENT DOCUMENTS

| JP | 2006-055807 | 3/2006 |
| JP | 2007-222806 | 9/2007 |
| JP | 2007-229642 | 9/2007 |
| JP | 2007-230924 | 9/2007 |
| JP | 2008-013533 | 1/2008 |
| JP | 2009-226341 | 10/2009 |
| JP | 2009-255064 | 11/2009 |
| JP | 2010-005529 | 1/2010 |
| JP | 2010-005531 | 1/2010 |

OTHER PUBLICATIONS

Worley et al., "The effect of rhodium precursor on $Rh/Al_2O_3$ catalysts," *J. Chem. Phys.*, vol. 76, No. 1, Jan. 1, 1982, pp. 20-25.

Bando et al., "Surface Structures and Catalytic Hydroformylation Activities of Rh Dimers Attached on Various Inorganic Oxide Supports," *J. Phys. Chem.*, vol. 100, No. 32, 1996, pp. 13636-13645.

* cited by examiner

F i g . 1 2
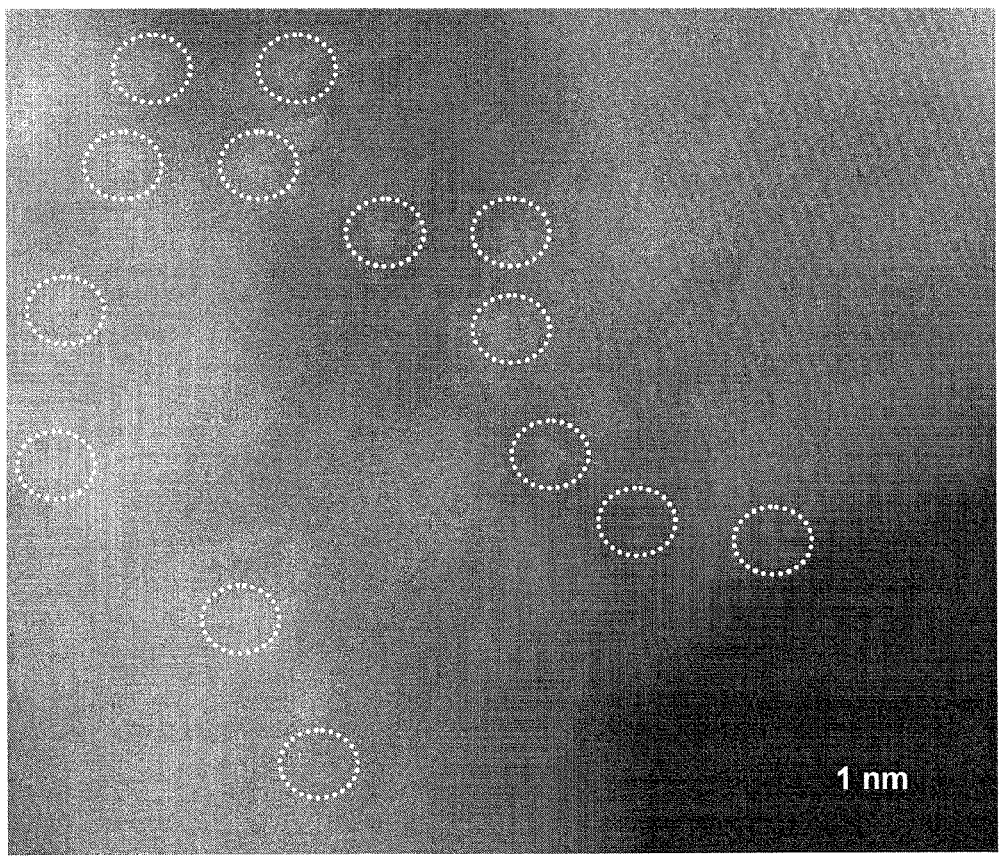

CATALYST FOR PURIFICATION OF AUTOMOBILE EXHAUST GAS AND METHOD FOR MANUFACTURING THE SAME

BACKGROUND OF THE INVENTION

1. Field of the Invention

The present invention relates to a catalyst for purification of automobile exhaust gas, and a method for manufacturing the same.

2. Related Background Art

Various catalysts have so far been used to sufficiently purify components such as carbon monoxide (CO), hydrocarbon (HC), and nitrogen oxide (NOx) contained in exhaust gas emitted from an internal combustion engine of an automobile. As such a catalyst for purification of automobile exhaust gas, a catalyst is known in which a noble metal such as platinum (Pt) or rhodium (Rh) is supported on a support made of $\gamma\text{-}Al_2O_3$ or the like, for example. Meanwhile, as a method for manufacturing such a catalyst for purification of automobile exhaust gas, a method has generally been employed with which a noble metal is supported on a support by supporting a solution containing a salt of the noble metal on the support and calcining those. In addition, studies on various methods for manufacturing a catalyst for purification of automobile exhaust gas have been conducted in recent years to obtain a catalyst having a higher catalytic activity.

For example, Japanese Unexamined Patent Application Publication No. 2006-55807 (Document 1) discloses a method for manufacturing a catalyst. In this method, a catalyst having noble metal clusters supported therein is obtained by depositing a polynuclear complex comprising a plurality of organic polydentate ligands and a plurality of noble metal atoms on an oxide support, and then removing the organic polydentate ligands. Meanwhile, Japanese Unexamined Patent Application Publication No. 2007-222806 (Document 2) discloses a method for manufacturing a noble metal catalyst. This method involves the formation of a gelled product by introducing a platinum complex such as platinum acetylacetonate or dinitro diamine platinum into an aqueous solution of boehmite. However, it is not necessarily possible to obtain a catalyst having a sufficient catalytic activity by the methods for manufacturing a catalyst described in Documents 1 and 2.

In addition, Japanese Unexamined Patent Application Publication No. 2008-13533 (Document 3) discloses a method for obtaining a catalyst by supporting the multiple-complex-containing compound on the porous support by means of impregnating. The method described in Document 3 can be implemented when Pt is used as the nuclear (metal) in the complex. When, however, Rh is used as the nuclear (metal) of the complex, multiple-complex-containing compound itself cannot be manufactured under the manufacturing conditions described in the Document. Accordingly, a catalyst having Rh supported therein cannot be manufactured on the basis of the method for obtaining a catalyst described Document 3.

In addition, Japanese Unexamined Patent Application Publication No. 2007-230924 (Document 4) describes a method for obtaining a catalyst. In this method, the catalyst is obtained by impregnating a support with a solution containing a metal complex, and calcining after drying those. In the metal complex, ligands are coordinated to one metal atom or a plurality of metal atoms of the same kind, and at least one of the ligands has a carboxyl group that is not coordinated to the metal atom or the like (for example, a dicarboxylic acid ligand). The method described in Document 4 can be implemented when Pt is used as the metal atom. When, however, Rh is used as the metal atom, the metal complex itself cannot be manufactured under manufacturing conditions described in the Document. Accordingly, a catalyst having Rh supported therein cannot be manufactured on the basis of the method for obtaining a catalyst described in Document 4.

Moreover, Japanese Unexamined Patent Application Publication No. 2007-229642 (Document 5) describes a method for obtaining a catalyst by impregnating a support, to which a compound having a coordinatable functional group is bonded, with a solution that contains a metal complex, and by calcining after drying those. However, in the method described in Document 5, when a rhodium carboxylate such as $[Rh_2(CH_3COO_2)_4]$ or $[Rh_2(C_6H_5COO_2)_4]$, which is a metal complex described in Document 5, is used, not only rhodium cannot be supported sufficiently, but also a catalyst having a sufficient catalytic function cannot necessarily be obtained.

SUMMARY OF THE INVENTION

The present invention has been made in consideration of the above-mentioned problems of the conventional techniques. An object of the present invention is to provide a catalyst for purification of automobile exhaust gas having rhodium in an atomic state supported in a sufficiently highly dispersed state, and having a sufficiently high catalytic activity, and also to provide a method for manufacturing a catalyst for purification of automobile exhaust gas capable of manufacturing the aforementioned catalyst efficiently and reliably.

The present inventors have devoted themselves to keen studies for achieving the above object. As a result, the present inventors have found the following fact. Specifically, when rhodium is supported on a support, at least one kind of rhodium carboxylates (rhodium carboxylate complexes) represented by the following general formulae (1) to (4):

$$Rh_2(R\text{—}CO_2)_4 \qquad (1)$$

[in formula (1), R represents one kind selected from the group consisting of hydrocarbon groups having a carbon number of 4 to 20],

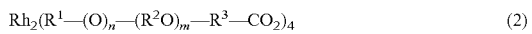

$$Rh_2(R^1\text{—}(O)_n\text{—}(R^2O)_m\text{—}R^3\text{—}CO_2)_4 \qquad (2)$$

[in formula (2), $R^1$ represents one kind selected from the group consisting of hydrocarbon groups, which may have a hydroxy group in a side chain thereof, having a carbon number of 4 to 20, $R^2$ represents one kind selected from the group consisting of hydrocarbon groups having a carbon number of 1 to 3, $R^3$ represents one kind selected from the group consisting of hydrocarbon groups having a carbon number of 1 to 20, n represents any integer of 0 and 1, m represents any integer of 0 to 6, and the sum of n and m satisfies a condition of being 1 or greater],

$$Rh_2(R^4\text{—}(C(R^5)(X))_l\text{—}CO_2)_4 \qquad (3)$$

[in formula (3), $R^4$ and $R^5$ may be the same or different, and each represent one kind selected from the group consisting of a hydrogen atom and hydrocarbon groups having a carbon number of 1 to 3, X represents one kind selected from the group consisting of a OH group, an $NH_2$ group, and a $NO_2$ group, and l represents any integer of 1 to 5],

$$Rh_2(Z\text{—}CO_2)_4 \qquad (4)$$

[in formula (4), Z represents a benzo-crown ether group represented by the following general formula (5):

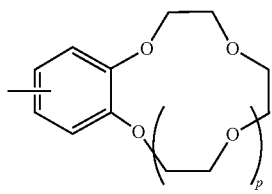

(in formula (5), p represents any integer of 1 to 3)] is used. Thereby, the ratio of rhodium supported on the support as two-atom clusters becomes sufficient, and the average distance between adjacent ones of the two-atom clusters becomes 1.0 nm or more (more preferably 1.5 nm or more). Accordingly, rhodium in an atomic state is supported on the support in a sufficiently highly dispersed state. As a result, a catalyst for purification of automobile exhaust gas having a sufficiently high catalytic activity can be obtained. Thus, the present inventors come to complete the present invention.

Specifically, the catalyst for purification of automobile exhaust gas of the present invention is a catalyst for purification of automobile exhaust gas comprising:

a support; and rhodium supported on the support in an atomic state, wherein an amount of the rhodium supported is 0.05 to 0.30% by mass relative to the total amount of the support and the rhodium, 50 at. % or more of the rhodium is supported on the support as two-atom clusters of rhodium, and an average distance between adjacent ones of the two-atom clusters is 1.0 nm or more.

In the catalyst for purification of automobile exhaust gas of the present invention, the average distance between adjacent ones of the two-atom clusters is preferably 1.5 nm or more.

In addition, in the catalyst for purification of automobile exhaust gas of the present invention, a first dispersion of rhodium which is determined on the basis of a first amount of CO adsorbed and the amount of the rhodium supported is preferably 40 to 80%, the first amount of CO adsorbed being measured by a CO-pulse measurement method under a temperature condition of 50° C.

Moreover, in the catalyst for purification of automobile exhaust gas of the present invention, a second dispersion of rhodium which is determined on the basis of a second amount of CO adsorbed and the amount of the rhodium supported is preferably 20 to 50%, the second amount of CO adsorbed being measured by a low-temperature CO pulse measurement method under a temperature condition of −78° C.

In addition, the rhodium according to the present invention is preferably supported on the support in an atomic state by using at least one kind of rhodium carboxylates represented by the following general formulae (1) to (4):

[in formula (1), R represents one kind selected from the group consisting of hydrocarbon groups having a carbon number of 4 to 20],

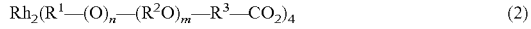

[in formula (2), $R^1$ represents one kind selected from the group consisting of hydrocarbon groups, which may have a hydroxy group in a side chain thereof, having a carbon number of 4 to 20, $R^2$ represents one kind selected from the group consisting of hydrocarbon groups having a carbon number of 1 to 3, $R^3$ represents one kind selected from the group consisting of hydrocarbon groups having a carbon number of 1 to 20, n represents any integer of 0 and 1, m represents any integer of 0 to 6, and the sum of n and m satisfies a condition of being 1 or greater],

[in formula (3), $R^4$ and $R^5$ may be the same or different, and each represent one kind selected from the group consisting of a hydrogen atom and hydrocarbon groups having a carbon number of 1 to 3, X represents one kind selected from the group consisting of a OH group, an $NH_2$ group, and a $NO_2$ group, and l represents any integer of 1 to 5], and

[in formula (4), Z represents a benzo-crown ether group represented by the following general formula (5):

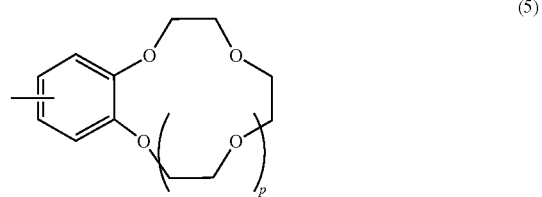

(in formula (5), p represents any integer of 1 to 3)].

Meanwhile, a method for manufacturing a catalyst for purification of automobile exhaust gas of the present invention is a method comprising:

bringing a rhodium-containing liquid into contact with a support, the rhodium-containing liquid containing at least one kind of rhodium carboxylates represented by the following general formulae (1) to (4):

[in formula (1), R represents one kind selected from the group consisting of hydrocarbon groups having a carbon number of 4 to 20],

[in formula (2), $R^1$ represents one kind selected from the group consisting of hydrocarbon groups, which may have a hydroxy group in a side chain thereof, having a carbon number of 4 to 20, $R^2$ represents one kind selected from the group consisting of hydrocarbon groups having a carbon number of 1 to 3, $R^3$ represents one kind selected from the group consisting of hydrocarbon groups having a carbon number of 1 to 20, n represents any integer of 0 and 1, m represents any integer of 0 to 6, and the sum of n and m satisfies a condition of being 1 or greater],

[in formula (3), $R^4$ and $R^5$ may be the same or different, and each represent one kind selected from the group consisting of a hydrogen atom and hydrocarbon groups having a carbon number of 1 to 3, X represents one kind selected from the group consisting of a OH group, an $NH_2$ group, and a $NO_2$ group, and l represents any integer of 1 to 5], and

[in formula (4), Z represents a benzo-crown ether group represented by the following general formula (5):

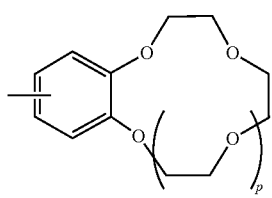

(5)

(in formula (5), p represents any integer of 1 to 3), thereby an unsaturated coordination site of the rhodium carboxylate being allowed to be directly bonded to a hydroxy group and/or an oxygen atom on the support, and the rhodium carboxylate being supported on the support; and performing calcination, thereby a catalyst for purification of automobile exhaust gas being obtained.

Preferably, in the method for manufacturing a catalyst for purification of automobile exhaust gas of the present invention, the rhodium carboxylate is at least one kind of the rhodium carboxylates represented by general formulae (2) to (4), and a water-based solvent is used as a solvent of the rhodium-containing liquid.

Preferably, in the method for manufacturing a catalyst for purification of automobile exhaust gas of the present invention, a catalyst for purification of automobile exhaust gas to be obtained comprises the support, and rhodium supported on the support in an atomic state, an amount of the rhodium supported is 0.05 to 0.30% by mass relative to the total amount of the support and the rhodium, 50 at. % or more of the rhodium is supported on the support as two-atom clusters of rhodium, and an average distance between adjacent ones of the two-atom clusters is 1.0 nm (more preferably 1.5 nm) or more. In addition, the catalyst to be obtained by such a method for manufacturing a catalyst for purification of automobile exhaust gas is more preferably a catalyst in which a first dispersion of rhodium which is determined on the basis of a first amount of CO adsorbed and the amount of the rhodium supported is 40 to 80%, the first amount of CO adsorbed being measured by a CO-pulse measurement method under a temperature condition of 50° C., and also more preferably a catalyst in which a second dispersion of rhodium which is determined on the basis of a second amount of CO adsorbed and the amount of the rhodium supported is 20 to 50%, the second amount of CO adsorbed being measured by a low-temperature CO pulse measurement method under a temperature condition of −78° C. As described above, the method for manufacturing a catalyst for purification of automobile exhaust gas of the present invention is a method suitably employable as a method for manufacturing the above-described catalyst for purification of automobile exhaust gas of the present invention.

Note that it is not known exactly why the above-mentioned object is achieved by the catalyst for purification of automobile exhaust gas and the manufacturing method thereof of the present invention. However, the present inventors assume as follows. Specifically, in the method for manufacturing a catalyst for purification of automobile exhaust gas of the present invention, first, rhodium is supported on the support by using at least one kind selected from the rhodium carboxylates represented by general formulae (1) to (4). In conventional methods for manufacturing a catalyst, rhodium chloride or the like has been used for supporting rhodium. Such rhodium chloride or the like forms weak electrostatic bonding with a support, and thereby is supported on the support. In contrast, the above-mentioned rhodium carboxylate represented by the general formula (1) and used in the present invention has unsaturated coordination sites at axial positions thereof, and hence forms coordination bonds with hydroxy groups (or oxygen atoms) on the support, thereby being selectively adsorbed and supported onto the support in a sufficiently stabilized state.

For describing the state of such a complex supported on the support, $Rh_2(C_5H_{11}COO)_4$ is taken as an preferred example of the rhodium carboxylates represented by general formulae (1) to (4) according to the present invention. FIG. 1 schematically shows a state where such a complex is supported on a support. Meanwhile, $Rh_2(HO-CH_2-CH(OH)-COO)_4$ is taken as another preferred example of the rhodium carboxylates. FIG. 2 schematically shows a state where such a complex is supported on a support. In the present invention, when the rhodium carboxylate (the rhodium carboxylate complex) is supported on a support, first, a coordination bond is formed between a hydroxy group (or an oxygen atom) on the support and an unsaturated coordination site at an axial position in the complex as shown in FIGS. 1 and 2. When the coordination bond is formed as described above, the strong bonding force thereof causes the rhodium carboxylate to be supported on the support in a state excellent in stability. In addition, when the rhodium carboxylate is supported on the support as described above, nuclei in the complexes are arranged on the support in a state of being separated form each other owing to the presence of the ligands. Accordingly, as shown in each of FIGS. 3 and 4, a state is formed where the nuclei of the complexes are dispersedly arranged on a surface of the support like islands. Moreover, in a case where several water molecules are present between islands as shown in FIG. 4 when the rhodium carboxylate is supported on the support, due to the presence of the water molecules, the complexes are arranged on the support in a state of being separated from each other by a distance greater than the length of the ligands. Accordingly, it is assumed that when the rhodium carboxylate is supported on the support, nuclei of the rhodium carboxylates are supported on the support in a state of being separated from each other by a sufficient distance which depends on the molecular size of the complex (average radius of circumcircles of the molecules).

Note that, in FIG. 3, the molecular size (an average radius of circumcircles of the molecules) of $Rh_2(C_5H_{11}COO)_4$ is 0.9 nm. Accordingly, the distance between the nuclei in the rhodium carboxylates supported on the support is expected to be approximately 2 nm, in accordance with the molecular size. Meanwhile, in FIG. 4, the molecular size of $Rh_2(HO-CH_2-CH(OH)-COO)_4$ (an average radius of circumcircles of the molecules) is approximately 0.8 nm. The distance between the nuclei of the molecules of a rhodium carboxylates supported on the support depends on the molecular size thereof. In a case of rhodium glycerate, which is an example, (refer to the diagram shown in FIG. 4 where the van der Waals radii of the molecules of the complex are taken into consideration), the distance between nuclei of complex molecules adjacent to each other is expected to be approximately 1.6 nm on average.

Note that when $Rh_2(HO-CH_2-CH(OH)-COO)_4$ is taken as an example, the "molecular radius of the rhodium carboxylate" herein can be a molecular radius lr estimated from a circumcircle of a molecule, in consideration of a model of molecular structure as shown in FIG. 5 (here, lr is defined on the basis of a circle in the xy plane where the Rh—Rh axis is taken as the z axis). When the model of the molecular structure as shown in FIG. 5 is taken into consideration, the molecular radius lr can be found by performing a structure optimization in a gas phase on a structure of $Rh_2(HO-CH_2-CH(OH)-COO)_4$ (a structure in which glycerate ions ($HO-CH_2-CH(OH)-COO^-$) are coordinated to a binuclear cluster of Rh), which is a model for calculation. Here, the hybrid density functional formalism B3PW91 is employed as a calculation method, and LANL2MB is used as a basis function.

When rhodium is supported on the support by using the rhodium carboxylate (the rhodium carboxylate complex) according to the present invention as described above, the molecular size of the complex is sufficiently large, and the distance between the complexes can be controlled in accordance with the molecular size. Moreover, for example, in a case where the ligands of the rhodium carboxylate represented by general formula (3) are used, since the ligands have a higher affinity for water molecules, water molecules of hydration are present around the complex if a water-based solvent is used as the solvent. Accordingly, rhodium present as the nuclei are supported on the support in a more sufficiently highly dispersed state, with the nuclei being separated from each other by a more sufficient distance.

Moreover, when calcination is performed after the rhodium carboxylate is supported on the support as described above, the ligands are removed while two rhodium atoms present in each nucleus of the complex are sufficiently prevented from aggregating or scattering, because of the high thermal stability of the bonding between the support and the complex. For this reason, the two rhodium atoms present as the nucleus of each complex are supported on the support in an atomic state, while the state of being dispersed like islands is sufficiently kept. Accordingly, when calcination is performed after the rhodium carboxylate is supported on the support, the rhodium is supported on the support as two-atom clusters in a sufficiently dispersed state. In addition, since the aggregation and the scattering are sufficiently suppressed during the calcining as described above, the average distance between adjacent ones of the two-atom clusters becomes 1.0 nm or more (preferably 1.5 nm or more, and more preferably 2 nm or more) in consideration of the molecular size (especially the size of the ligands) of the rhodium carboxylate (in some cases, in consideration of the size of water molecules of hydration, and the molecular size of the rhodium carboxylate). In addition, when, for example, a complex having ligands with a higher affinity for water molecules such as the rhodium carboxylate represented by general formula (3) is used, and a water-based solvent is used in the present invention as described above, at is assumed that the average distance between adjacent ones of the two-atom clusters more easily becomes 1.0 nm or more (preferably 1.5 nm or more (further preferably 2 nm or more), owing to the size of the ligands of the rhodium carboxylate used, and water molecules surrounding those since the ligands are hydrophilic groups.

Moreover, when the rhodium carboxylate represented by general formula (4) is used in the present invention, the ligands thereof have benzo-crown ether groups and are sterically bulky. Accordingly, when coordination bonds are formed between hydroxy groups (or oxygen atoms) on the support and unsaturated coordination sites at axial positions in the complex, the ligands can be prevented from being overlapped with each other at a higher level. Specifically, since the ligands are sterically bulky in the rhodium carboxylate represented by general formula (4), a ligand of one molecule of the rhodium carboxylate can be prevented at a higher level from entering a space between a ligand and another ligand of another molecule of the rhodium carboxylate (a slight space in the molecule). As a result, when a coordination bonds are formed between hydroxy groups (or oxygen atoms) on the support and unsaturated coordination sites at axial positions in the complex, ligands can be prevented from being overlapped with each other at a higher level. For this reason, when the rhodium carboxylate represented by general formula (4) is used, the rhodium carboxylates tend to be supported on the support with the distance between the rhodium carboxylates being maintained more sufficiently. When the rhodium carboxylate represented by general formula (4) is used as describe above, two-atom clusters of rhodium are supported in a more highly dispersed state. For this reason, it is assumed that a catalyst capable of suppressing at a higher level the particle growth (sintering) under a high temperature condition can be obtained by using the rhodium carboxylate represented by general formula (4).

In addition, the present inventors assume that the catalyst for purification of automobile exhaust gas of the present invention which can be manufactured by employing favorably such a method for manufacturing a catalyst for purification of automobile exhaust gas of the present invention can exhibits a sufficiently high catalytic activity because of the following reason. Specifically, in the catalyst, rhodium is supported on the support in an atomic state (the state of the two-atom clusters) and in a sufficiently dispersed state (more preferably, in a state where the first dispersion of rhodium is 40 to 80% (further preferably, 40 to 75%) and/or in a state where the second dispersion of rhodium is 20 to 50% (further preferably 20 to 48%)), and hence the catalyst has a sufficient amount of active sites.

According to the present invention, it is possible to provide a catalyst for purification of automobile exhaust gas having rhodium in an atomic state supported in a sufficiently highly dispersed state, and having a sufficiently high catalytic activity, and also to provide a method for manufacturing a catalyst for purification of automobile exhaust gas capable of manufacturing the aforementioned catalyst efficiently and reliably.

BRIEF DESCRIPTION OF THE DRAWINGS

FIG. 12 is an electron microscope photograph showing results of measurement using a STEM on the catalyst for purification of automobile exhaust gas obtained in Example 7.

DETAILED DESCRIPTION OF THE PREFERRED EMBODIMENTS

Figure 1:
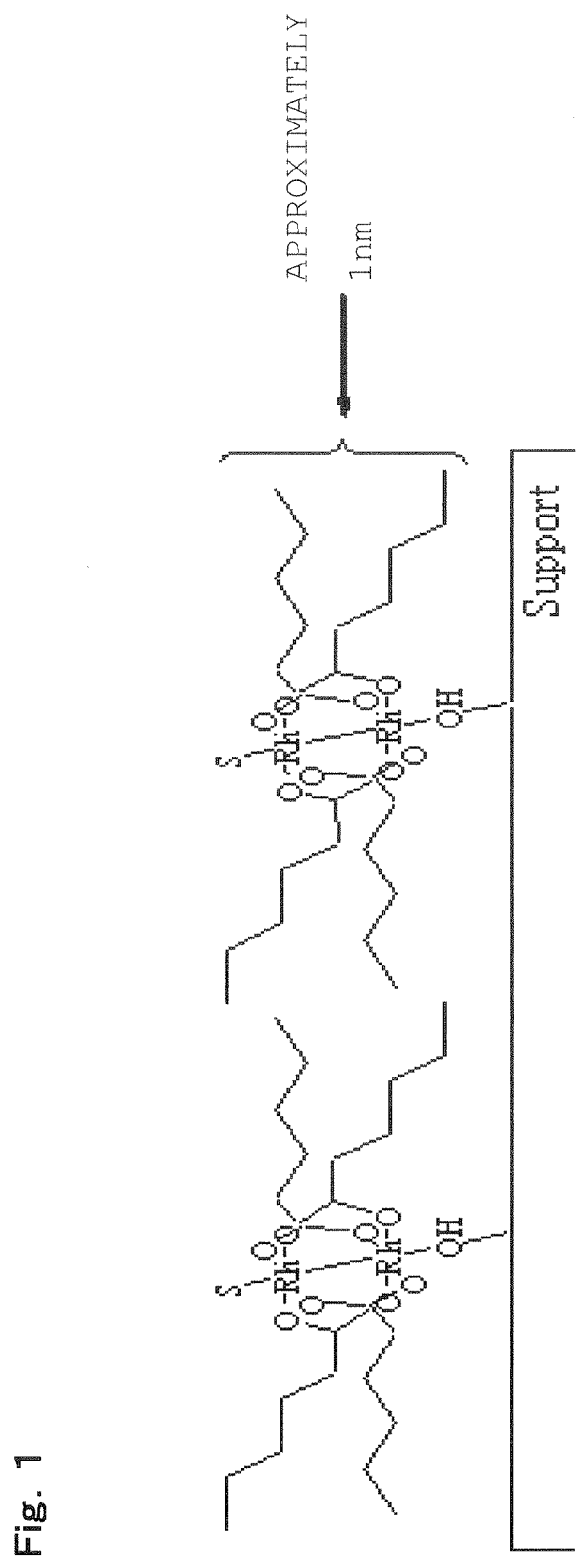
FIG. 1 is a first schematic diagram relating to a state of supporting of $Rh_2(C_5H_{11}COO)_4$, the first schematic diagram showing a state where $Rh_2(C_5H_{11}COO)_4$, which is a kind of rhodium carboxylate, is supported on a support.

The present invention will be described below in detail in line with preferred embodiments thereof.

First, a catalyst for purification of automobile exhaust gas of the present invention will be described. Specifically, the catalyst for purification of automobile exhaust gas of the present invention is a catalyst for purification of automobile exhaust gas, comprising: a support; and rhodium supported on the support in an atomic state, wherein an amount of the rhodium supported is 0.05 to 0.30% by mass relative to the total amount of the support and the rhodium, 50 at. % or more of the rhodium is supported on the support as two-atom clusters of rhodium, and an average distance between adjacent ones of the two-atom clusters is 1.0 nm or more.

The support according to the present invention is not particularly limited, and a publicly-known support usable for a catalyst for purification of exhaust gas can be used as appropriate as the support according to the present invention. For example, a support made of a metal oxide can be used as appropriate. Examples of the metal oxide used for such a support include activated alumina, alumina-ceria-zirconia, ceria-zirconia, zirconia, activated alumina stabilized with lanthanum, and the like. As the metal oxide, preferable is at least one kind selected from the group consisting of oxides of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), yttrium (Y), zirconium (Zr), aluminum (Al), magnesium (Mg), and vanadium (V); solid solutions thereof; and composite oxides thereof. Among these metal oxides, more preferable is a metal oxide containing at least one kind selected from the group consisting of $CeO_2$, $ZrO_2$, $Y_2O_3$, $TiO_2$, $Al_2O_3$; solid solutions thereof; and composite oxides thereof, from the viewpoint that a higher catalytic activity can be obtained.

In addition, the shape of such a support is not particularly limited. The shape of the support is preferably powdery, from the viewpoint that a sufficient specific surface area can be obtained. In addition, the specific surface area of such a support is not particularly limited. The specific surface area of such a support is more preferably 30 $m^2/g$ or more, from the viewpoint of obtaining a higher catalytic activity.

In addition, the rhodium according to the present invention is supported on the support in an atomic state. In the present invention, since the rhodium is supported on the support in an atomic state, the dispersiveness of the rhodium atoms becomes sufficiently high. This leads to a sufficient number of active sites on the catalyst. Hence, a sufficiently high catalytic activity can be obtained. Note that such a supported state (the atomic state) of rhodium can preferably be achieved by employing a method for manufacturing a catalyst for purification of automobile exhaust gas of the present invention to be described later.

The amount of such rhodium supported is 0.05 to 0.30% by mass (more preferably 0.10 to 0.25% by mass, further preferably 0.10 to 0.20% by mass, and particularly preferably 0.10 to 0.15% by mass) relative to the total amount of the support and the rhodium. If such an amount of the rhodium supported is less than the lower limit, it becomes impossible to obtain a sufficient catalytic activity. Meanwhile, if the amount exceeds the upper limit, sintering of Rh becomes more likely to occur. As a result, the dispersion of Rh lowers, and it becomes impossible to obtain a sufficient activity.

Moreover, in the present invention, 50 at. % or more, more preferably 75 at. % or more, and further preferably 95 at. % or more of the rhodium is supported on the support as two-atom clusters of rhodium. Here, the "two-atom cluster" in the present invention refers to an assembly in which two rhodium atoms gather around each other with a distance therebetween which is substantially equal to the length (approximately 2.4 Å) of the Rh—Rh bond in a rhodium carboxylate binuclear complex, which is a precursor. When the percentage of the rhodium supported as the two-atom clusters is within the range, a state is achieved in which rhodium is supported in a sufficiently dispersed manner. For this reason, the number of the active sites in the catalyst becomes sufficient, and a higher catalytic activity can be obtained. Meanwhile, if the percentage of the rhodium present as the two-atom clusters is less than the lower limit, it becomes impossible to obtain a sufficiently high catalytic activity.

As a method for determining such a percentage (at. %) of rhodium atoms present as the two-atom clusters, the following method is employed. Specifically, a randomly selected region which is on the support of the catalyst for purification of automobile exhaust gas and which has dimensions of 12 nm in length and 12 nm in width is observed with a scanning transmission electron microscope equipped with a spherical aberration corrector which is provided to a convergent lens (Cs-STEM). On the basis of the obtained STEM image, the total number of rhodium atoms present in the region, and the number of rhodium atoms present as the two-atom clusters are determined. Then, the ratio of the number of the rhodium atoms present as the two-atom clusters relative to the total number of the rhodium atoms is calculated. Note that as the scanning transmission electron microscope (STEM), a scanning transmission electron microscope manufactured by JEOL Ltd., under a trade name of "JEM-2100F" can be used, for example.

In addition, in the present invention, the average distance between adjacent ones of the two-atom clusters is 1.0 nm or more (more preferably 1.5 nm or more). Such an average distance between adjacent ones of the two-atom clusters is further preferably 1.0 nm (more preferably 1.5 nm) to 3.0 nm, and particularly preferably 2.0 nm to 3.0 nm. If such an average distance is less than the lower limit, the dispersiveness of the rhodium is lowered, and hence it becomes impossible to obtain a sufficiently high catalytic activity. Meanwhile, if such an average distance exceeds the upper limit, the number of the active sites is reduced, and it tends to be impossible to obtain a sufficiently high catalytic activity, in a case where the specific surface area of the support is small. Note that, in the present invention, the "average distance between adjacent ones of the two-atom clusters" can be determined on the basis of a STEM image which can be obtained by a Cs-STEM measurement as in the case of the above-described method for determining the percentage (at. %) of rhodium atoms present as the two-atom clusters. Here, the "distance between adjacent ones of the two-atom clusters" in the present invention refers to the length of a line segment on which a distance between an adjacent ones of the two-atom clusters becomes the shortest in view of each two-atom clusters. The "average distance between adjacent ones of the two-atom clusters" refers to an average value of the lengths of the line segments. Such an average distance is preferably an average value of the lengths of the line segments obtained by observing at least five two-atom clusters. The "average distance between adjacent ones of the two-atom clusters" in the present invention can be determined by using a STEM image of a region being selected at random and having dimensions of 12 nm in length and 12 nm in width, for example.

Figure 6:
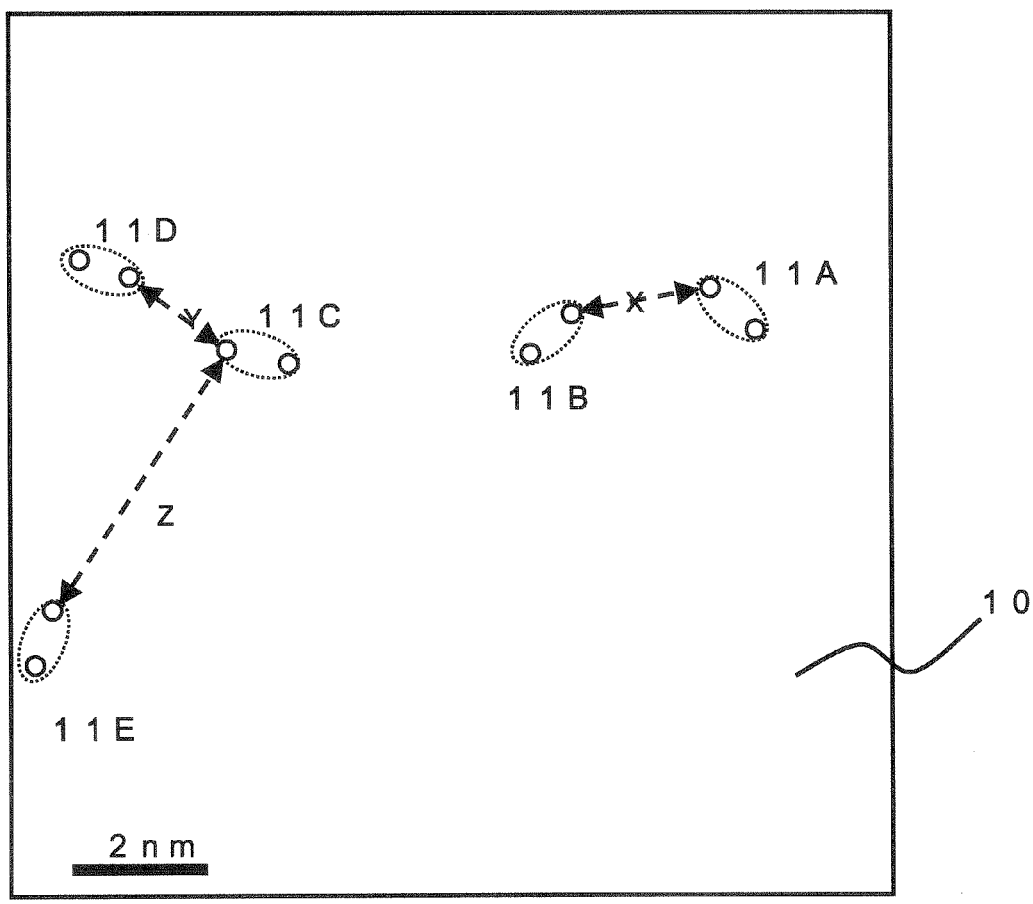
FIG. 6 is a conceptual diagram schematically showing a scanning transmission electron microscope photograph (a STEM image) of a region on a support of a catalyst for purification of automobile exhaust gas, the region being selected at random and having dimensions of 12 nm in length and 12 nm in width.

The "average distance between adjacent ones of the two-atom clusters" in the present invention will be described below in detail with reference to the drawings. FIG. 6 is a conceptual diagram schematically showing a STEM image of a region on the support of the catalyst for purification of automobile exhaust gas, the region being selected at random and having dimensions of 12 nm in length and 12 nm in width. Specifically, FIG. 6 is a diagram (a conceptual diagram) schematically showing STEM Image 1 of a state where five two-atom clusters 11A to E are supported on a support 10 (in the diagram, each white circle represents one rhodium atom, and two rhodium atoms present within a dotted line represent rhodium present in a two-atom cluster). In the case shown in FIG. 6, the length (distance) X of a line segment between the two-atom cluster 11A and the two-atom cluster 11B corresponds to the "distance between adjacent ones of the two-atom clusters" for the two-atom cluster 11A; the length (distance) X of the line segment between the two-atom cluster 11B and the two-atom cluster 11A corresponds to the "distance between adjacent ones of the two-atom clusters" for the two-atom cluster 11B; the length (distance) Y of a line segment between the two-atom cluster 11C and the two-atom cluster 11D corresponds to the "distance between adjacent ones of the two-atom clusters" for the two-atom cluster 11C; the length (distance) Y of the line segment between the two-atom cluster 11D and the two-atom cluster 11C corresponds to the "distance between adjacent ones of the two-atom clusters" for the two-atom cluster 11D; and the length (distance) Z of a line segment between the two-atom cluster 11D and the two-atom cluster 11C corresponds to the "distance between adjacent ones of the two-atom clusters" for the two-atom cluster 11E. Moreover, an average value of the lengths (distances) of such line segments corresponds to the "average distance between adjacent ones of the two-atom clusters." Note that the "length of a line segment" herein refers to a length of a line segment connecting points at which the two-atom clusters are closest to each other.

Moreover, in the present invention, the distance between adjacent ones of the two-atom clusters is preferably 1.0 nm or more (more preferably 1.5 nm or more) in 50 to 100% (percentage based on the number) of the total number of the two-atom clusters. From the viewpoint that a higher catalytic activity can be obtained, the percentage based on the number is preferably 100% (in other words, all the two-atom clusters have a distance between adjacent ones of the two-atom clusters of 1.0 nm or more (more preferably 1.5 nm or more). Note that "the total number of the two-atom clusters" herein refers to the number of all two-atom clusters observed in the STEM image. Meanwhile, if the percentage of the two-atom clusters whose distances between adjacent ones of the two-atom clusters is 1.5 nm or more is less than 50% of the total number of the two-atom clusters, it becomes impossible to obtain a sufficient catalytic activity after a use under high-temperature conditions for a long time.

In addition, the catalyst for purification of automobile exhaust gas of the present invention more preferably satisfies a condition that a first dispersion of rhodium which is determined on the basis of a first amount of CO adsorbed and the amount of the rhodium supported is 40 to 80% (further preferably 50 to 80%), the first amount of CO adsorbed being measured by a CO-pulse measurement method under a temperature condition of 50° C. If such a dispersion of rhodium is less than the lower limit, it tends to be impossible to obtain a sufficient catalytic activity. Note that the "first dispersion of rhodium" herein refers to a value determined by calculation from the "first amount of CO adsorbed" measured by the "CO-pulse measurement method under a temperature condition of 50° C." to be described later and the "amount of rhodium (Rh) supported" on the support by using the following formula:

[First dispersion of Rh (%)]=([First amount of CO adsorbed (mol)]/[Amount of Rh supported (mol)])×100.

In the present invention, the "CO-pulse measurement method under a temperature condition of 50° C." refers to a method for determining the amount of CO adsorbed on the catalyst in the following manner. Specifically, first, 2.0 g of a powder of the catalyst for purification of automobile exhaust gas is used as a sample for measurement. The powder is shaped by a cold isostatic pressing method (CIP: 1000 kg/cm$^2$) for 1 minute, and then ground into pellets each having a diameter of 0.5 to 1 mm. Thus, a sample is prepared. Next, the sample is placed in a region (a midway portion) of a gas tube for testing having an inner diameter of 1.1 cm and a length of 100 cm. The region has a length of 54.5 cm from the upstream to the downstream side of a gas flow passing through the gas tube. Next, a durability test is performed in which, under a condition of a temperature of 1000° C., a rich gas made of $H_2$ (2% by volume), $CO_2$ (10% by volume), $H_2O$ (3% by volume) and $N_2$ (the balance), and a lean gas made of $O_2$ (1% by volume), $CO_2$ (10% by volume), $H_2O$ (3% by volume) and $N_2$ (the balance) are alternately supplied for 50 hours, while the gases are switched to each other at intervals of 5 minute, so that each gas passes at a flow amount of 500 mL/min per 2 g of the sample. After such a durability test, three levels of 0.03 g, 0.04 g, and 0.05 g of the sample are weighed out to prepare samples. Each of the samples is placed in a measuring tube of a fully automated noble metal dispersiveness measuring apparatus (manufactured by OHKURA RIKEN CO., LTD. under the product name of "R6015") Next, the atmosphere inside the measuring tube of each of the fully automated noble metal dispersiveness measuring apparatus was changed to a gas atmosphere of $O_2$ (100% by volume). Then the temperature is raised to 400° C. over 40 minutes, and held for 15 minutes. Next, the gas atmosphere inside the measuring tube is changed to a gas atmosphere of He (100% by volume), and then held at 400° C. for 40 minutes. Subsequently, the gas atmosphere inside the measuring tube is changed to a gas atmosphere of $H_2$ (100% by volume), and then held at 400° C. for 15 minutes. Thereafter, the gas atmosphere is further changed to a gas atmosphere of He (100% by volume), and held at 400° C. for 15 minutes. While the gas atmosphere of He (100% by volume) is kept, natural cooling is performed to 50° C. (pre-treatment). After such a pre-treatment is performed, CO is pulsed to the sample at 1.0 μmol/pulse under a condition of a temperature of 50° C. (constant) and under a gas atmosphere of He (100% by volume), until the adsorption is saturated (adsorption temperature: 50° C.). Subsequently, an amount of CO which is included in the pulses but which does not adsorb onto the sample is detected, by use of a thermal conductivity detector. Then the "first amount of CO adsorbed" is determined from the number of times of pulse and the TCD area at the time of saturation of the adsorption. Then, an average value of the amounts of CO adsorbed by the samples (at 3 levels) measured as described above is taken as a final "first amount of CO adsorbed."

Moreover, the catalyst for purification of automobile exhaust gas of the present invention more preferably satisfies a condition that a second dispersion of rhodium which is determined on the basis of a second amount of CO adsorbed and the amount of the rhodium supported is 20 to 50%, the second amount of CO adsorbed being measured by a low-temperature CO pulse measurement method under a temperature condition of −78° C. In addition, when, for example, the catalyst for purification of automobile exhaust gas of the present invention is obtained by using the rhodium carboxylate represented by general formula (3), the catalyst more preferably satisfies a condition that the second dispersion of rhodium is 20 to 40%. Meanwhile, when the catalyst for purification of automobile exhaust gas of the present invention is obtained by using the rhodium carboxylate represented by general formula (4), the catalyst more preferably satisfies a condition that the second dispersion of rhodium is 30 to 50%. If such a second dispersion of rhodium is less than the lower limit, the catalytic activity tends to be lowered. Note that, the "second dispersion of rhodium" in the present invention refers to a value determined by calculation from the "second amount of CO adsorbed" measured by the "low-temperature CO pulse measurement method under a temperature condition of −78° C." to be described later and the "amount of rhodium (Rh) supported" on the support by using the following equation:

[Second dispersion of Rh (%)]=([Second amount of CO adsorbed (mol)]/[Amount of Rh supported (mol)])×100.

The "low-temperature CO pulse measurement method under a temperature condition of −78° C." refers to a method for determining the amount of CO adsorbed on the catalyst in the following manner. Specifically, first, 10.0 g of a powder of the catalyst for purification of automobile exhaust gas is used as a sample for measurement. The powder is shaped by a cold isostatic pressing method (CIP: 1000 kg/cm$^2$) for 1 minute, and then ground into pellets each having a diameter of 0.5 to 1 mm. Thus a sample is prepared. Next, 0.70 g of the sample is placed in a region (a midway port ion) of a gas tube for testing having an inner diameter of 1.1 cm and a length of 100 cm. The region has a length of 54.5 cm from the upstream to the downstream side of a gas flow passing through the gas tube. Subsequently, a durability test is performed in which, under a condition of a temperature of 1000° C., a rich gas made of H$_2$ (2% by volume), CO$_2$ (10% by volume), H$_2$O (3% by volume), and N$_2$ (the balance), and a lean gas made of O$_2$ (1% by volume), CO$_2$ (10% by volume), H$_2$O (3% by volume), and N$_2$ (the balance) are alternatively supplied for 50 hours, while the gases are switched to each other at intervals of 5 minutes, so that each gas passes at a flow amount of 500 mL/min per 5.0 g of the sample. Next, three levels of 0.03 g, 0.04 g, and 0.05 g of the sample after the durability test are weighed out to prepare samples. Each of the samples is placed in a measuring tube of a low-temperature CO pulse adsorbed amount measuring apparatus (manufactured by OHKURA RIKEN CO., LTD.). Subsequently, the atmosphere inside the measuring tube of the low-temperature CO pulse adsorbed amount measuring apparatus is changed to a gas atmosphere of O$_2$ (100% by volume). Then the temperature is raised to 400° C. over 40 minutes, and held for 15 minutes. Next, the gas atmosphere inside the measuring tube is changed to a gas atmosphere of He (100% by volume), and then held at 400° C. for 40 minutes. Subsequently, the gas atmosphere inside the measuring tube is changed to a gas atmosphere of H$_2$ (100% by volume), and then held at 400° C. for 15 minutes. Thereafter, the gas atmosphere is further changed to a gas atmosphere of He (100% by volume), and held at 400° C. for 15 minutes. While the gas atmosphere of He (100% by volume) is kept, natural cooling is performed to 50° C. (pre-treatment). After such a pre-treatment, while He gas is flowed at a flow amount of 30 ml/minute, the measuring tube is cooled to −78° C. by using a cooling medium of dry ice/ethanol. After the temperature becomes constant at −78° C. by the above-described method, CO is pulsed to the sample at 1.0 μmol/pulse under a gas atmosphere of He (100% by volume) until the adsorption is saturated (adsorption temperature: −78° C.). Subsequently, an amount of CO which is included in the pulses but which does not adsorb onto the sample is detected, by use of a thermal conductivity detector. Then the "second amount of CO adsorbed" is determined from the number of times of the pulse and the TCD area at the time of saturation of the adsorption. Then, an average value of the amounts of CO adsorbed by the samples (at 3 levels) measured as described above is taken as a final "second amount of CO adsorbed".

Moreover, in the present invention, the rhodium is preferably supported on the support in an atomic state by using at least one kind of rhodium carboxylates represented by the above-described general formulae (1) to (4). As a method for supporting rhodium by using such a rhodium carboxylate, a method for manufacturing a catalyst for purification of automobile exhaust gas of the present invention to be described later can be employed preferably.

Furthermore, the form of the catalyst for purification of automobile exhaust gas of the present invention is not particularly limited, and the catalyst may be in a form of, for example, a monolithic catalyst, in which the catalyst is supported on a substrate, having a honeycomb shape, a pellet catalyst having a pellet shape, or the like. The substrate used herein is also not particularly limited, and a particulate filter substrate (a DPF substrate), a monolithic substrate, a pellet-shaped substrate, a plate-shaped substrate, or the like can preferably be employed. In addition, a material of such a substrate is not particularly limited, and a substrate made of a ceramic such as cordierite, silicon carbide, or mullite, or a substrate made of a metal such as stainless steel containing chromium and aluminum can preferably be employed.

In addition, a method for supporting the catalyst on such a substrate is not particularly limited, and any publicly-known method can be employed as appropriate. Note that other components (for example, a NOx storage material or the like) which can be used for a catalyst for exhaust gas purification may be supported on such a catalyst for purification of automobile exhaust gas, as long as the effects of the present invention are not impaired. Moreover, the catalyst for purification of automobile exhaust gas of the present invention can be manufactured by employing a method for manufacturing a catalyst for purification of automobile exhaust gas of the present invention to be described later.

Next, the method for manufacturing a catalyst for purification of automobile exhaust gas of the present invention will be described. Specifically, the method for manufacturing a catalyst for purification of automobile exhaust gas of the present invention is a method comprising:

bringing a rhodium-containing liquid into contact with a support, the rhodium-containing liquid containing at least one kind selected from rhodium carboxylates represented by the following general formulae (1) to (4):

$$Rh_2(R\text{—}CO_2)_4 \quad (1)$$

[in formula (1), R represents one kind selected from the group consisting of hydrocarbon groups having a carbon number of 4 to 20],

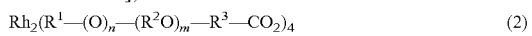
$$Rh_2(R^1\text{—}(O)_n\text{—}(R^2O)_m\text{—}R^3\text{—}CO_2)_4 \quad (2)$$

[in formula (2), R$^1$ represents one kind selected from the group consisting of hydrocarbon groups, which may have a hydroxy group in a side chain thereof, having a carbon number of 4 to 20, R$^2$ represents one kind selected from the group consisting of hydrocarbon groups having a carbon number of 1 to 3, R$^3$ represents one kind selected from the group consisting of hydrocarbon groups having a carbon number of 1 to 20, n represents any integer of 0 and 1, m represents any integer of 0 to 6, and the sum of n and m satisfies a condition of being 1 or greater],

$$Rh_2(R^4\text{—}(C(R^5)(X))_l\text{—}CO_2)_4 \quad (3)$$

[in formula (3), R$^4$ and R$^5$ may be the same or different, and each represent one kind selected from the group consisting of a hydrogen atom and hydrocarbon groups having a carbon number of 1 to 3, X represents one kind selected from the group consisting of a OH group, an NH$_2$ group, and a NO$_2$ group, and l represents any integer of 1 to 5], and

$$Rh_2(CO_2)_4 \quad (4)$$

[in formula (4), Z represents a benzo-crown ether group represented by the following general formula (5):

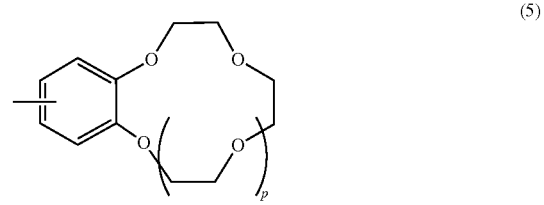

(5)

(in formula (5), p represents any integer of 1 to 3); thereby an unsaturated coordination site of the rhodium carboxylate being allowed to be directly bonded to a hydroxy group and/or an oxygen atom on the support, and the rhodium carboxylate being supported on the support; and performing calcination, thereby a catalyst for purification of automobile exhaust gas being obtained.

Such rhodium carboxylates represented by general formulae (1) to (4) are each a binuclear complex in which carboxylic acid ligands (ligands represented by formula: $R-CO_2$, $R^1-(O)_n-(R^2O)_m-R^3-CO_2$, $R^4-(C(R^5)(X))_f-CO_2$ or $Z-CO_2$) are coordinated to two rhodium atoms serving as a nucleus in a form of bridging ligands. The use of such a rhodium carboxylate enables a coordination bond to be formed between the complex and the support when the rhodium carboxylate is supported on the support. As a result, the complex can be supported on the support in a state with a sufficiently high thermal stability. Moreover, this enables 50 at. % or more of rhodium to be supported on the support as the two-atom clusters.

First, description will be made of the rhodium carboxylate according to the present invention represented by general formula (1):

$$Rh_2(R-CO_2)_4 \qquad (1)$$

[in formula (1), R represents one kind selected from the group consisting of hydrocarbon groups having a carbon number of 4 to 20].

Each of the hydrocarbon groups which can be selected as R in such general formula (1) is one having a carbon number of 4 to 20 (more preferably 5 to 18, and further preferably 6 to 15). If the carbon number is less than the lower limit, the average distance between adjacent ones of the two-atom clusters cannot be made equal to or more than 1 nm when rhodium is supported on the support. Meanwhile, if the carbon number exceeds the upper limit, the active sites become deficient, and hence it tends to be impossible to obtain a sufficiently high catalytic activity in a case where the specific surface area of the support is small.

In addition, each of the hydrocarbon groups which can be selected as R in general formula (1) may be a saturated hydrocarbon group or an unsaturated hydrocarbon group. Moreover, such a hydrocarbon group may be linear, branched, or cyclic. Furthermore, such a hydrocarbon group is more preferably linear, from the viewpoint that the average distance between adjacent ones of the two-atom clusters can be more surely made equal to or more than 1 nm. In addition, among such Rs, a saturated hydrocarbon group (particularly preferably, a linear alkyl group) is preferable from the viewpoint of availability and the like. Note that each of the hydrocarbon groups which can be selected as R in formula (1) may have a substituent, and examples of such a substituent include a halogen atom, a hydroxyl group, an acyl group, an aldehyde group, an amino group, an imino group, a nitro group, a cyano group, and the like.

Next, description will be made of the rhodium carboxylate according to the present invention represented by general formula (2):

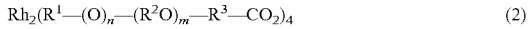

$$Rh_2(R^1-(O)_n-(R^2O)_m-R^3-CO_2)_4 \qquad (2)$$

[in formula (2), $R^1$ represents one kind selected from the group consisting of hydrocarbon groups, which may have a hydroxy group in a side chain thereof, having a carbon number of 4 to 20, $R^2$ represents one kind selected from the group consisting of hydrocarbon groups having a carbon number of 1 to 3, $R^3$ represents one kind selected from the group consisting of hydrocarbon groups having a carbon number of 1 to 20, n represents any integer of 0 and 1, m represents any integer of 0 to 6, and the sum of n and m satisfies a condition of being 1 or greater].

such $R^1$ in general formula (2) is a hydrocarbon group, which may have a hydroxy group in a side chain thereof, having a carbon number of 4 to 20. The carbon number of such a hydrocarbon group is more preferably 6 to 18, and further preferably 10 to 15. If the carbon number is less than the lower limit, the average distance between adjacent ones of the two-atom clusters cannot be made equal to or more than 1 nm when rhodium is supported on the support. Meanwhile, if the carbon number exceeds the upper limit, the supporting by adsorption is incomplete in a case where the specific surface area of the support. As a result, the active sites become deficient, and hence it tends to be impossible to obtain a sufficiently high catalytic activity.

Meanwhile, each of the hydrocarbon group, which may have a hydroxy group in a side chain thereof, which has a carbon number of 4 to 20, and which can be selected as $R^1$, may be a saturated hydrocarbon group or an unsaturated hydrocarbon group. In addition, such a hydrocarbon group may be linear, branched, or cyclic. Moreover, such a hydrocarbon group is more preferably linear, from the viewpoint that the average distance between adjacent ones of the two-atom clusters can be more surely made equal to or more than 1 nm. In addition, such $R^1$ is preferably a hydrocarbon group having at least one hydroxy group in a side chain, more preferably a saturated hydrocarbon group having at least one hydroxy group in a side chain, and particularly preferably a linear saturated hydrocarbon group having at least one hydroxy group in a side chain, because affinity for water is more improved, and hence a more favorable use can be achieved when a water-based solvent is used as the solvent.

Such $R^1$ is not particularly limited, and examples thereof include a butyl group, a pentyl group, a hexyl group, an octyl group, a nonyl group, a decyl group, an undecyl group, a dodecyl group, a tetradecyl group, a pentadecyl group, a hexadecyl group, a heptadecyl group, a 2-hydroxybutyl group, a 5-hydroxypentyl group, a 2-hydroxypentyl group, a 6-hydroxyhexyl group, a 2-hydroxyhexyl group, a 7-hydroxyheptyl group, a 2-hydroxyheptyl group, a 8-hydroxyoctyl group, a 2-hydroxyoctyl group, a 9-hydroxynonyl group, a 2-hydroxynonyl group, a 10-hydroxydecyl group, a 2-hydroxydecyl group, a 11-hydroxyundecyl group, 2-hydroxyundecyl group, a 12-hydroxydodecyl group, a 2-hydroxydodecyl group, and the like.

In addition, each of the hydrocarbon groups which can be selected as $R^2$ in general formula (2) has a carbon number of 1 to 3 (more preferably 1 and 2). If the carbon number exceeds the upper limit, the hydrophilicity of the rhodium carboxylate tends to be lowered. Such a hydrocarbon group may be a saturated hydrocarbon group or an unsaturated hydrocarbon group, but more preferably a saturated hydrocarbon group.

Each of the hydrocarbon groups which can be selected as $R^3$ in general formula (2) has a carbon number of 1 to 20 (more preferably 1 to 15, further preferably 1 to 10, and particularly preferably 1 to 5). If the carbon number is less than the lower limit, the average distance between adjacent ones of the two-atom clusters cannot be made equal to or more than 1 nm, when rhodium is supported on the support. Meanwhile, if the carbon number exceeds the upper limit, the active sites become deficient, and hence it tends to be impossible to obtain a sufficiently high catalytic activity, in a case where the specific surface area of the support is small.

Moreover, each of the hydrocarbon groups which can be selected as $R^3$ in general formula (2) may be a saturated hydrocarbon group or an unsaturated hydrocarbon group. In addition, such a hydrocarbon group may be linear, branched, or cyclic. Moreover, such a hydrocarbon group is more preferably linear, from the viewpoint that the average distance between adjacent ones of the two-atom clusters can be more surely made equal to or more than 1 nm. In addition, $R^3$ is more preferably a saturated hydrocarbon group and further preferably a linear saturated hydrocarbon group (particularly preferably a methyl group, or an ethyl group), from the viewpoints of preparation, availability, and the like.

Meanwhile, n in general formula (2) is any integer of 0 and 1. Moreover, m is any integer of 0 to 6 (more preferably 1 to 4). If any one of the integers exceeds the upper limit, the supporting by adsorption is not performed sufficiently, in a case where the specific surface area of the support is small. As a result, the active sites become deficient, and hence it tends to be impossible to obtain a sufficiently high catalytic activity. In addition, such n and m satisfy the condition that the sum of n and m is 1 or greater. In other words, anyone of such n and m is always an integer of 1 or greater, and the both do not take 0 at the same time. For this reason, each ligand in the rhodium carboxylate represented by general formula (2) is an ether carboxylic acid groups. Hence, the rhodium carboxylate has a sufficient hydrophilicity. Accordingly, when the rhodium carboxylate represented by general formula (2) is made to be contained in the rhodium-containing liquid, a water-based solvent can preferably be used as the solvent. As described above, when the rhodium carboxylate represented by general formula (2) is used, a water-based solvent, which is a particularly preferable solvent from the industrial viewpoint, can be used suitably.

Subsequently, description will be made of the rhodium carboxylate according to the present invention represented by general formula (3):

$$Rh_2(R^4-(C(R^5)(X))_l-CO_2)_4 \quad (3)$$

[in formula (3), $R^4$ and $R^5$ may be the same or different, and each represent one kind selected from the group consisting of a hydrogen atom and hydrocarbon groups having a carbon number of 1 to 3, X represents one kind selected from the group consisting of a OH group, an $NH_2$ group, and a $NO_2$ group, and l represents any integer of 1 to 5].

$R^4$ and $R^5$ in such a general formula (3) may be the same or different, and are each a hydrogen atom or a hydrocarbon group having a carbon number of 1 to 3 (more preferably 1 and 2, and further preferably 1). If the carbon number exceeds the upper limit, the efficiency of the supporting becomes low. As a result, the active sites become deficient in a case where the specific surface area of the support is small, and hence it tends to be impossible to obtain a sufficiently high catalytic activity.

In addition, each of the hydrocarbon groups which can be selected as each of $R^4$ and $R^5$ in general formula (3) may be a saturated hydrocarbon group or an unsaturated hydrocarbon group. Furthermore, such a hydrocarbon group may be linear or branched. Moreover, such a hydrocarbon group is more preferably linear from the viewpoint that the average distance between adjacent ones of the two-atom clusters can be more surely made equal to or more than 1.5 nm. In addition, among such $R^4$ and $R^5$, a saturated hydrocarbon group is preferable (a linear alkyl group is particularly preferable) from the viewpoints of availability and the like. Note that hydrogen atoms of the hydrocarbon group which can be selected as each of $R^4$ and $R^5$ in formula (3) may be partially substituted with halogen atoms.

Each of such $R^4$ and $R^5$ is preferably a hydrocarbon group having at least one hydroxy group in a side chain, more preferably a saturated hydrocarbon group having at least one hydroxy group in a side chain, and particularly preferably a linear saturated hydrocarbon group having at least one hydroxy group in a side chain, because affinity for water is more improved, and hence a more preferable use can be achieved when a water-based solvent is used as the solvent. As described above, when the rhodium carboxylate represented by general formula (3) is used, a water-based solvent, which is a particularly preferable solvent from the industrial viewpoint, can be used suitably.

Moreover, X in general formula (3) is at least one selected from the group consisting of a OH group, an $NH_2$ group, and a $NO_2$ group, and is more preferably a OH group or an $NH_2$ group, and particularly preferably a OH group, because affinity for water is more improved, and hence a more preferable use can be achieved when a water-based solvent is used as the solvent.

Meanwhile, l in general formula (3) is any integer of 1 to 5 (more preferably 1 to 4). If the integer exceeds the upper limit, the supporting by adsorption is not performed sufficiently, in a case where the specific surface area of the support is small. As a result, the active sites become deficient, and hence it tends to be impossible to obtain a sufficiently high catalytic activity.

Next, description will be made of the rhodium carboxylate according to the present invention represented by $$Rh_2(Z-CO_2)_4 \quad (4)$$

in formula (4), Z represents a benzo-crown ether group represented by the following general formula (5):

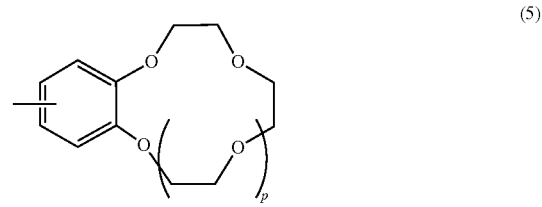

(in formula (5), p represents any integer of 1 to 3)

In such a general formula (5), p is any integer of 1 to 3 (more preferably 2 to 3). If such an integer p exceeds the upper limit, a sufficient amount of rhodium supported cannot be obtained in the case of a support having a small specific surface area, and hence a large amount of the support is required.

Each of such rhodium carboxylates represented by general formulae (1) to (4) may be solvated with a solvent used at the time of manufacturing, storage, use or the like of the complex (for example, hydrated when the solvent used at the time of the manufacturing, storage, or the like is water). When the complex represented by general formula (1) is taken as an example, the solvated complex may be a rhodium carboxylate represented by the following general formula (1-1):

$$Rh_2(R-CO_2)_4 \cdot q(solv) \quad (1-1)$$

[in formula (1-1), R has the same meaning as R in formula (1), q represents a numeric value of 0 to 2, and solv represents a molecule of a solvent (such as $H_2O$, $(CH_3)_2O$, or $CH_3OH$)]. Meanwhile, when the complex represented by general formula (3) is taken as an example, the solvated complex may be a rhodium carboxylate represented by the following general formula (3-1):

$$Rh_2(R^4-(C(R^5)(X))_l-CO_2)_4 \cdot q(solv) \quad (3-1)$$

[in formula (3-1), $R^4$, $R^5$, X, and l have the same meanings of $R^4$, $R^5$, X, and l in formula (3), respectively, q represents a numeric value of 0 to 2, and solv represents a molecule of a solvent (such as $H_2O$, $(CH_3)_2O$, or $CH_3OH$)].

Note that it is not known exactly why the average distance between adjacent ones of the two-atom clusters can be made equal to or more than 1.0 nm (more preferably 1.5 nm) by using at least one kind of the rhodium carboxylates according to the present invention represented by general formulae (1) to (4). However, the present inventors assume as follows. Specifically, each carboxylic acid ligand in such a rhodium carboxylate is sufficiently bulky. For example, in general formula (1), R in the carboxylic acid ligand is any one kind selected from the group consisting of hydrocarbon groups having a carbon number of 4 to 20, and in general formula (3), each of $R^4$ and $R^5$ is any one kind selected from the group consisting of a hydrogen atom and hydrocarbon groups having a carbon number of 1 to 3. Accordingly, when the rhodium carboxylate is supported on the support, sufficiently bulky ligands are present between nuclei of molecules of the rhodium carboxylate supported adjacent to each other. It is assumed that for the above-described reason the average distance between nuclei of molecules of the rhodium carboxylate supported on the support becomes a distance of 1.0 nm or more (more preferably 1.5 nm or more) depending on the size of the molecule (an average molecular radius). Moreover, for example, in the case of the rhodium carboxylate represented by general formula (3), it is assumed that since X in each ligand thereof is a hydrophilic group, several water molecules are present around the rhodium carboxylate, the distance becomes equal to or greater than the size of the molecule of the rhodium carboxylate (average molecular radius). As described above, when the ligands of the rhodium carboxylates represented by general formulae (1) to (4) have hydrophilicity, it is speculated that because of the presence of water molecules the dispersiveness of rhodium is more efficiently improved. In addition, in the rhodium carboxylate represented by general formula (4), each ligand is the carboxybenzo crown ether (the group represented by Z—$CO_2$ in formula (4)). Such a ligand is a sterically bulkier ligand. For this reason, a ligand of one molecule of the complex can be sufficiently prevented at a higher level from entering a void (space) present between one ligand and another ligand in another molecule of the complex. Hence, the distance between adjacent ones of the two-atom clusters of rhodium can be made longer. It is assumed that the average distance between adjacent ones of the two-atom clusters can be made equal to or more than 1.0 nm (more preferably 1.5 nm) by performing calcination after such a rhodium carboxylase represented by each of general formulae (1) to (4) is supported on the support. Note that by making the average distance between two-atom clusters equal to or more than 1.0 nm (more preferably 1.5 nm) as described above, the rhodium takes a sufficiently highly dispersed state. The present inventors assume that for the above-described reason the first dispersion of rhodium can be efficiently made to be 40 to 80% and/or the second dispersion of rhodium can be efficiently made to be 20 to 50% (more preferably 20 to 48%). Here, each of the first and second dispersion of rhodium is determined on the basis of the corresponding amount of CO adsorbed which is measured by performing the above-described CO-pulse measurement method including the durability test as described above, and the amount of rhodium supported.

In addition, such rhodium carboxylates represented by general formulae (1) to (4) are preferably selectively used in accordance with the specific surface area of the support. For example, when the specific surface area of the support is small, a rhodium carboxylate whose carboxylic acid ligands have a smaller size is selected from the rhodium carboxylates represented by general formulae (1) to (4) and used. Thereby, a sufficient amount of rhodium can be supported more efficiently in a sufficiently dispersed manner. As a result, a sufficient amount of active sites are obtained. Meanwhile, when the specific surface area of the support is large, among the rhodium carboxylates represented by general formulae (1) to (4), a rhodium carboxylate whose carboxylic acid ligands have a larger size is used. Thereby, a sufficient amount of rhodium can be supported more efficiently in a sufficiently dispersed manner. More specifically, when a support having a specific surface area of 70 $m^2/g$ is used in manufacturing a catalyst for purification of automobile exhaust gas having 0.15% by mass of rhodium supported on a support, a rhodium carboxylate having a molecular size (average molecular radius) of 1 nm (for example, in a case where R in general formula (1) is a linear alkyl group having a carbon number of 4, or the like) or a rhodium carboxylate having a molecular size (average molecular radius) of 0.8 nm (for example, in a case where $R^4$ and $R^5$ in general formula (3) are each a hydrogen atom, or the like) is selected and used. Thereby, a catalyst for purification of automobile exhaust gas having an intended design can be more efficiently manufactured. Meanwhile, when a support having a specific surface area of 159 $m^2/g$ is used, a rhodium carboxylate represented by general formula (1) or (2) which has a molecular size (average molecular radius) of 2 nm or a rhodium carboxylate represented by general formula (3) which has a molecular size (average molecular radius) of 1.6 nm is selected and used. Thereby, a catalyst for purification of automobile exhaust gas having an intended design can be more efficiently manufactured. By selecting for use a rhodium carboxylate as appropriate in accordance with the size of the support or characteristics thereof as described above, the amount of rhodium supported, the dispersion of rhodium, and the like can be changed as appropriate, and an arrangement of the two-atom clusters of rhodium suitable for the support of that kind can be achieved.

Moreover, a method for synthesizing such rhodium carboxylates represented by general formulae (1) to (4) is not particularly limited, and any publicly-known method can be employed as appropriate. For example, as a method for synthesizing the rhodium carboxylate represented by general formula (2), a synthesis method may be employed in which an alkali metal salt (for example, a sodium salt) of an ether carboxylic acid, and $RhCl_3.3H_2O$ are added to water, and the obtained mixture is refluxed. Meanwhile, for example, as a method for synthesizing the rhodium carboxylate represented by general formula (3), a synthesis method may be employed in which glyceric acid (which may be any one of the R-isomer, the S-isomer, or an mixture thereof) and $RhCl_3.3H_2O$ are added to water, and the obtained mixture is refluxed. Moreover, for example, as a method for synthesizing the rhodium carboxylate represented by general formula (3), for example, a synthesis method may be employed in which a carboxybenzo crown ether compound (for example, 4'-carboxybenzo-15-crown-ether) and $RhCl_3.3H_2O$ are added to water, and the obtained mixture is refluxed. Moreover, commercially available complexes may be used as such rhodium carboxylates.

In addition, the solvent for the rhodium-containing liquid is not particularly limited, and any one of water, an organic solvent, and the like, which are capable of dissolving the rhodium carboxylate, can be used as appropriate. In addition, regarding the solvent for the rhodium-containing liquid, when the rhodium carboxylate represented by the general formula (1) is used, at least one kind selected from the group consisting of toluene, ether, hexane, and chloroform is preferably used, and toluene is particularly preferably used as the solvent for the rhodium-containing liquid, from the viewpoint that rhodium is more efficiently supported. Meanwhile, when the rhodium carboxylate represented by each of general formulae (2) to (4), a water-based solvent containing at least water is more preferably used as the solvent for the rhodium-containing liquid, from the viewpoint that rhodium is more efficiently supported. In addition, among the rhodium carboxylates according to the present invention, the rhodium carboxylates represented by general formulae (2) to (4) have higher hydrophilicity. Hence, even when the water-based solvent is used as the solvent, rhodium can be supported on the support at a higher level. In addition, such a water-based solvent is a preferable solvent from the industrial viewpoint. For this reason, in the present invention, it is preferable that the rhodium carboxylates represented by each of general formulae (2) to (4) should be used as the rhodium carboxylate, and that the water-based solvent should be used as the solvent for the rhodium-containing liquid.

In addition, such a water-based solvent preferably has a water content of 50% by mass or more, (further preferably 80% by mass or more, and particularly preferably 100% by mass). Moreover, a component other than water contained in the water-based solvent is not particularly limited. A lower alcohol, acetone, acetonitrile, DMF (dimethylformamide), diglyme (diethylene glycol dimethyl ether), or the like is preferable, as the component.

Moreover, the ratio of rhodium (metal) contained in such a rhodium-containing liquid is not particularly limited, and the ratio is preferably set to 0.0005 to 0.15% by mass, and more preferably set to 0.0015 to 0.015% by mass, in terms of metal. If such a ratio of rhodium is less than the lower limit, not only the amount of the solution for supporting tends to be large, but also it tends to be difficult to efficiently support the rhodium carboxylate on the support. Meanwhile, if the ratio exceeds the upper limit, the dispersiveness of each of the complex and the support is lowered, and hence it tends to be difficult to support the rhodium carboxylate uniformly. Note that a method for preparing such a rhodium-containing liquid is not particularly limited, and a method with which the rhodium carboxylate can be dissolved in the solvent may be employed as appropriate.

In addition, the support used in the method for manufacturing a catalyst for purification of automobile exhaust gas of the present invention is the same as the support described for the catalyst for purification of automobile exhaust gas of the present invention.

A method for supporting the rhodium carboxylate on the support by bringing the rhodium-containing liquid into contact with the support, thereby unsaturated coordination sites of the rhodium carboxylate being directly bonded to hydroxy groups on the support is not particularly limited. Here, any publicly-known method capable of supporting the rhodium carboxylate on the support can be employed as appropriate. For example, a method may be employed in which the rhodium carboxylate is supported on the support by immersing the support in the rhodium-containing liquid.

Moreover, when the rhodium carboxylate is supported on a surface of the support by immersing the support in the rhodium-containing liquid, it is preferable to perform stirring under conditions of a pressure of 1 to 10 atm and a temperature which is not lower than the melting point of the solvent for the rhodium-containing liquid, and not higher than the boiling point thereof (more preferably approximately 10 to 30° C., particularly preferably approximately room temperature) for 0.5 to 24 hours. If the pressure or the temperature in the conditions for supporting the rhodium carboxylate on the surface of the support is less than the lower limit, the efficiency of the supporting tends to be lowered. Meanwhile, if the pressure or the temperature in the conditions exceeds the upper limit, the production costs tend to be increased because excessive stirring is continued.

Figure 2:
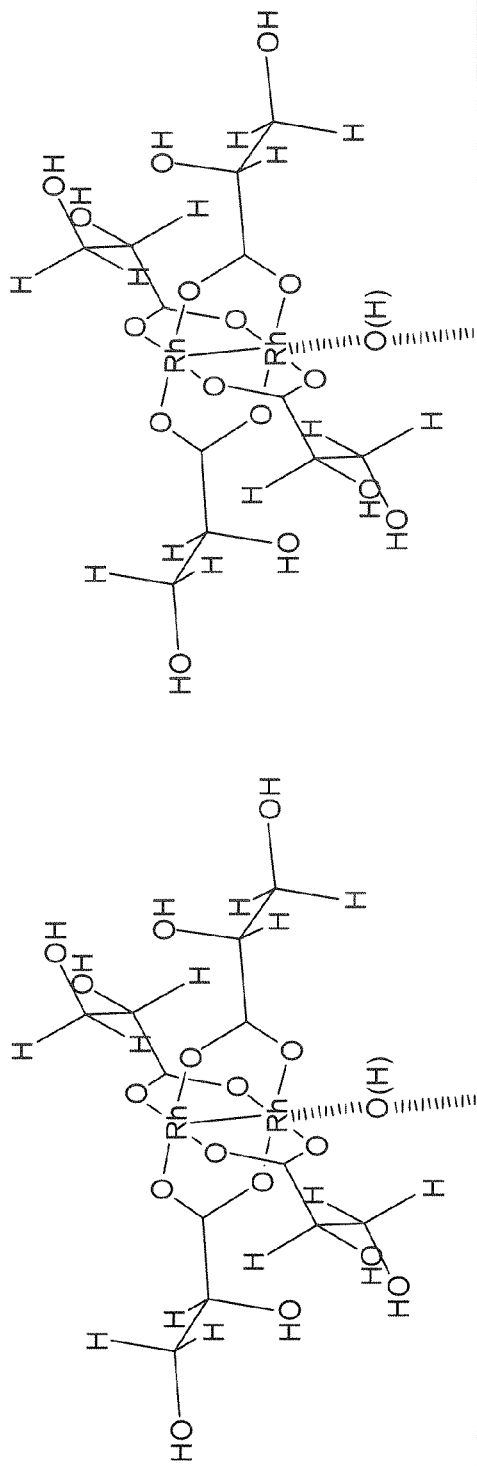
FIG. 2 is a first schematic diagram relating to a state of supporting of $Rh_2(HO-CH_2-CH(OH)-COO)_4$, the first schematic diagram showing a state where $Rh_2(HO-CH_2-CH(OH)-COO)_4$, which is a kind of rhodium carboxylate, is supported on a support.

In addition, in the present invention, unsaturated coordination sites of the rhodium carboxylate are directly bonded to hydroxy groups (or oxygen atoms) on the support (refer to FIGS. 1 and 2). In order to achieve such bonds, a support modified with organic groups obtainable by performing a surface treatment or the like is not used as the support, but a support having substantially no organic group is preferably used as the support. By using the support having substantially no organic group as described above, the rhodium carboxylate is brought into direct contact with the surface of the support. Thereby, the unsaturated coordination sites of the rhodium carboxylate can be directly bonded to the hydroxy groups (or the oxygen atoms) on the support. In other words, in the present invention, the "directly bonding of the unsaturated coordination sites of the rhodium carboxylate to the hydroxy groups (or oxygen atoms) on the support" can be easily achieved by using a support modified with substantially no organic group (the support having substantially no organic groups), and bringing the rhodium-containing liquid into contact with the support. From such a viewpoint, as the support used in the method for manufacturing a catalyst for purification of automobile exhaust gas of the present invention, the same support as described in the catalyst for purification of automobile exhaust gas of the present invention is preferably used without modification. In addition, a method for manufacturing such a support is not particularly imitated, and any publicly-known method can be employed as appropriate. Furthermore, commercially available metal oxides may be used as such a support without modification.

Moreover, as a method of the calcination which is performed after the rhodium carboxylate is supported on the support, a calcination method under a temperature condition of 200 to 600° C. (further preferably 300 to 500° C.) for approximately 1 to 5 hours is preferably employed. Such a calcination temperature or time is less than the lower limit, it tends to be difficult to remove the ligand efficiently and sufficiently. Meanwhile, if such a calcination temperature or time exceeds the upper limit, the rhodium atoms tend to aggregate when the carboxylic acid ligand is decomposed on the support.

The above-described method for manufacturing a catalyst for purification of automobile exhaust gas of the present invention makes it possible to support rhodium on the support in an atomic state and a sufficiently highly dispersed state, and also to obtain the above-described catalyst for purification of automobile exhaust gas of the present invention. Specifically, the method for manufacturing a catalyst for purification of automobile exhaust gas of the present invention makes it possible to obtain a catalyst for purification of automobile exhaust gas comprising the support and the rhodium supported on the support in an atomic state, wherein the amount of the rhodium supported is 0.05 to 0.30% by mass relative to the total amount of the support and the rhodium, 50 at. % or more of the rhodium is supported on the support as two-atom clusters of rhodium, and the average distance between adjacent ones of the two-atom clusters is 1.0 nm or more (more preferably 1.5 nm or more). In addition, the method for manufacturing a catalyst for purification of automobile exhaust gas of the present invention enables the average distance between adjacent ones of the two-atom clusters to be 1.0 nm or more (more preferably 1.5 nm or more). Hence, it is possible to obtain a catalyst for purification of automobile exhaust gas, wherein the first dispersion of the rhodium which is determined on the basis of the first amount of CO adsorbed and the amount of the rhodium supported is 40 to 80%, the first amount of CO adsorbed being measured by the CO-pulse measurement method under a temperature condition of 50° C., and/or a catalyst for purification of automobile exhaust gas, wherein the second dispersion of rhodium which is determined on the basis of the amount of CO adsorbed and the amount of the rhodium supported is 20 to 50%, the amount of CO adsorbed being measured by the low-temperature CO pulse measurement method under a temperature condition of −78° C.

EXAMPLES

Hereinafter, the present invention will be described more specifically on the basis of Examples and Comparative Examples. However, the present invention is not limited to Examples below.

Example 1

First, a rhodium-containing liquid was prepared by dissolving 48.6 mg of rhodium hexanoate binuclear complex (Aldrich, 481173, compositional formula: [$Rh_2(C_5H_{11}$—$CO_2)_4$]) into 1 L of toluene. Next, a liquid mixture was obtained by adding 10 g of γ-alumina ("AKP-G015" manufactured by Sumitomo Chemical Co., Ltd, specific surface area: 159 $m^2/g$) to the rhodium-containing liquid. Subsequently, the obtained liquid mixture was stirred under a temperature condition of 30° C. for 12 hours. Then, a powder was collected from the liquid mixture by filtration. Thereafter, the powder was calcined in the atmosphere under a temperature condition of 500° C. for 3 hours. Thus, a catalyst for purification of automobile exhaust gas, that rhodium was supported on γ-alumina, was obtained. Note that the amount of rhodium supported in the obtained catalyst for purification of automobile exhaust gas was analyzed by ICP (high-frequency inductively coupled plasma analysis: an analyzer manufactured by Rigaku Corporation under the product name of "ICP analyzer, model CIROS-120" was used, wavelength of measurement: 343.489 nm). Table 1 shows the value thereof.

<Measurement with Scanning Transmission Electron Microscope Equipped with Spherical Aberration Corrector (CS-STEM)>

Figure 7:
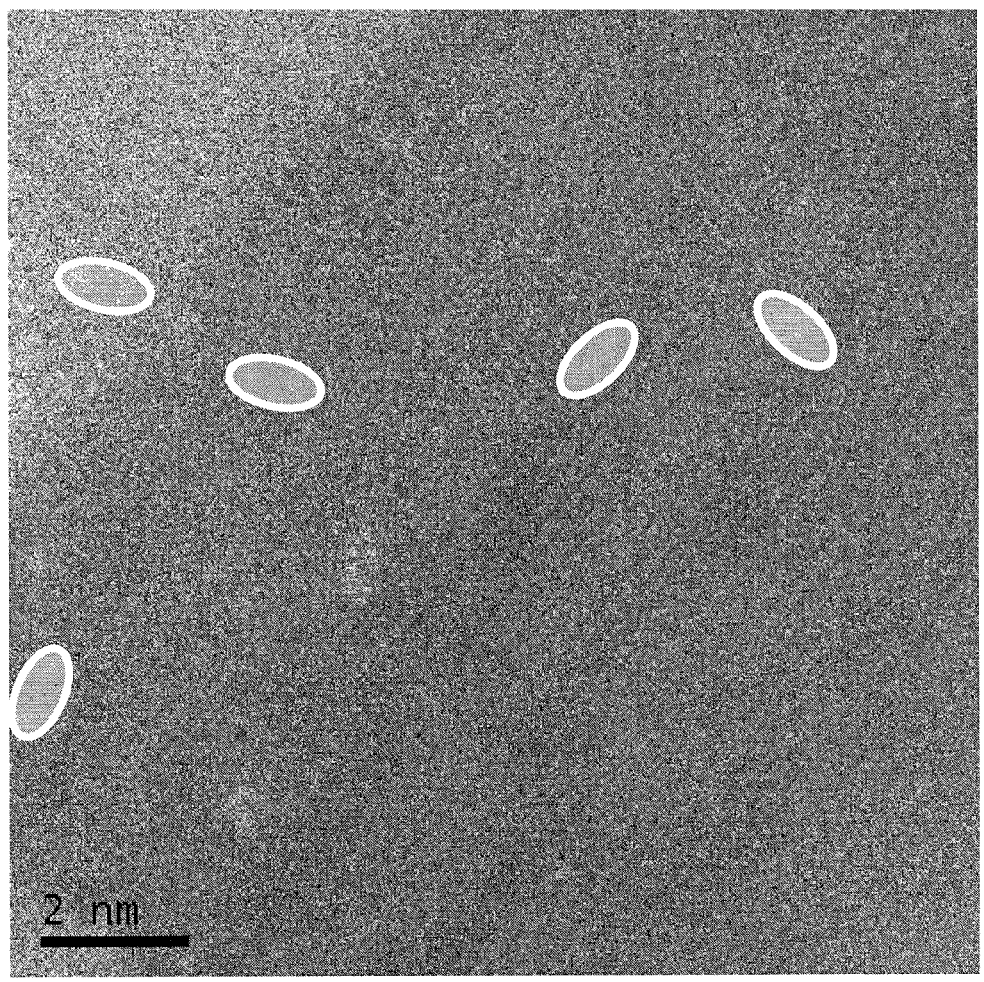
FIG. 7 is a scanning transmission electron microscope photograph (a STEM image) of a region on a support of a powdery catalyst for purification of automobile exhaust gas obtained in Example 1, the region being selected at random and having dimensions of 12 nm in length and 12 nm in width.

A region of 12 nm in length and 12 nm in width in the powder of the catalyst for purification of automobile exhaust gas obtained in Example 1 was observed by a scanning transmission electron microscope (manufactured by JEOL Ltd., under the product name of "JEM-2100F"). FIG. 7 shows a STEM photograph obtained by the observation.

As is apparent from the result shown in FIG. 7, it was found that multiple two-atom clusters made of rhodium atoms were dispersedly supported on the support in the catalyst for purification of automobile exhaust gas obtained in Example 1. In addition, regarding rhodium supported on the support of the catalyst for purification of automobile exhaust gas obtained in Example 1, it was found from the results shown in FIG. 7 that 70 at. % of all rhodium atoms were supported as two-atom clusters (note that, in FIG. 7, rhodium was present as two-atom clusters in each region surrounded by a white circle).

Moreover, as is apparent from the results shown in FIG. 7, in the catalyst for purification of automobile exhaust gas of the present invention (Example 1), the distances between adjacent ones of the two-atom clusters determined from the STEM image were each 1.0 nm or more. In addition, in the catalyst for purification of automobile exhaust gas of the present invention (Example 1), it was found on the basis of the STEM image that the "average distance between adjacent ones of the two-atom clusters (an average value of distances between adjacent ones of the two-atom clusters in view of five two-atom clusters was employed in each of Examples and Comparative Examples)" was 1 nm or more, and it was found that the value of the average distance was 2 nm. Note that it is predictable that each "distance between adjacent ones of the two-atom clusters" determined from the STEM image can be substantially equal to the molecular size (1.8 nm) of the rhodium carboxylate (the rhodium hexanoate binuclear complex) used for supporting the rhodium on the support (refer to FIG. 2). It was found that the actual value of the "average distance between adjacent ones of the two-atom clusters" was 2 nm, and substantially equal to the molecular size of the rhodium carboxylate (the rhodium hexanoate binuclear complex) used. These results shows that the method for manufacturing a catalyst for purification of automobile exhaust gas of the present invention (Example 1) makes it possible to control the average distance between adjacent ones of two-atom clusters by the molecular size of the rhodium carboxylate used for the supporting.

<Measurement of First Degree of Dispersion of Rhodium>

[I] Preparation of Sample

A powder (2.0 g) of the catalyst for purification of automobile exhaust gas obtained in Example 1 was used. The powder was shaped by a cold isostatic pressing method (CIP: 1000 $kg/cm^2$) for 1 minute, and then ground into pellets each having a diameter of 0.5 to 1 mm. Thus, a sample was prepared. Note that the sample was placed in a region (a midway portion) of a gas tube for testing having an inner diameter of 1.1 cm and a length of 100 cm. The region had a length of 54.5 cm from the upstream side to the downstream side of a gas flow passing through the gas tube.

[II] Durability Test (A)

By using the above-described sample, the following durability test was performed. Specifically, first, a rich gas and a lean gas were alternately supplied to the sample for 50 hours, while being switched to each other at intervals of 5 minutes. The rich gas was made of $H_2$ (2% by volume), $CO_2$ (10% by volume), $H_2O$ (3% by volume), and $N_2$ (the balance). The lean gas was made of $O_2$ (1% by volume), $CO_2$ (10% by volume), $H_2O$ (3% by volume), and $N_2$ (the balance). Note that the rich gas and the lean gas were supplied under a condition of a temperature of 1000° C. so that each gas passed at 500 mL/min per 2 g of the catalyst.

[III] Measurement of Amount of CO Adsorbed by CO-Pulse Measurement Method under Temperature Condition of 50° C.

Three levels of 0.03 g, 0.04 g, and 0.05 g of the sample after the durability test (A) were weighed out to prepare samples. Each of the samples was placed at a midway portion inside a measuring tube of a fully automated noble metal dispersiveness measuring apparatus (manufactured by OHKURA RIKEN CO., LTD. under the product name of "R6015"). Thereafter, the atmosphere inside the measuring tube of each of the fully automated noble metal dispersiveness measuring apparatuses was changed to a gas atmosphere of $O_2$ (100% by volume). Then, under the gas atmosphere of $O_2$ (100% by volume), the temperature was raised to 400° C. over 40 minutes, and then held for 15 minutes. Next, the gas atmosphere inside the measuring tube was changed to a gas atmosphere of He (100% by volume), and then held at 400° C. for 40 minutes. Subsequently, the gas atmosphere inside the measuring tube was changed to a gas atmosphere of $H_2$ (100% by volume), and then held at 400° C. for 15 minutes. Thereafter, the gas atmosphere was further changed to a gas atmosphere of He (100% by volume), and held at 400° C. for 15 minutes. While the gas atmosphere of He (100% by volume) was kept, natural cooling was performed to 50° C. Thereafter, CO was pulsed to each sample of the catalyst for purification of exhaust gas at 1.0 μmol/pulse under the gas atmosphere of He (100% by volume) with the temperature being kept at 50° C., until the adsorption was saturated. Then, an amount of CO which was included in the pulses but which did not adsorb onto the catalyst was detected, by use of a thermal conductivity detector. Then the amount of CO adsorbed by each sample was determined from the number of times of pulse and the TCD area at the time of saturation of the adsorption. Then, a first amount of CO adsorbed was determined by calculating the average value of amounts of CO adsorbed by the samples.

[IV] Calculation of First Degree of Dispersion of Rh

The first dispersion of rhodium was determined by a calculation from the thus obtained first amount of CO adsorbed and the amount of rhodium (Rh) supported which was measured by the ICP analysis by using the following equation:

[First dispersion of Rh (%)]=([First amount of CO adsorbed (mol)]/[Amount of Rh supported (mol)])×100.

Figure 8:
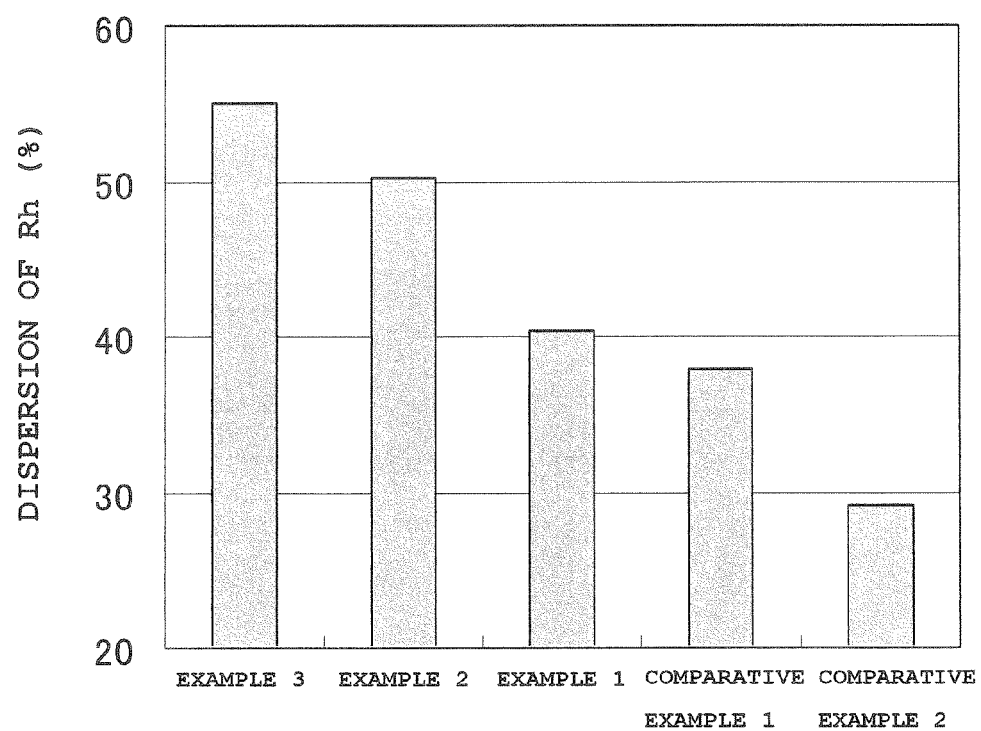
FIG. 8 is a graph showing a first dispersion of rhodium in a catalyst for purification of automobile exhaust gas obtained in each of Examples 1 to 3 and Comparative Examples 1 and 2.

The thus measured first dispersion of rhodium was 40%. Table 1 and FIG. 8 show the obtained result.

Example 2

A catalyst for purification of automobile exhaust gas, that rhodium was supported on γ-alumina, was obtained in a similar manner to that in Example 1, except that 56.8 mg of a rhodium octanoate binuclear complex (Aldrich, 442100, compositional formula: $[Rh_2(C_7H_{15}-CO_2)_4]$) was used in place of the rhodium hexanoate binuclear complex. Note that the amount of rhodium supported in the obtained catalyst for purification of automobile exhaust gas was analyzed by ICP, and Table 1 shows the value thereof.

The catalyst for purification of automobile exhaust gas thus obtained in Example 2 was subjected to a measurement similar to that in Example 1 by using a scanning transmission electron microscope equipped with a spherical aberration corrector (Cs-STEM). This measurement showed that 80 at. % of all rhodium atoms was supported as two-atom clusters. Meanwhile, the "average distance between adjacent ones of the two-atom clusters" was determined from the obtained STEM image. It was found that the average distance was 1 nm or more, that is, the value thereof was 2.5 nm. The results showed that the average distance between adjacent ones of the two-atom clusters was substantially equal to the molecular size of the rhodium carboxylate used at the time of the supporting (the molecular size of the rhodium octanoate binuclear complex: 2.3 nm). Here, considering both such a result observed in Example 2 and such a result observed in Example 1 in combination, it can be understood that the average distance between adjacent ones of the two-atom clusters can be controlled by the molecular size of the rhodium carboxylate used at the time of supporting the rhodium. Meanwhile, the first dispersion of rhodium in the catalyst for purification of automobile exhaust gas obtained in Example 2 was determined in a similar manner to that in Example 1. As a result, the first dispersion of rhodium was 50%. Table 1 and FIG. 8 show the obtained result.

Example 3

A catalyst for purification of automobile exhaust gas, that rhodium was supported on γ-alumina, was obtained in a similar manner to that in Example 1, except that 90.6 mg of a rhodium lauryl glycol carboxylate binuclear complex (compositional formula: $Rh_2(C_{10}H_{21}-CH(OH)-CH_2O-CH_2CO_2)_4$) was used in place of the rhodium hexanoate binuclear complex, and moreover that 1 L of ion-exchanged water was used in place of 1 L of toluene. Note that the amount of rhodium supported in the obtained catalyst for purification of automobile exhaust gas was analyzed by ICP, and Table 1 shows the value thereof.

The catalyst for purification of automobile exhaust gas thus obtained in Example 3 was subjected to a measurement similar to that in Example 1 by using a scanning transmission electron microscope equipped with a spherical aberration corrector (Cs-STEM). This measurement showed that 85 at. % of all rhodium atoms were supported as two-atom clusters. Meanwhile, the "average distance between adjacent ones of the two-atom clusters" was determined from the obtained STEM image. It was found that the average distance was 1 nm or more, that is, the value thereof was 2.8 nm. The results showed that the use of the rhodium carboxylate (the rhodium lauryl glycol carboxylate binuclear complex) represented by the general formula (2) enabled the average distance between adjacent ones of the two-atom clusters to be 1 nm or more. Moreover, the first dispersion of rhodium of the catalyst for purification of automobile exhaust gas obtained in Example 3 was determined in a similar manner to that in Example 1. As a result, the dispersion was 55%. Table 1 and FIG. 8 show the obtained result. In addition, it was found from the result that when the rhodium carboxylate (the rhodium lauryl glycol carboxylate binuclear complex) represented by the general formula (2) was used, a sufficient amount of rhodium can be supported in a sufficiently highly dispersed state even in a case where a water-based solvent was used.

Comparative Example 1

A catalyst for purification of automobile exhaust gas for comparison, that rhodium was supported on γ-alumina, was obtained in a similar manner to that in Example 1, except that 35.1 mg of a rhodium acetate binuclear complex (Wako Pure Chemical Industries, Ltd., 186-01153 compositional formula: $[Rh_2(CH_3-CO_2)_4]$) was used in place of the rhodium hexanoate binuclear complex, and moreover that 1 L of acetone was used in place of 1 L of toluene. Note that the amount of rhodium supported in the obtained catalyst for purification of automobile exhaust gas was analyzed by ICP, and Table 1 shows the value thereof.

In addition, the catalyst for purification of automobile exhaust gas thus obtained in Comparative Example 1 was subjected to a measurement similar to that in Example 1 by using a scanning transmission electron microscope equipped with a spherical aberration corrector (Cs-STEM). This measurement showed that 60 at. % of all rhodium atoms were supported as two-atom clusters. In addition, it was found from the obtained STEM image that the "average distance between adjacent ones of the two-atom clusters" in the catalyst for purification of automobile exhaust gas obtained in Comparative Example 1 was less than 1 nm, and it was found that the value thereof was 0.7 nm. Considering such results, it is assumed that the distance between adjacent ones of the two-atom clusters in Comparative Example 1 became less than 1 nm because the rhodium acetate binuclear complex used for supporting rhodium on the support in Comparative Example 1 had a molecular size of 0.9 nm, which was smaller than that of the rhodium hexanoate binuclear complex used in Example 1. Meanwhile, the first dispersion of rhodium of the catalyst for purification of automobile exhaust gas obtained in Comparative Example 1 was determined in a similar manner to that in Example 1. As a result, the first dispersion of rhodium was 38%. Table 1 and FIG. 8 show the obtained result.

Comparative Example 2

A catalyst for purification of automobile exhaust gas for comparison, that rhodium was supported on γ-alumina, was obtained in a similar manner to that in Example 1, except that 545.5 mg of a rhodium nitrate solution (containing 2.75% by weight of Rh metal) was used in place of the rhodium hexanoate binuclear complex, and moreover that 1 L of ion-exchanged water was used in place of 1 L of toluene. Note that the amount of rhodium supported in the obtained catalyst for purification of automobile exhaust gas was analyzed by TCP. Table 1 shows the value thereof.

The catalyst for purification of automobile exhaust gas thus obtained in Comparative Example 2 was subjected to a measurement similar to that in Example 1 by using a scanning transmission electron microscope equipped with a spherical aberration corrector (Cs-STEM). From this measurement, it was found that some of the rhodium atoms were dispersed as individual atoms, but some of the rhodium atoms were supported as clusters. Moreover, it was found that the number of atoms in these clusters was not fixed, and, for example, cluster made of several tens of rhodium atoms was also present. Furthermore, rhodium supported as two-atom cluster was less than 50 at. % of all rhodium atoms (7 at. %). In addition, it was found from the obtained STEM image that the "average distance between adjacent ones of the two-atom clusters" in the catalyst for purification of automobile exhaust gas obtained in Comparative Example 2 was less than 1 nm, and that the value thereof was 0.5 nm. Meanwhile, the first dispersion of rhodium of the catalyst for purification of automobile exhaust gas obtained in Comparative Example 2 was determined in a similar manner to that in Example 1. As a result, the first dispersion of rhodium was 29%. Table 1 and FIG. 8 show the obtained result.

[Evaluation of Performances of Catalysts for Purification of Automobile Exhaust Gas Obtained in Examples 1 to 3 and Comparative Examples 1 and 2]
<Evaluation Test of NO Purification Ratio>

First, samples were prepared as follows. The catalysts for purification of automobile exhaust gas obtained in Examples 1 to 3 and Comparative Examples 1 and 2 were used. By employing methods similar to the method described in "[I] Preparation of Sample" and the method described in "[II] Durability Test (A)" in the above-described measurement for the first dispersion of rhodium, a sample was prepared from each catalyst, and then, the sample was subjected to the durability test (A). Thereafter, only a pellet-shaped catalyst was taken out from the gas tube.

Figure 9:
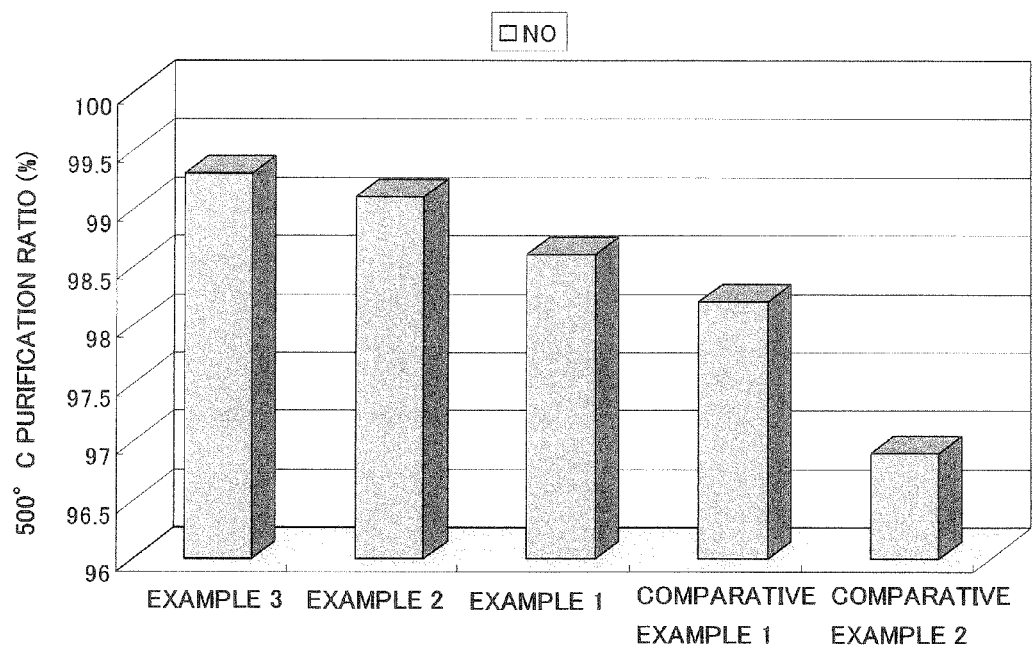
FIG. 9 is a graph showing a NO purification ratio of the catalyst for purification of automobile exhaust gas obtained in each of Examples 1 to 3 and Comparative Examples 1 and 2.

Next, by using the sample (the pellet-shaped catalyst) thus obtained after the durability test, the NO purification ratio achieved by the catalyst for purification of automobile exhaust gas obtained in each of Examples 1 to 3 and Comparative Examples 1 and 2 was evaluated. Specifically, first, the sample after the durability test was placed in a normal pressure fixed bed flow type reactor (manufactured by BEST INSTRUMENTS CO., Ltd.)). Next, a model gas made of CO (0.6998% by volume), $H_2$ (0.23% by volume), NO (0.12% by volume), $C_3H_6$ (0.16% by volume), $O_2$ (0.646% by volume), $CO_2$ (10% by volume), $H_2O$ (5% by volume), and $N_2$ (the balance) was supplied at a gas flow rate of 3500 mL/min. The temperature of gas entering the catalyst was adjusted to 100° C., and then the NO concentration in the gas entering the catalyst was measured. Thereafter, the temperature of the gas entering the catalyst was raised to 500° C. at a rate of temperature rise of 15° C./min, and the NO concentration in gas exiting from the catalyst was measured. From the difference between the measured value for the gas entering the catalyst and the measured value for the gas exiting from the catalyst, the NO purification ratio achieved by the catalyst for purification of automobile exhaust gas at the time when the temperature of the entering gas reached 500° C. was calculated. FIG. 9 shows the obtained results.

TABLE 1

| | Kind of rhodium carboxylate | Support | Solvent | Amount of rhodium supported (% by mass) | Ratio of two-atom clusters present (at %) | Dispersion of rhodium (%) | Average distance between adjacent ones of two-atom clusters (nm) |
|---|---|---|---|---|---|---|---|
| Example 1 | $Rh_2(C_5H_{11}-COO)_4$ | γ-Alumina | Toluene | 0.15 | 70 | 40 | 2.0 |
| Example 2 | $Rh_2(C_7H_{15}-COO)_4$ | γ-Alumina | Toluene | 0.14 | 80 | 50 | 2.5 |
| Example 3 | $Rh_2(C_{10}H_{21}-CH(OH)-CH_2O-CH_2CO_2)_4$ | γ-Alumina | Water | 0.15 | 85 | 55 | 2.8 |
| Comparative Example 1 | $Rh_2(CH_3-COO)_4$ | γ-Alumina | Acetone | 0.14 | 60 | 38 | 0.7 |
| Comparative Example 2 | Rhodium nitrate | γ-Alumina | Water | 0.15 | 7 | 29 | 0.5 |

Figure 5:
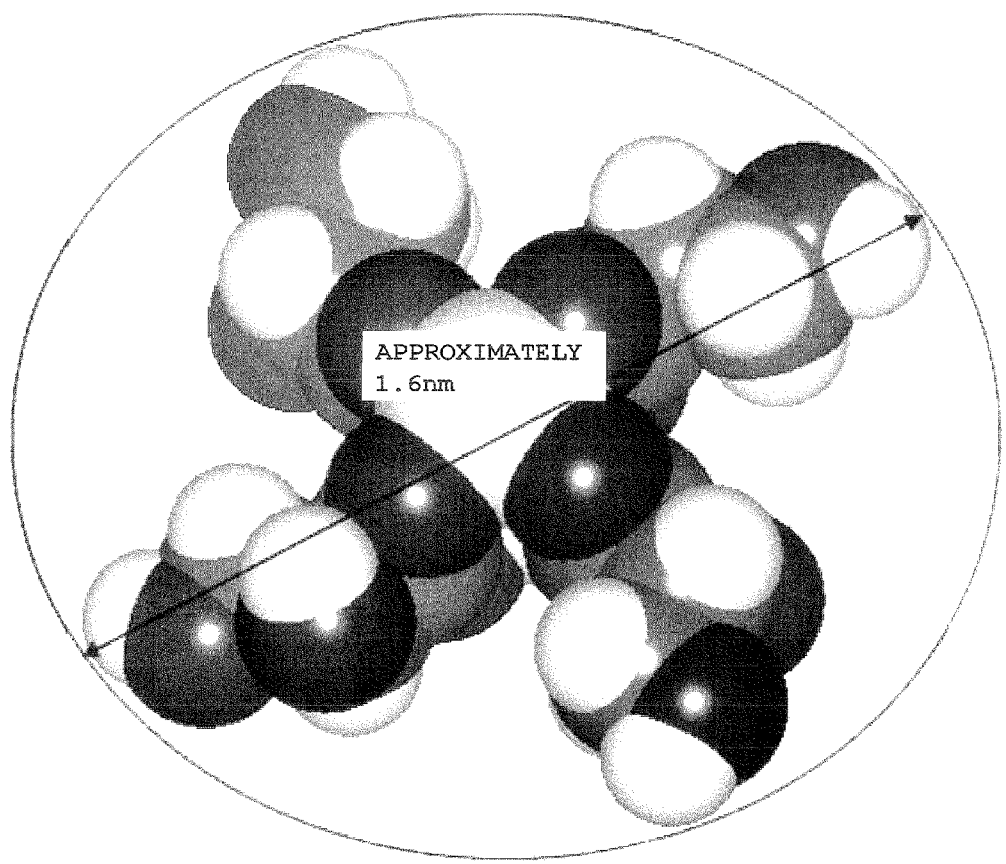
FIG. 5 is a schematic diagram showing a molecular model of $Rh_2(HO-CH_2-CH(OH)-COO)_4$, which is a kind of rhodium carboxylate, the molecular model being determined by a molecular orbital method with a van der Waals radius taken into consideration.

From the above-described results of the Cs-STEM measurement and the results shown in Table 1 and FIG. 5, it was found that a catalyst in which 50 at. % or more of all rhodium atoms supported on the support were supported as two-atom clusters, and in which the "average distance between adjacent ones of the two-atom clusters" was 1.0 nm or more can be obtained by each of the methods for manufacturing a catalyst for purification of automobile exhaust gas of the present invention (Examples 1 to 3). In addition, it was also found that a catalyst in which the first dispersion of rhodium was 40% or more can be obtained by each of the methods for manufacturing a catalyst for purification of automobile exhaust gas of the present invention (Examples 1 to 3).

As is apparent from the results shown in FIG. 9, it was found that each of the catalysts for purification of exhaust gas of the present invention (Examples 1 to 3) had a higher NO purification ratio than the catalysts for purification of exhaust gas for comparison (Comparative Examples 1 and 2), and had a sufficiently high catalytic activity.

Example 4

A catalyst for purification of automobile exhaust gas, that rhodium was supported on Nd-AZL, was obtained in a similar manner to that in Example 1, except that 10 g of Nd-AZL (composition of Nd-AZL: $Nd_2O_3$ (2% by mass)/AZL (98% by mass), composition of AZL: $Al_2O_3$ (200 mol)/$ZrO_2$ (95 mol)/$La_2O_3$ (2.5 mol), specific surface area: 105 m$^2$/g, average particle diameter: 60 μm) was used in place of the γ-alumina. Note that the amount of rhodium supported in the obtained catalyst for purification of automobile exhaust gas was analyzed by ICP, and Table 2 shows the value thereof.

The catalyst for purification of automobile exhaust gas thus obtained in Example 4 was subjected to a measurement similar to that in Example 1 by using a scanning transmission electron microscope equipped with a spherical aberration corrector (Cs-STEM). This measurement showed that 60 at. % of all rhodium atoms were supported as two-atom clusters. In addition, it was found from the obtained STEM image that the "average distance between adjacent ones of the two-atom clusters" was 1 nm or more, and it was found that the value thereof was 2 nm. These results showed that the distance between adjacent ones of the two-atom clusters was substantially equal to the molecular size (1.8 nm) of the rhodium carboxylate used at the time of the supporting. Meanwhile, the first dispersion of rhodium of the catalyst for purification of automobile exhaust gas obtained in Example 4 was determined in a similar manner to that in Example 1. As a result, the first dispersion of rhodium was 67%. Table 2 shows the obtained result.

Comparative Example 3

A catalyst for purification of automobile exhaust gas for comparison, that rhodium was supported on Nd-AZL, was obtained in a similar manner to that in Comparative Example 2, except that 10 g of Nd-AZL (the same Nd-AZL as that used in Example 4) was used in place of the γ-alumina. Note that the amount of rhodium supported in the obtained catalyst for purification of automobile exhaust gas was analyzed by ICP, and Table 2 shows the value thereof.

The catalyst for purification of automobile exhaust gas thus obtained in Comparative Example 3 was subjected to a measurement similar to that in Example 1 by using a scanning transmission electron microscope equipped with a spherical aberration corrector (Cs-STEM). From this measurement, it was found that some of the rhodium atoms were dispersed as individual atoms, but some of the rhodium atoms were supported as clusters. Moreover, it was found that the number of atoms in these clusters was not fixed, and cluster made of, for example, several tens of rhodium atoms was also present. Furthermore, rhodium supported as two-atom clusters was 7 at. % of all rhodium atoms. In addition, it was found from the obtained STEM image that the "average distance between adjacent ones of the two-atom clusters" in the catalyst for purification of automobile exhaust gas obtained in Comparative Example 3 was less than 1 nm, and that the value thereof was 0.5 nm. Meanwhile, the first dispersion of rhodium of the catalyst for purification of automobile exhaust gas obtained in Comparative Example 3 was determined in a similar manner to that in Example 1. As a result, the first dispersion of rhodium was 32%. Table 2 shows the obtained result.

Comparative Example 4

A catalyst for purification of automobile exhaust gas for comparison, that rhodium was supported on Nd-AZL was obtained in a similar manner to that in Comparative Example 3, except that the amount of the rhodium nitrate solution (containing 2.75% by weight of Rh metal) used was changed from 545.5 mg to 182 mg. Note that the amount of rhodium supported in the obtained catalyst for purification of automobile exhaust gas was analyzed by ICP, and table 2 shows the value thereof.

The catalyst for purification of automobile exhaust gas obtained in Comparative Example 4 was subjected to a measurement similar to that in Example 1 by using a scanning transmission electron microscope equipped with a spherical aberration corrector (Cs-STEM). From this measurement, it was found that some of the rhodium atoms were dispersed as individual atoms, but some of the rhodium atoms were supported as clusters. Moreover, it was found that the number of atoms in these clusters was not fixed, and cluster made of, for example, several tens of rhodium atoms was also present. Furthermore, rhodium supported as two-atom clusters was 10 at. % of all rhodium atoms. In addition, it was found from the obtained STEM image that the "average distance between adjacent ones of the two-atom clusters" in the catalyst for purification of automobile exhaust gas obtained in Comparative Example 4 was less than 1 nm, and that the value thereof was 0.7 nm. Meanwhile, the first dispersion of rhodium of the catalyst for purification of automobile exhaust gas obtained in Comparative Example 4 was determined in a similar manner to that in Example 1. As a result, the first dispersion of rhodium was 22%. Table 2 shows the result.

Comparative Example 5

A catalyst for purification of automobile exhaust gas for comparison, that rhodium was supported on Nd-AZL, was obtained in a similar manner to that in Comparative Example 3, except that the amount of the rhodium nitrate solution (containing 2.75% by weight of Rh meta) used was changed from 545.5 mg to 727 mg. Note that the amount of rhodium supported in the obtained catalyst for purification of automobile exhaust gas was analyzed by ICP, and Table 2 shows the value thereof.

The catalyst for purification of automobile exhaust gas thus obtained in Comparative Example 5 was subjected to a measurement similar to that in Example 1 by using a scanning transmission electron microscope equipped with a spherical aberration corrector (Cs-STEM). From this measurement, it was found that some of the rhodium atoms were dispersed as individual atoms, but some of the rhodium atoms were supported as clusters. Moreover, it was found that the number of atoms in these clusters was not fixed, and cluster made of, for example, several tens of rhodium atoms was also present. Furthermore, rhodium supported as two-atom clusters was 5 at. % of all rhodium atoms. In addition, it was found from the obtained STEM image that the "average distance between adjacent ones of the two-atom clusters" in the catalyst for purification of automobile exhaust gas obtained in Comparative Example 5 was less than 1 nm, and the value thereof was 0.4 nm. Meanwhile, the first dispersion of rhodium of the catalyst for purification of automobile exhaust gas obtained in Comparative Example 5 was determined in a similar manner to that in Example 1. As a result, the first dispersion of rhodium was 32%. Table 2 shows the result.

Comparative Example 6

A catalyst for purification of automobile exhaust gas for comparison, that rhodium was supported on Nd-AZL, was obtained in a similar manner to that in Comparative Example 3, except that the amount of the rhodium nitrate solution (containing 2.75%; by weight of Rh metal) used was changed from 545.5 mg to 909 mg. Note that the amount of rhodium supported in the obtained catalyst for purification of automobile exhaust gas was analyzed by ICP, and Table 2 shows the value thereof.

The catalyst for purification of automobile exhaust gas thus obtained in Comparative Example 6 was subjected to a measurement similar to that in Example 1 by using a scanning transmission electron microscope equipped with a spherical aberration corrector (Cs-STEM). From this measurement, it was found that some of the rhodium atoms were dispersed as individual atoms, but some of the rhodium atoms were supported as clusters. Moreover, it was found that the number of atoms in these clusters was not fixed, and cluster made of, for example, several tens of rhodium atoms was also present. Furthermore, rhodium supported as two-atom clusters was 3 at. % of all rhodium atoms. In addition, it was found from the obtained STEM image that the "average distance between adjacent ones of the two-atom clusters" in the catalyst for purification of automobile exhaust gas obtained in Comparative Example 6 was less than 1 nm, and that the value thereof was 0.3 nm. Meanwhile, the first dispersion of rhodium of the catalyst for purification of automobile exhaust gas obtained in Comparative Example 6 was determined in a similar manner to that in Example 1. As a result, the first dispersion of rhodium was 27%. Table 2 shows the result.

Comparative Example 7

A catalyst for purification of automobile exhaust gas for comparison, that rhodium was supported on Nd-AZL, was obtained in a similar manner to that in Comparative Example 3, except that 11.7 mg of a rhodium acetate binuclear complex (Wako Pure Chemical Industries, Ltd., 186-01153, compositional formula: $[Rh_2(CH_3—CO_2)_4]$) was used in place of 545.5 mg of the rhodium nitrate solution (containing 2.75% by weight of Rh metal), and that 1 L of acetone was used in place of 1 L of ion-exchanged water. Note that the amount of rhodium supported in the obtained catalyst for purification of automobile exhaust gas was analyzed by ICP, and Table 2 shows the value thereof.

The catalyst for purification of automobile exhaust gas thus obtained in Comparative Example 7 was subjected to a measurement similar to that in Example 1 by using a scanning transmission electron microscope equipped with a spherical aberration corrector (Cs-STEM). The measurement showed that 70 at. % of all rhodium atoms were supported two-atom clusters. In addition, it was found from the obtained STEM image that the "average distance between adjacent ones of the two-atom clusters" in the catalyst for purification of automobile exhaust gas obtained in Comparative Example 7 was less than 1 nm, and that the value thereof was 0.9 nm. Meanwhile, the first dispersion of rhodium of the catalyst for purification of automobile exhaust gas obtained in Comparative Example 7 was determined in a similar manner to that Example 1. As a result, the first dispersion of rhodium was 29%. Table 2 shows the result.

Comparative Example 8

A catalyst for purification of automobile exhaust gas for comparison, that rhodium was supported on Nd-AZL, was obtained in a similar manner to that in Comparative Example 3, except that 46.8 mg of a rhodium acetate binuclear complex (Wako Pure Chemical Industries, Ltd., 186-01153, compositional formula: $[Rh_2(CH_3—CO_2)_4]$) was used in place of 545.5 mg of the rhodium nitrate solution (containing 2.75% by weight of Rh metal), and that 1 L of acetone was used in place of 1 L of ion-exchanged water. Note that the amount of rhodium supported in the obtained catalyst for purification of automobile exhaust gas was analyzed by ICP, and Table 2 shows the value thereof.

The catalyst for purification of automobile exhaust gas thus obtained in Comparative Example 8 was subjected to a measurement similar to that in Example 1 by using a scanning transmission electron microscope equipped with a spherical aberration corrector (Cs-STEM). The measurement showed that 55 at. % of all rhodium atoms were supported as two-atom clusters. In addition, it was found from the obtained STEM image that the "average distance between adjacent ones of the two-atom clusters" in the catalyst for purification of automobile exhaust gas obtained in Comparative Example 8 was less than 1 nm, and that the value thereof was 0.6 nm. Meanwhile, the first dispersion of rhodium of the catalyst for purification of automobile exhaust gas obtained in Comparative Example 8 was determined in a similar manner to that in Example 1. As a result, the first dispersion of rhodium was 32%. Table 2 shows the result.

Comparative Example 9

A catalyst for purification of automobile exhaust gas for comparison, that rhodium was supported on Nd-AZL, was obtained in a similar manner to that in Comparative Example 3, except that 58.5 mg of a rhodium acetate binuclear complex (Wako Pure Chemical Industries, Ltd., 186-01153, compositional formula: $[Rh_2(CH_3—CO_2)_4]$) was used in place of 545.5 mg of the rhodium nitrate solution (containing 2.75% by weight of Rh metal), and that 1 L of acetone was used in place of 1 L of ion-exchanged water. Note that the amount of rhodium supported in the obtained catalyst for purification of automobile exhaust gas was analyzed by ICP, and Table 2 shows the value thereof.

The catalyst for purification of automobile exhaust gas thus obtained in Comparative Example 9 was subjected to a measurement similar to that in Example 1 by using a scanning transmission electron microscope equipped with a spherical aberration corrector (Cs-STEM). The measurement showed that 50 at. % of all rhodium atoms were supported as two-atom clusters. In addition, it was found from the obtained STEM image that the "average distance between adjacent ones of the two-atom clusters" in the catalyst for purification of automobile exhaust gas obtained in Comparative Example 9 was less than 1 nm, and that the value thereof was 0.5 nm. Meanwhile, the first dispersion of rhodium of the catalyst for purification of automobile exhaust gas obtained in Comparative Example 9 was determined in a similar manner to that in Example 1. As a result, the first dispersion of rhodium was 25%. Table 2 shows the results.

TABLE 2

| | Kind of rhodium carboxylate | Support | Solvent | Amount of rhodium supported (% by mass) | Ratio of two-atom clusters present (at %) | Dispersion of rhodium (%) | Average distance between adjacent ones of two-atom clusters (nm) |
|---|---|---|---|---|---|---|---|
| Example 4 | $Rh_2(C_5H_{11}—COO)_4$ | Nd-AZL | Toluene | 0.16 | 60 | 67 | 2.0 |
| Comparative Example 3 | Rhodium nitrate | Nd-AZL | Water | 0.14 | 7 | 32 | 0.5 |
| Comparative Example 4 | Rhodium nitrate | Nd-AZL | Water | 0.05 | 10 | 22 | 0.7 |

TABLE 2-continued

|  | Kind of rhodium carboxylate | Support | Solvent | Amount of rhodium supported (% by mass) | Ratio of two-atom clusters present (at %) | Dispersion of rhodium (%) | Average distance between adjacent ones of two-atom clusters (nm) |
|---|---|---|---|---|---|---|---|
| Comparative Example 5 | Rhodium nitrate | Nd-AZL | Water | 0.20 | 5 | 32 | 0.4 |
| Comparative Example 6 | Rhodium nitrate | Nd-AZL | Water | 0.25 | 3 | 27 | 0.3 |
| Comparative Example 7 | $Rh_2(CH_3-COO)_4$ | Nd-AZL | Acetone | 0.05 | 70 | 29 | 0.9 |
| Comparative Example 8 | $Rh_2(CH_3-COO)_4$ | Nd-AZL | Acetone | 0.20 | 55 | 32 | 0.6 |
| Comparative Example 9 | $Rh_2(CH_3-COO)_4$ | Nd-AZL | Acetone | 0.25 | 50 | 25 | 0.5 |

As is apparent from the results shown in Table 2, it was found that rhodium was supported on the support at an extremely high dispersion (first dispersion of rhodium: 67%) by the method for manufacturing a catalyst for purification of automobile exhaust gas of the present invention (Example 4) in which the rhodium hexanoate binuclear complex was used at the time of supporting rhodium on the support (Nd-AZL). In contrast, in each of the cases (Comparative Examples 3 to 9) where the rhodium nitrate or the rhodium acetate binuclear complex was used at the time of supporting rhodium on the support (Nd-AZL), the first dispersion of rhodium was less than 40%, and the dispersiveness of rhodium can not be made sufficiently high. Especially in each of Comparative Examples 4 and 7, although the amount of Rh supported was made as low as 0.05% by weight, the dispersiveness of Rh was not successfully improved. It has been found from such results that, by using a rhodium carboxylate described in the general formula (1), it is possible to efficiently improve the dispersiveness of rhodium, and to prepare a catalyst for purification of automobile exhaust gas whose the first dispersion of rhodium is 40% or more.

Example 5

A catalyst for purification of automobile exhaust gas, that rhodium was supported on γ-alumina, was obtained in a similar manner to that in Example 1, except that the amount of the rhodium hexanoate binuclear complex used was changed from 48.6 mg to 1620 mg so that the theoretical amount of rhodium supported was 5.0% by mass in the catalyst for purification of automobile exhaust gas. Note that the amount of rhodium supported in the obtained catalyst for purification of automobile exhaust gas was analyzed by ICP, and Table 3 shows the value thereof.

The catalyst for purification of automobile exhaust gas thus obtained in Example 5 was subjected to a measurement similar to that in Example 1 by using a scanning transmission electron microscope equipped with a spherical aberration corrector (Cs-STEM). From this measurement, it was found that 50 at. % of all rhodium atoms were supported as two-atom clusters, and the "average distance between adjacent ones of the two-atom clusters" was 1 nm or more.

Example 6

A catalyst for purification of automobile exhaust gas, that rhodium was supported on γ-alumina, was obtained in a similar manner to that in Example 2, except that the amount of the rhodium octanoate binuclear complex used was changed from 56.8 mg to 1893 mg so that the theoretical amount of rhodium supported was 5.0% by mass in the catalyst for purification of automobile exhaust gas. Note that the amount of rhodium supported in the obtained catalyst for purification of automobile exhaust gas was analyzed by ICP, and Table 3 shows the value thereof.

The catalyst for purification of automobile exhaust gas thus obtained in Example 6 was subjected to a measurement similar to that in Example 1 by using a scanning transmission electron microscope equipped with a spherical aberration corrector (Cs-STEM). Thereby, it is found that 50 at. % of all rhodium atoms were supported as two-atom clusters, and the "average distance between adjacent ones of the two-atom clusters" was 1 nm or more.

TABLE 3

|  | Kind of rhodium carboxylate | Theoretical amount of rhodium supported (% by mass) | Amount of rhodium supported (% by mass) | Selectivity (%) |
|---|---|---|---|---|
| Example 5 | $Rh_2(C_5H_{11}-COO)_4$ | 5.0 | 2.11 | 42 |
| Example 6 | $Rh_2(C_7H_{15}-COO)_4$ | 5.0 | 1.67 | 33 |

Figure 3:
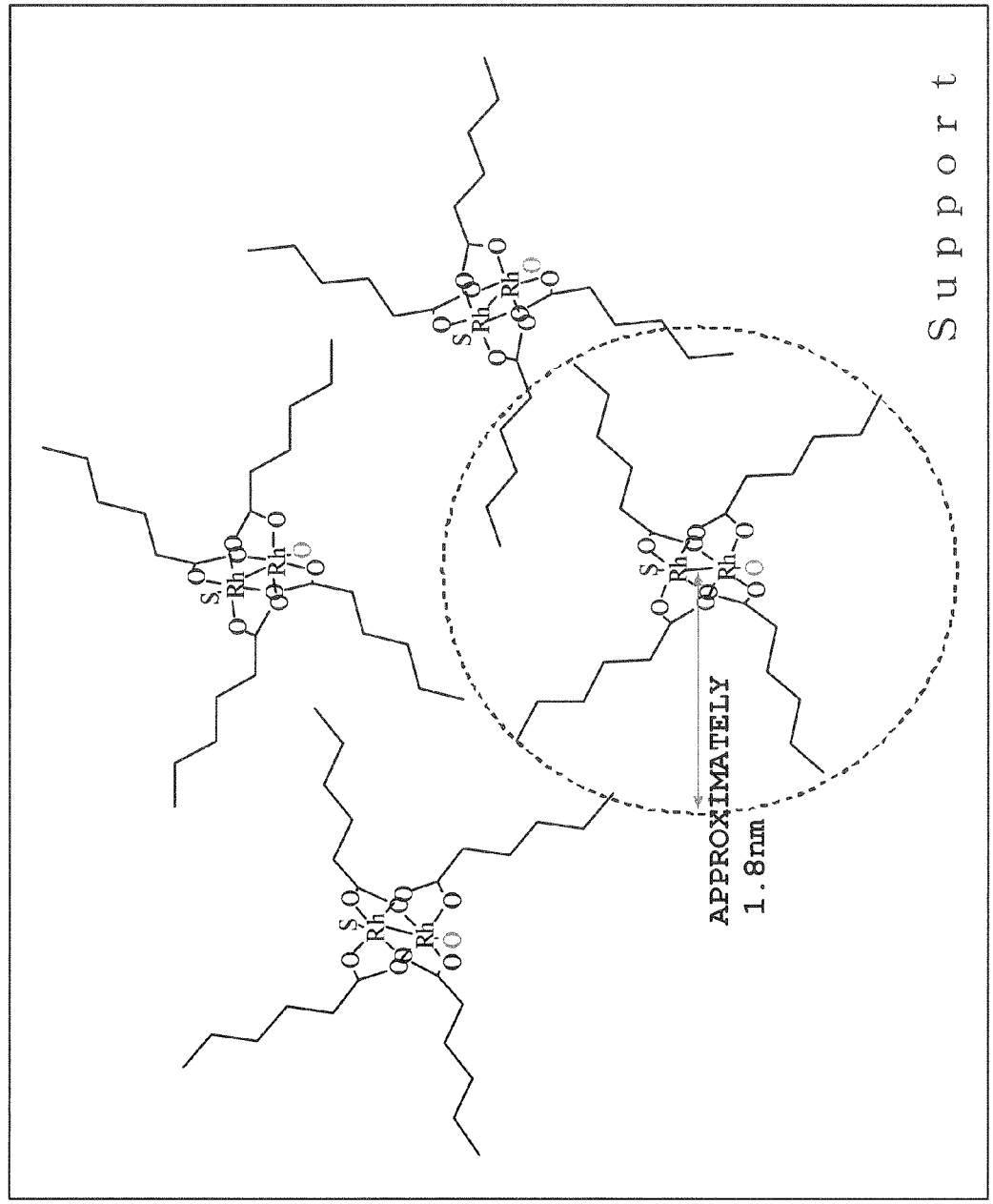
FIG. 3 is a second schematic diagram relating to the state of supporting of $Rh_2(C_5H_{11}COO)_4$, the second schematic diagram showing the state where $Rh_2(C_5H_{11}COO)_4$, which is a kind of rhodium carboxylate, is supported on the support.
Figure 4:
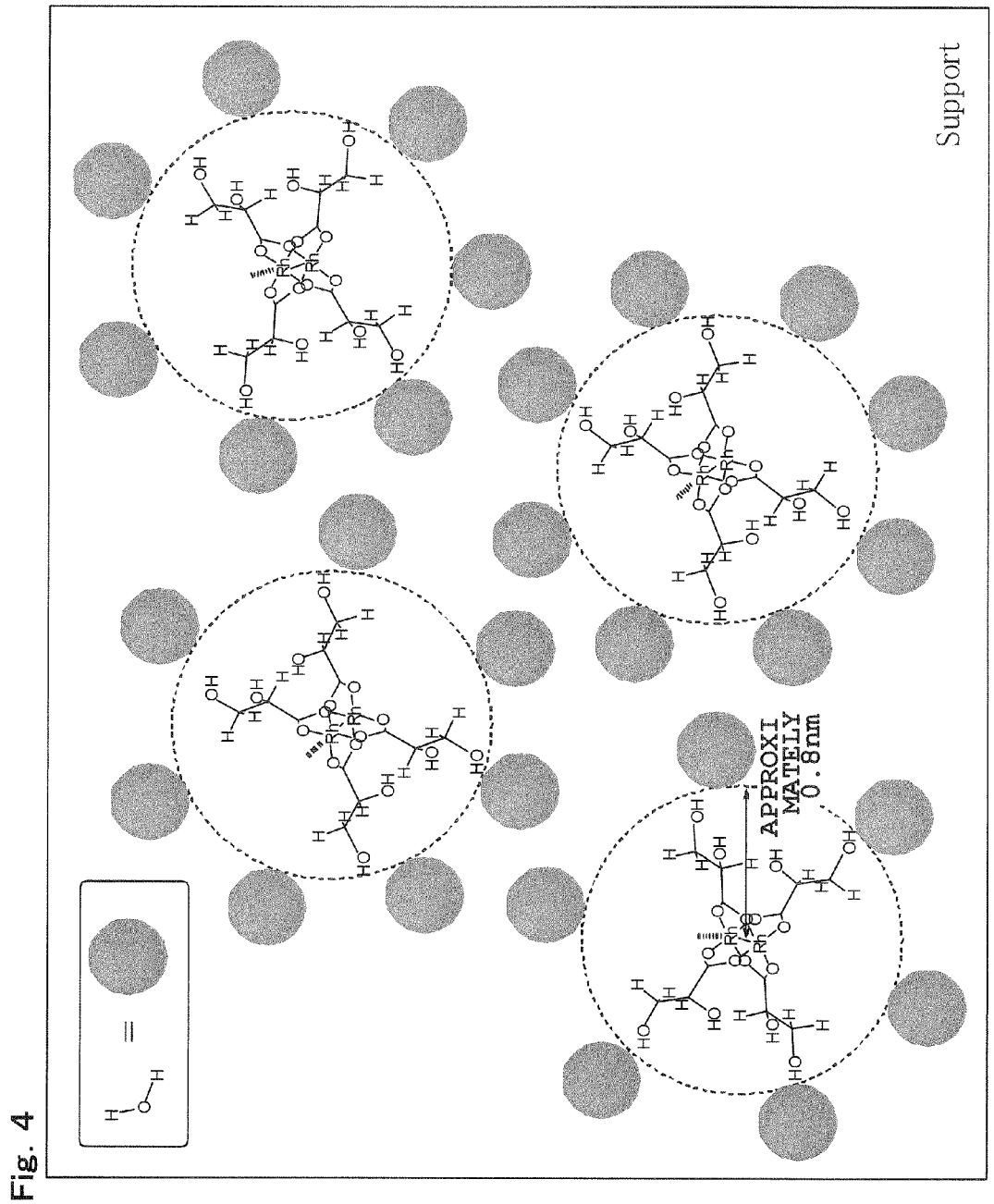
FIG. 4 is a second schematic diagram relating to the state of supporting of $Rh_2(HO-CH_2-CH(OH)-COO)_4$, the second schematic diagram showing the state where $Rh_2(HO-CH_2-CH(OH)-COO)_4$, which is a kind of rhodium carboxylate, is supported on the support.

As is apparent from the results shown in Table 3, it was found that when the rhodium hexanoate binuclear complex was used (Example 5), Rh was supported on γ-alumina (specific surface area: 159 m²/g) at 2.11% by mass. Meanwhile, when the rhodium octanoate binuclear complex was used (Example 6), Rh was supported on γ-alumina at 1.67% by mass. In addition, the selectivities were 42% (Example 5) and 33% (Example 6), respectively. Considering the point that the amount of rhodium supported varied because of the difference in the carbon number of the hydrocarbon group in the carboxylic acid ligand between a case where the hydrocarbon group was a hexyl group (Example 5) and a case where the hydrocarbon group was an octyl group (Example 6), it is assumed that the complex was first supported on the surface of the support, and covered the support as shown in FIG. 3, when the support was caused to be supported on the rhodium carboxylate. Moreover, it can be understood that when the complex is supported as described above, rhodium present in a nucleus of each molecule of the complex is supported in a state separated from rhodium present in nuclei of the other molecules of the complex because of the presence of the ligands. Since the complex was supported on the support as described above, it is assumed that the density of the supporting was lowered in the case where the hydrocarbon group in each carboxylic acid ligand was an octyl group (Example 6) in comparison with the case where the hydrocarbon group in each carboxylic acid ligand was a hexyl group (Example 5), due to a the excessive carbon number.

In addition, it can be understood from the above-described results obtained in Examples 1 to 4 that the distance between adjacent ones of the two-atom clusters of rhodium and the first dispersion of rhodium have a correlation with the size of the hydrocarbon group of the carboxylic acid ligand in the complex (the molecular size of the rhodium carboxylate). In addition, it was found from the above-described results that the methods for manufacturing a catalyst for purification of automobile exhaust gas of the present invention (Examples 1 to 4) were capable of efficiently and reliably manufacturing a catalyst in which rhodium in an atomic state was supported in a sufficiently highly dispersed state. Moreover, it was found that the catalyst for purification of automobile exhaust gas of the present invention obtainable by employing such a method had a sufficiently high catalytic activity because 50 at. % or more of rhodium was supported as two-atom clusters, and the average distance between the two-atom clusters was 1 nm or more. In addition, in each of the catalysts for purification of automobile exhaust gas obtained in Examples 1 to 4, the first dispersion of rhodium determined by performing the above-described CO-pulse measurement method under a temperature condition of 50° C. including the durability test was 40% or more. This showed that it was possible to keep the sufficiently highly dispersed state of the rhodium was able to even after a durability test.

Example 7

Figure 10:
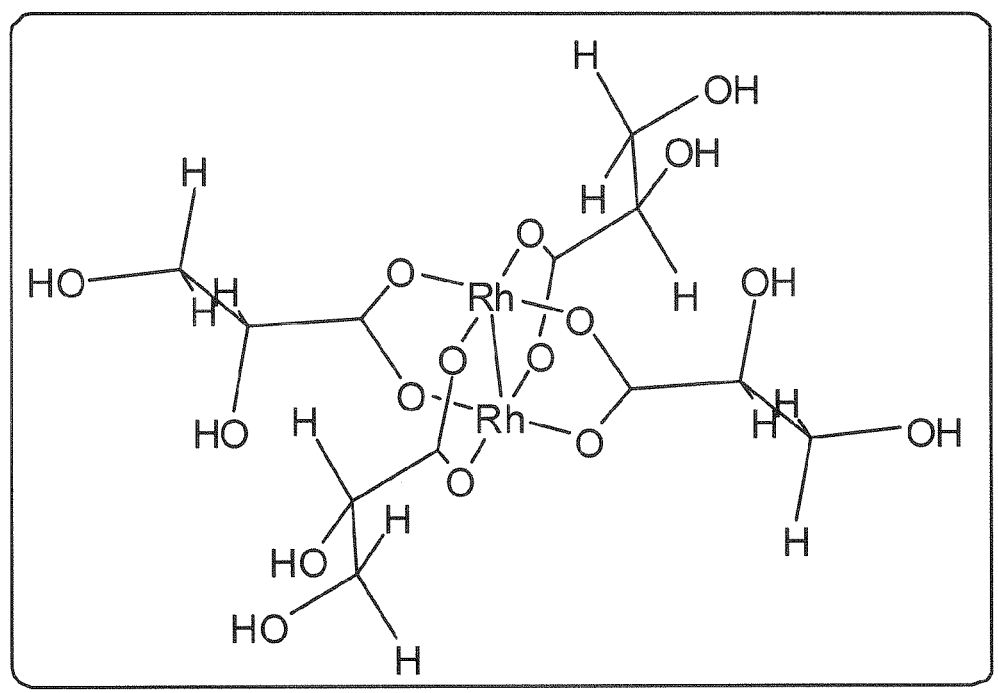
FIG. 10 is a chemical structural formula showing a structure of a rhodium carboxylate ($Rh_2(HO-CH_2-CH(OH)-COO)_4$), which is a precursor of a catalyst for purification of automobile exhaust gas obtained in Example 7.

First, 40.3 mg of rhodium(III) chloride trihydrate (Wako Pure Chemical Industries, Ltd., 181-00841, compositional formula: $RhCl_3.3H_2O$) was dissolved in 100 mL of ion-exchanged water. To the solution, DL-glyceric acid (Tokyo Chemical Industry Co., Ltd., D0602, 40% aqueous solution, ca. 5.2 mol/l) was added. After that, while the temperature of an oil bath was kept at 110° C. to 120° C., reflux was performed for 1 hour under an air atmosphere. Thereby, a rhodium-containing liquid containing a rhodium carboxylate: $Rh_2(HO-CH_2-CH(OH)-COO)_4$ shown in FIG. 10 was prepared. After the liquid was cooled to room temperature, 900 mL of ion-exchanged water was added thereto, and 1 L in total of a rhodium-containing liquid was prepared. Next, a liquid mixture was obtained by adding 10 g of an AZL support (composition: $Al_2O_3$ (200 mol)/$ZrO_2$ (95 mol)/$La_2O_3$ (2.5 mol), specific surface area: 110 $m^2$/g) to the rhodium-containing liquid. Subsequently, the obtained liquid mixture was stirred for 12 hours under a temperature condition of 30° C. Then, a powder was collected from the liquid mixture by filtration. Thereafter, the powder was calcined in the atmosphere under a temperature condition of 300° C. for 3 hours. Thus, a catalyst for purification of automobile exhaust gas, that rhodium was supported on the AZL support, was obtained. Note that the amount of rhodium supported in the obtained catalyst for purification of automobile exhaust gas was analyzed by ICP (high-frequency inductively coupled plasma analysis: an analyzer manufactured by Rigaku Corporation under the product name of "ICP analyzer model CIROS-120" was used, wavelength of measurement; 343.489 nm). Table 4 shows the value thereof.

Figure 11:
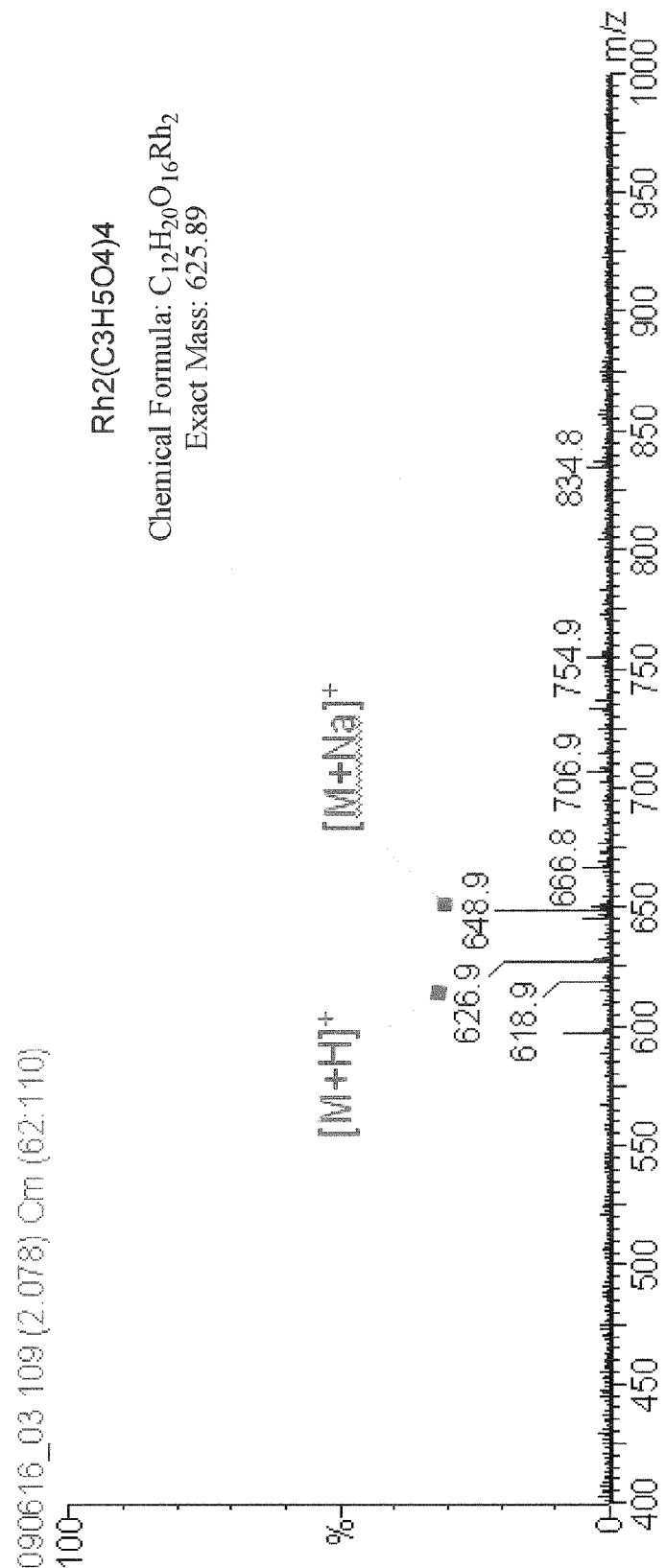
FIG. 11 is a graph showing results of mass spectrometry on $Rh_2(HO-CH_2-CH(OH)-COO)_4$, which is a kind of rhodium carboxylate and which is the precursor of the catalyst for purification of automobile exhaust gas obtained in Example 7.

Note that, before the addition of the AZL support, mass spectrometry was performed on the liquid containing the rhodium carboxylate (rhodium glycerate) by using an electrospray ionization mass spectrometer (ESI-MS, manufactured by Micro Mass). FIG. 11 shows the obtained results. As is apparent also from FIG. 11, it was found that the complex was present as a rhodium binuclear complex in the rhodium-containing liquid.

The catalyst for purification of automobile exhaust gas obtained in Example 7 was subjected to a measurement similar to that in Example 1 by using a scanning transmission electron microscope equipped with a spherical aberration corrector (Cs-STEM). FIG. 12 shows a STEM photograph obtained in this measurement.

As is apparent from the results shown in FIG. 12, it was found that multiple two-atom clusters of rhodium atoms were dispersedly supported on the support in the catalyst for purification of automobile exhaust gas obtained in Example 7. In addition, regarding rhodium supported on the support of the catalyst for purification of automobile exhaust gas obtained in Example 7, it was found from the results shown in FIG. 12 that 50 at. % of all rhodium atoms were supported as two-atom clusters. Note that, in FIG. 12, rhodium is present as two-atom clusters in the regions surrounded by white circles.

In addition, as is apparent from the results shown in FIG. 12, each distance between adjacent ones of the two-atom clusters measured from the STEM image was 1.5 nm or more in the catalyst for purification of automobile exhaust gas of the present invention (Example 7). Moreover, in the catalyst for purification of automobile exhaust gas of the present invention (Example 7), it was found on the basis of the STEM image that the average distance between adjacent ones of the two-atom clusters (an average value of distances between adjacent ones of the two-atom clusters in view of five two-atom clusters was employed in each of Examples and Comparative Examples) was 1.5 nm or more. Note that it is predictable that each "distance between adjacent ones of the two-atom clusters" determined from the STEM image can be substantially equal to the molecular size (1.6 nm) of the rhodium carboxylate (the rhodium glycerate binuclear complex) used for supporting rhodium on the support (refer to FIG. 5). However, it was found that the actual value of the "average distance between adjacent ones of the two-atom clusters" was 2 nm, which was greater than the molecular size of the rhodium carboxylate (rhodium glycerate binuclear complex) used. This was presumably because the rhodium carboxylate (the rhodium glycerate binuclear complex) used were hydrated with water molecules in therearound. From these results, it can be understood that, by the method for manufacturing a catalyst for purification of automobile exhaust gas of the present invention (Example 7), the average distance between adjacent ones of the two-atom clusters can be controlled to be equal to or greater than the molecular size of the rhodium carboxylate used at the time of the supporting.

<Measurement of Second Degree of Dispersion of Rhodium>

[i] Preparation of Sample

A powder (10.0 g) of the catalyst for purification of automobile exhaust gas obtained in Example 7 was used. The powder was shaped by a cold isostatic pressing method (CIP: 1000 kg/$cm^2$) for 1 minute, and then ground into pellets each having diameters of 0.5 to 1 mm. Thus, a sample was prepared. Note that the sample was placed in a region (a midway portion) of a gas tube for testing having an inner diameter of 1.1 cm and a length of 100 cm. The region had a length of 54.5 cm from the upstream side to the downstream side of a gas flow passing through the gas tube.

[ii] Durability Test (B)

By using the above-described sample, the following durability test was performed. Specifically, first, a rich gas and a lean gas were alternately supplied to the sample for 50 hours, while being switched to each other at intervals of 5 minutes.

The rich gas was made of $H_2$ (2% by volume), $CO_2$ (10% by volume), $H_2O$ (3% by volume), and $N_2$ (the balance). The lean gas was made of $O_2$ (1% by volume), $CO_2$ (10% by volume), $H_2O$ (3% by volume), and $N_2$ (the balance). Note that the rich gas and the lean gas were supplied under a condition of a temperature of 1000° C. so that each gas passed at 500 mL/min per 5 g of the catalyst.

[iii] Measurement of Amount of CO Adsorbed by Low-Temperature CO-Pulse Measurement Method under Temperature Condition of −78° C.

Three levels of 0.03 g, 0.04 g, and 0.05 g of the sample after the durability test (B) were weighed out to prepare samples. Each of the samples was placed at a midway portion inside a measuring tube of a CO pulse adsorbed amount measuring apparatus (manufactured by OHKURA RIKEN CO., LTD.). Thereafter, the atmosphere inside each measuring tube of the CO pulse adsorbed amount measuring apparatus was changed to a gas atmosphere of $O_2$ (100% by volume). Then, under the gas atmosphere of $O_2$ (100% by volume), the temperature was raised to 400° C. over 40 minutes, and then held for 15 minutes. Next, the gas atmosphere was changed to a gas atmosphere of He (100% by volume), and then held at 400° C. for 40 minutes. Subsequently, the gas atmosphere was changed to a gas atmosphere of $H_2$ (100% by volume), and then held at 400° C. for 15 minutes. Thereafter, the gas atmosphere was further changed to a gas atmosphere of He (100% by volume), and held at 400° C. for 15 minutes. While the gas atmosphere of He (100% by volume) was kept, natural cooling was performed to 50° C. (pre-treatment). After such a pre-treatment was performed, while He gas was flowed at a flow amount of 30 ml/minute, the reaction tube was cooled to −78° C. by using a cooling medium of dry ice/ethanol. After the temperature became constant, CO was pulsed to each sample of the catalyst for purification of exhaust gas at 1.0 μmol/pulse under a gas atmosphere of He (100% by volume), until the adsorption was saturated. Then, an amount of CO which was included in the pulses but which did not adsorb onto the catalyst was detected, by use of a thermal conductivity detector. After that, the amount of CO adsorbed by each sample was determined from the number of times of pulse and the TCD area at the time of saturation of the adsorption. Then, a second amount of CO adsorbed was determined by calculating the average value of amounts of CO adsorbed by the samples.

[iv] Calculation of Second Degree of Dispersion of Rh

The second dispersion of rhodium was determined by a calculation from the thus obtained amount of CO adsorbed and the amount of rhodium (Rh) supported which was measured by the ICP analysis by using the following equation:

[Second dispersion of Rh (%)]=([Second amount of CO adsorbed (mol)]/[Amount of Rh supported (mol)])×100.

Figure 13:
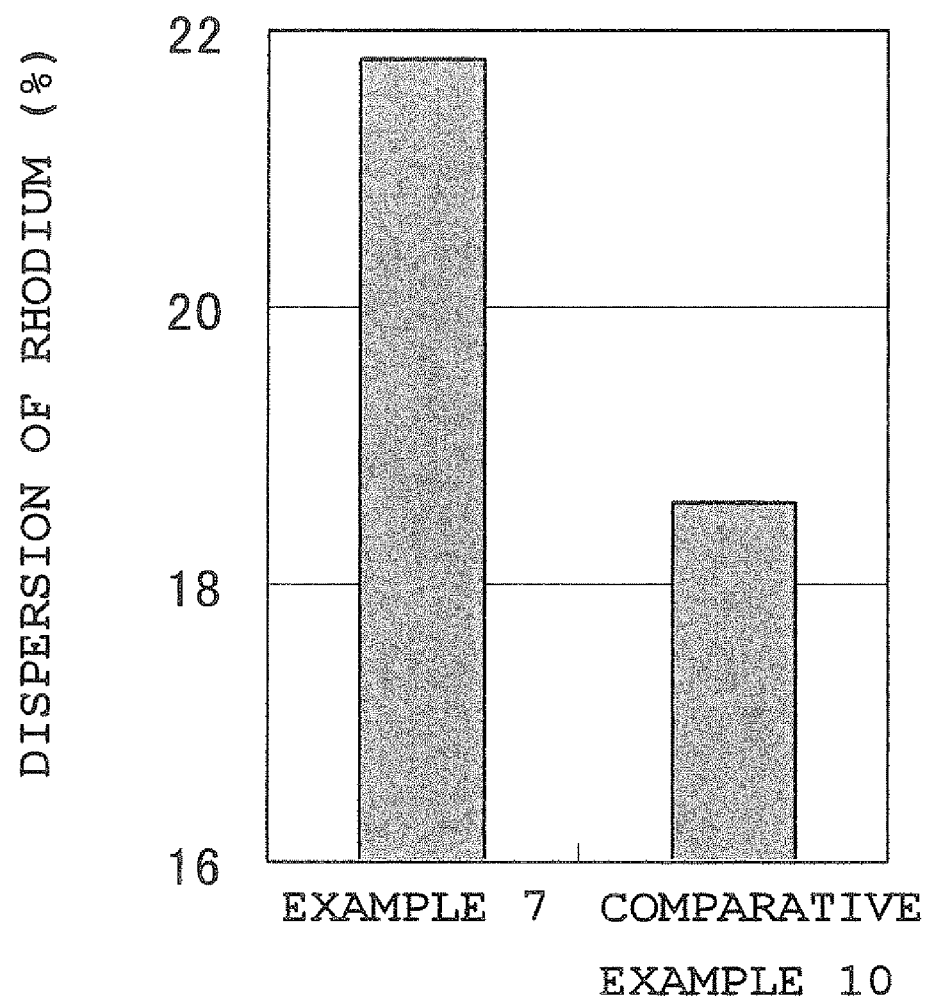
FIG. 13 is a graph showing a second dispersion of rhodium in a catalyst for purification of automobile exhaust gas obtained in each of Example 7 and Comparative Example 10.

The thus measured second dispersion of Rh was 21.8%. Table 4 and FIG. 13 show the obtained result.

Comparative Example 10

A catalyst for purification of automobile exhaust gas for comparison, that rhodium was supported on an AZL support, was obtained in a similar manner to that in Example 7, except that 545.5 mg of an aqueous solution of $Rh(NO_3)_3$ (the aqueous solution containing 2.75% by weight of Rh metal) was used in place of the rhodium hexanoate binuclear complex, and moreover that 1 L of ion-exchanged water was used. Note that the amount of rhodium supported in the obtained catalyst for purification of automobile exhaust gas was analyzed by ICP, and Table 4 shows the value thereof.

The catalyst for purification of automobile exhaust gas thus obtained in comparative Example 10 was subjected to a measurement similar to that in Example 1 by using a scanning transmission electron microscope equipped with a spherical aberration corrector (Cs-STEM). From this measurement, it was found that some of the rhodium atoms were dispersed as individual atoms, but some of the rhodium atoms were supported as clusters. Moreover, it was found that the number of atoms in these clusters was not fixed, and cluster made of, for example, several tens of rhodium atoms was also present. Furthermore, rhodium supported as two-atom clusters was less than 50 at. % of all rhodium atoms (7 at. %). In addition, it was found from the obtained STEM image the "average distance between adjacent ones of the two-atom clusters" in the catalyst for purification of automobile exhaust gas obtained in Comparative Example 10 was less than 1 nm, and that the value thereof was 0.5 nm. Meanwhile, the second dispersion of rhodium of the catalyst for purification of automobile exhaust gas obtained in Comparative Example 10 was determined in a similar manner to that in Example 7. As a result, the second dispersion of rhodium was 18.6%. Table 4 and FIG. 13 show the obtained result.

TABLE 4

| | Kind of rhodium carboxylate | Support | Solvent | Amount of rhodium supported (% by mass) | Ratio of two-atom clusters present (at %) | Dispersion of rhodium (%) | Average distance between adjacent ones of two-atom clusters (nm) |
|---|---|---|---|---|---|---|---|
| Example 7 | $Rh_2(HO-CH_2-CH(OH)-COO)_4$ | AZL | Ion-exchanged water | 0.15 | 50 | 21.8 | 2.0 |
| Comparative Example 10 | Rhodium nitrate | AZL | Ion-exchanged water | 0.15 | 7 | 18.6 | 0.5 |

From the above-described results of the Cs-STEM measurement and the results shown in Table 4 and FIG. 13, it was found that a catalyst in which 50 at. % or more of all rhodium atoms supported on the support were supported as two-atom clusters, and in which the "average distance between adjacent ones of the two-atom clusters" was 1.5 nm or more can be obtained by the method for manufacturing a catalyst for purification of automobile exhaust gas of the present invention (Example 7). In addition, it was also found that a catalyst in which the second dispersion of rhodium was 20% or more can be obtained by the method for manufacturing a catalyst for purification of automobile exhaust gas of the present invention (Example 7).

[Evaluation of Performance of Catalysts for Purification of Automobile Exhaust Gas obtained in Example 7 and Comparative Example 10]

<Evaluation Test of Purification Ratios of CO, NO, and $C_3H_6$ (I)>

First, samples were prepared as follows. The catalysts for purification of automobile exhaust gas obtained in Example 7 and Comparative Example 10 were used. By employing methods similar to the method described in "[i] Preparation of Sample" and the method described in "[ii] Durability Test (B)" in the measurement of the second dispersion of rhodium, a sample was prepared from each catalyst, and then the sample was subjected to the durability test (B). Thereafter, only a pellet-shaped catalyst was taken out from the gas tube.

Next, by using the sample (the pellet-shaped catalyst) thus obtained after the durability test, the purification ratios of CO, NO, and $C_3H_6$ of the catalyst for purification of automobile exhaust gas obtained in each of Example 7 and Comparative Example 10 were evaluated. Specifically, first, the sample after the durability test was placed in a normal pressure fixed bed flow type reactor (manufactured by BEST INSTRUMENTS CO. Ltd.). Next, a model gas made of CO (0.6998% by volume), $H_2$ (0.23% by volume), NO (0.12% by volume), $C_3H_6$ (0.16% by volume), $O_2$ (0.646% by volume), $CO_2$ (10% by volume), $H_2O$ (5% by volume), and $N_2$ (the balance) was supplied at a gas flow rate of 3500 mL/min. The temperature of gas entering the catalyst was adjusted to 100° C., and then the concentrations of CO, NO, and $C_3H_6$ in the gas entering the catalyst were measured. Thereafter, the temperature of the gas entering the catalyst was raised to 400° C. at a rate of temperature rise of 15° C./min, and the concentrations of CO, NO, and $C_3H_6$ in gas exiting from the catalyst were measured. From the difference between the measured value for the gas entering the catalyst and the measured value for the gas exiting from the catalyst, each of the purification ratios of CO, NO, and $C_3H_6$ of the catalysts for purification of automobile exhaust gas was calculated. Among the obtained results, a NO purification ratio curve is shown in FIG. 14.

Figure 14:
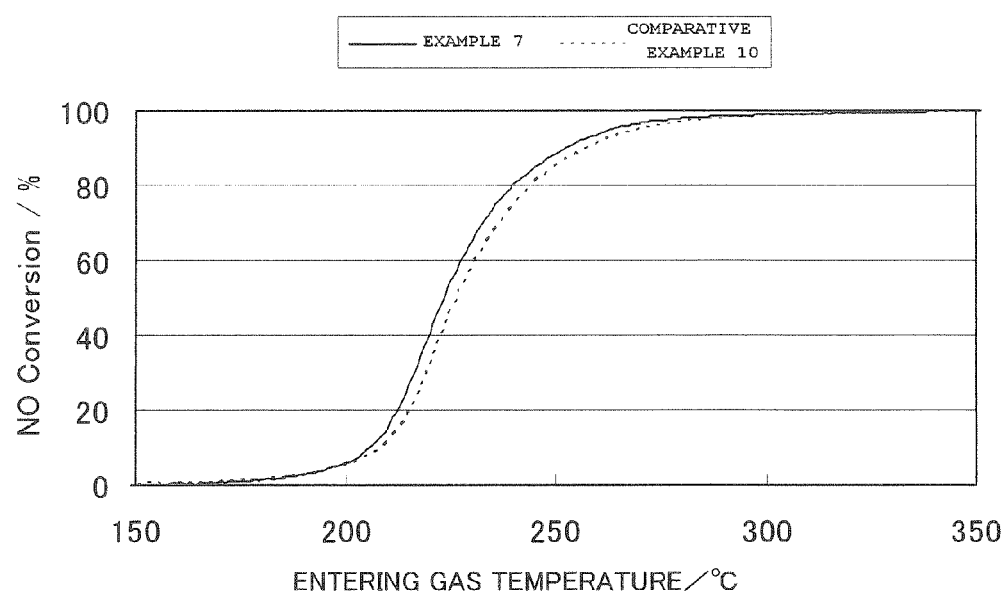
FIG. 14 is a graph showing a NO purification ratio of the catalyst for purification of automobile exhaust gas obtained in each of Example 7 and Comparative Example 10, after R/L endurance at 1000° C. for 50 hours.

As is apparent from the results shown in FIG. 14, it was found that the catalyst for purification of exhaust gas of the present invention (Example 7) had a higher NO purification ratio than the catalyst for purification of exhaust gas for comparison (Comparative Example 10), and had a sufficiently high catalytic activity. In addition, it was found that the catalyst for purification of exhaust gas of the present invention (Example 7) had similarly high purification ratios of CO and $C_3H_6$, and had sufficiently high catalyst activities.

Figure 15:
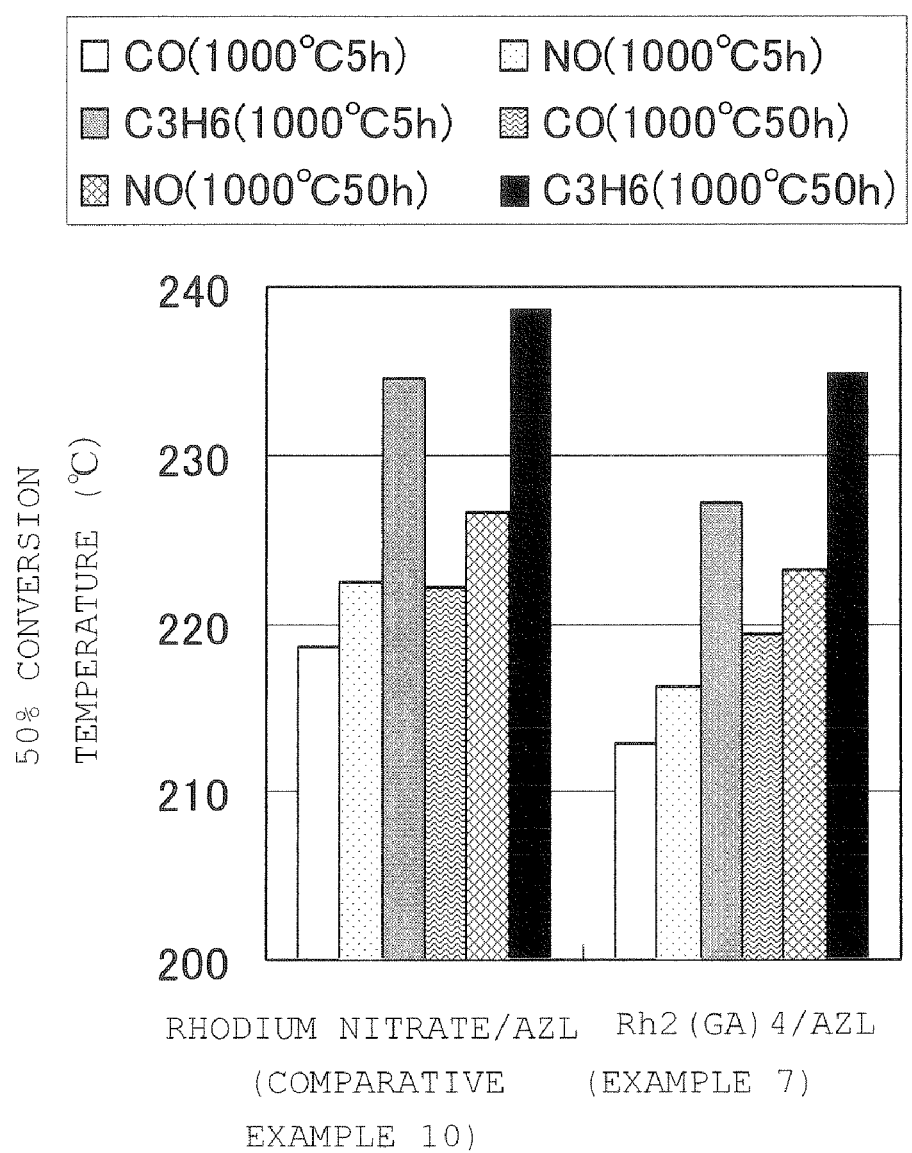
FIG. 15 is a graph showing 50% conversion temperatures (T50s) of CO, NO, and $C_3H_6$ of the catalyst for purification of automobile exhaust gas obtained in each of Example 7 and Comparative Example 10, the 50% conversion temperatures (T50s) being obtained in a three-way activity evaluation at an elevated temperature after R/L endurance at 1000° C. for 5 hours and after R/L endurance at 1000° C. for 50 hours.

In addition, the 50% conversion temperatures (T50) of CO, NO, and $C_3H_6$ were calculated from the purification ratio curves of CO, NO, and $C_3H_6$, respectively. FIG. 15 shows the obtained results.

<Evaluation Test of Purification Ratio of NO and $C_3H_6$ (II)>

Figure 16:
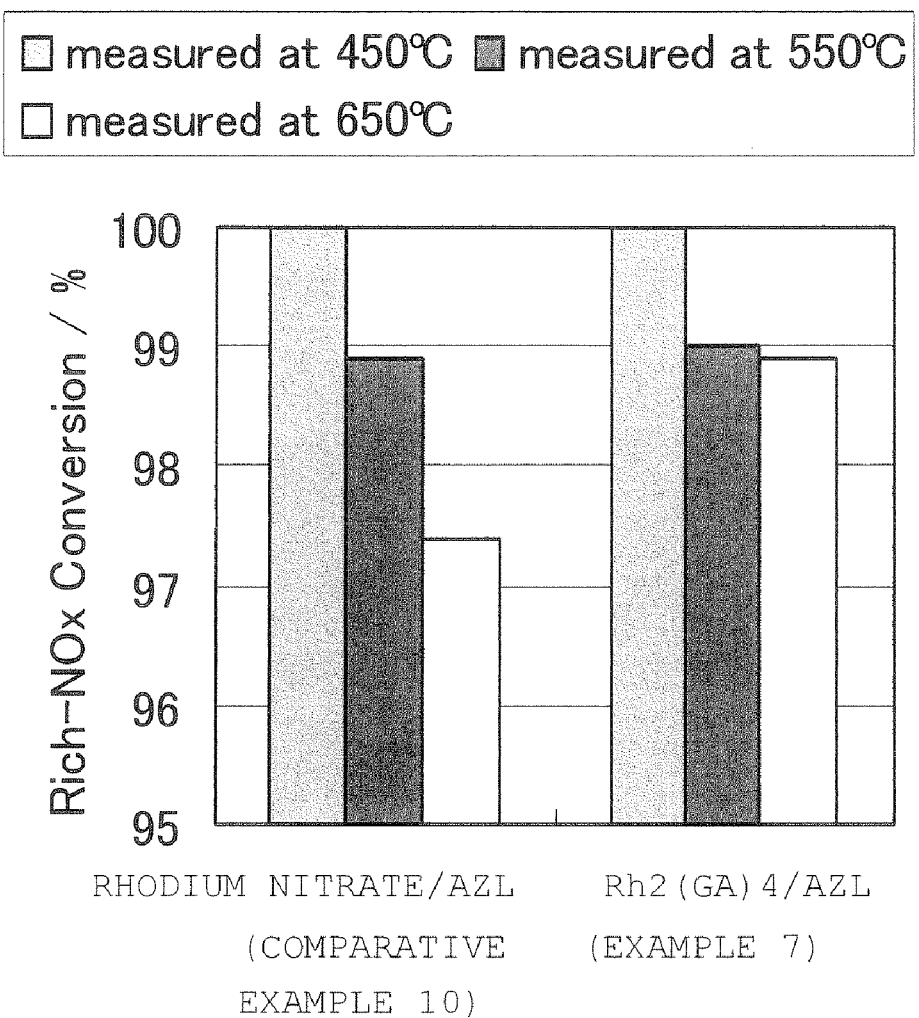
FIG. 16 is a graph showing maximum purification ratios of NOx at temperatures, in a Rich-NOx evaluation, of the catalyst for purification of automobile exhaust gas obtained in each of Example 7 and Comparative Example 10, after R/L endurance at 1000° C. for 50 hours.
Figure 17:
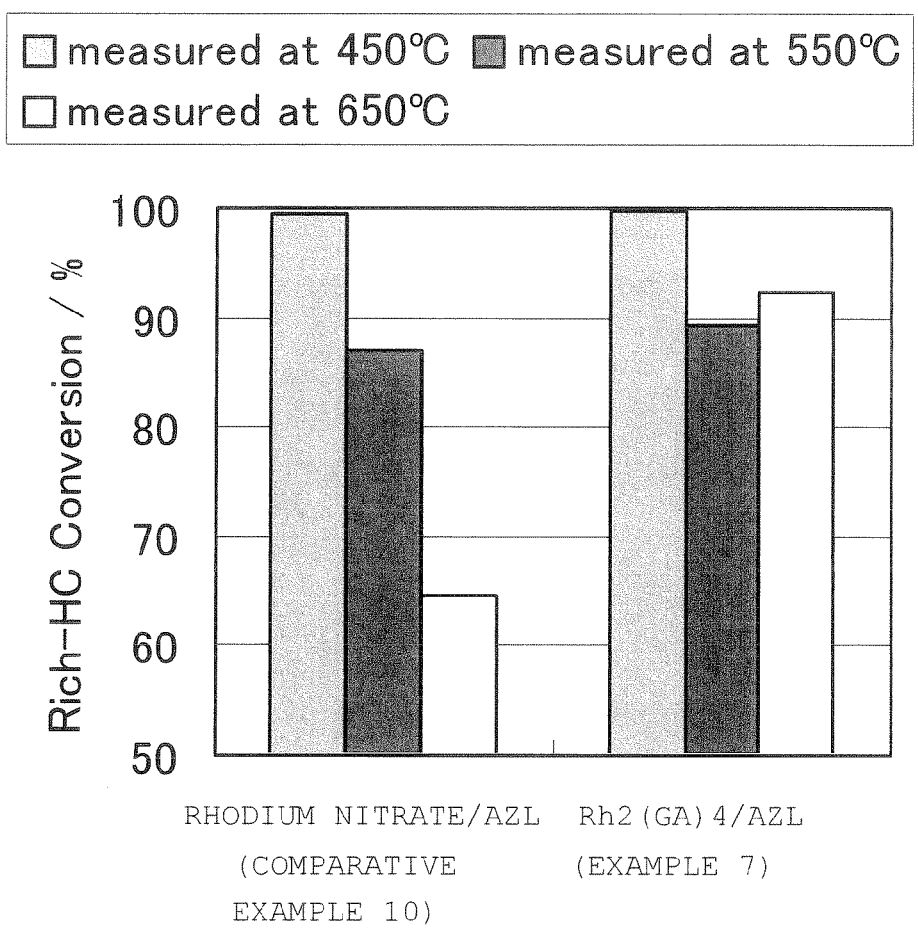
FIG. 17 is a graph showing maximum purification ratios of $C_3H_6$ at temperatures, in a Rich-$C_3H_6$ evaluation, of the catalyst for purification of automobile exhaust gas obtained in each of Example 7 and Comparative Example 10, after R/L endurance at 1000° C. for 50 hours.

By using each of the above-described samples (the pellet-shaped catalysts) after the durability test (B), purification ratios of NO and $C_3H_6$ of the catalyst for purification of automobile exhaust gas obtained in each of Example 7 and Comparative Example 10 under a Rich atmosphere were evaluated at 650° C., 550° C., and 450° C. specifically, first, 0.5 g of the pellet catalyst, which was the sample after the durability test, was placed in a normal pressure fixed bed flow type reactor (manufactured by BEST INSTRUMENTS CO., Ltd. under the product name of "CATA-5000-4"). Next, as the gas being supplied, a lean gas made of NO (0.15% by volume), CO (0.65% by volume), $C_3H_6$ (0% by volume in C equivalent), $O_2$ (0.8% by volume), $CO_2$ (10% by volume), $H_2O$ (4% by volume), and $N_2$ (the balance), and a rich gas made of NO (0.15% by volume), CO (0.65% by volume), $C_3H_6$ (0.3% by volume in C equivalent), $O_2$ (0% by volume), $CO_2$ (10% by volume), $H_2O$ (4% by volume), and $N_2$ (the balance) were used. The gas flow rate was 7 L/minute. Then, while the lean gas and the rich gas were switched to each other at intervals of minutes, a pre-treatment was performed with the temperature of gas entering the catalyst being 100° C. Thereafter, while the temperature of the entering gas was held at 650° C., the gas was switched to the rich gas. After that, when a steady state was reached, the $NO_x$ concentrations and the $C_3H_6$ concentrations in the gas entering the catalyst and the gas exiting from the catalyst were measured. Then, the $NO_x$ purification ratio and the $C_3H_6$ purification ratio were calculated from those measured values. In addition, while the temperature of the entering gas was kept at 550° C., the gas was switched to the rich gas. After that, when a steady state was reached, the $NO_x$ concentrations and the $C_3H_6$ concentrations in the gas entering the catalyst and the gas exiting from the catalyst were measured. Then, the $NO_x$ purification ratio and the $C_3H_6$ purification ratio were calculated from the measured values. Furthermore, while the temperature of the entering gas was held at 450° C., the gas was switched to the rich gas. After that, when a steady state was reached, the $NO_x$ concentrations and the $C_3H_6$ concentrations in the gas entering the catalyst and the gas exiting from the catalyst were measured. Then, the $NO_x$ purification ratio and the $C_3H_6$ purification ratio were calculated from those measured values. FIG. 16 and FIG. 17 show the obtained results.

From the above-described results of Examples and Comparative Examples, it is conceivable that the catalyst for purification of exhaust gas of the present invention was superior to the catalyst obtained in Comparative Example 10, because of the distance between adjacent ones of the two-atom clusters of rhodium, the second dispersion of rhodium, the size of the hydrocarbon group of the carboxylic acid ligand in the complex (the molecular size of the rhodium carboxylate), and the distance between two-atom clusters which was longer than the length of the ligand because the ligand had the hydrophilic group and thus hydrated with water molecules. In addition, from the above-described results, it was found that a catalyst in which rhodium in an atomic state was supported in a sufficiently highly dispersed state can be manufactured efficiently and reliably by the method for manufacturing a catalyst for purification of automobile exhaust gas of the present invention (Example 7). Moreover, it was found that a catalyst for purification of automobile exhaust gas of the present invention obtainable by employing the above-described method (Example 7) had a sufficiently high catalytic activity, because 50 at. % or more of rhodium was supported as two-atom clusters, and the average distance between the two-atom clusters was 1.5 nm or more, in the catalyst. In addition, in the catalyst for purification of automobile exhaust gas obtained in Example 7, the second dispersion of rhodium determined by performing the above-described CO-pulse measurement method including the durability test was 20% or more. This showed that it was possible to keep the sufficiently highly dispersed state of the rhodium even after the durability test.

Example 8

First, a rhodium carboxylate having a structure shown in FIG. 18 was synthesized as follows. Specifically, first, rhodium(III) chloride trihydrate (Wako Pure Chemical Industries, Ltd., 181-00841, compositional formula: $RhCl_3.3H_2O$) was dissolved in a mixture solvent of ion-exchanged water and ethanol. To the solution, 4'-carboxy-benzo-15-crown-ether (Tokyo Chemical Industry Co., Ltd., C1713, a compound having a structure shown in FIG. 19) was added. After that, while the temperature of an oil bath was being kept at 110° C. to 120° C., reflux was performed for 1 hour under an air atmosphere. Thereby, a complex solution containing a rhodium carboxylate (rhodium (benzo-15-crown-ether)-4'-carboxylate binuclear complex) was obtained. Note that, in order to check the presence of the rhodium carboxylate, the obtained complex solution was subjected to mass spectrometry using an electrospray ionization mass spectrometer (ESI-MS, manufactured by Micro Mass). FIGS. 20 to 24 show the obtained results (ESI-MS spectrum). As is apparent from the ESI-MS spectrum shown in FIGS. 20 to 24, it was found that the complex was present as the binuclear complex of rhodium in the complex solution. Note that in the ESI-MS spectrum shown in FIGS. 20 to 24, a spectrum was detected in a pattern of $[M_1+3Na]^{3+}$, $[M_1+2Na]^{2+}$, $[2M_1+3Na]^{3+}$, $[2M_1+2Na]^{2+}$, and $[M_1+Na]^+$, where $Rh_2(C_{15}H_{19}O_7)_4$ was taken as $M_1$, when $Rh_2(C_{15}H_{19}O_7)_4$ is ionized by Na ions. It was also found at the same time that a trace amount of impurities were present.

Figure 25:
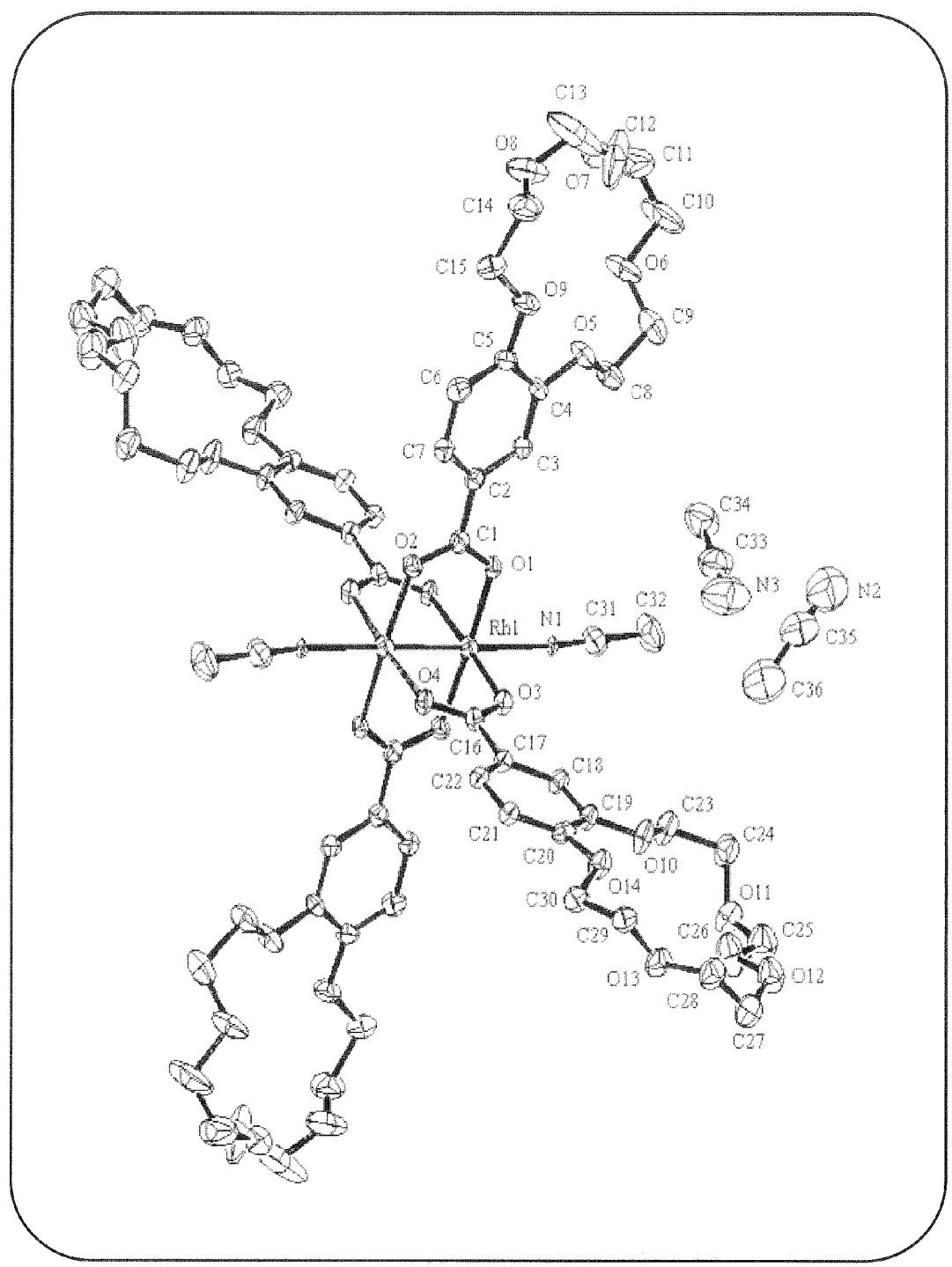
FIG. 25 is an ORTEP diagram (a diagram in which thermal vibrations of atoms are shown by ellipses) of the carboxylic acid (4'-carboxy-benzo-15-crown-ether), which is the precursor of the rhodium carboxylate used in Example 8.

Subsequently, the complex solution obtained as described above was cooled to room temperate (25° C.), and then concentrated. Recrystallization was performed by using acetonitrile. Thus, a crystalline powder of the rhodium carboxylate (the rhodium (benzo-15-crown-ether)-4'-carboxylate binuclear complex) shown in FIG. 18, which was the target substance, was obtained. As described above, in this Example, in order to remove the above-described impurities, recrystallization was performed for purification by using acetonitrile, and the rhodium carboxylate, which was the target compound, was obtained as a single crystal. Note that a single crystal x-ray structure analysis was performed on a crystalline powder of the thus obtained rhodium carboxylate. FIG. 25 shows the results (a diagram showing the molecular structure of the rhodium (benzo-15-crown-ether)-4'-carboxylate binuclear complex [ORTEP diagram: a diagram in which thermal vibrations of atoms are shown by ellipses]) of such a single crystal x-ray structure analysis. From the results shown in FIG. 25, a binuclear structure of rhodium was observed in the obtained powder, and it was found that two molecules of acetonitrile were coordinated at axial positions of rhodium (N atoms of the two molecules of acetonitrile formed coordination bonds with Rh). In addition, it was also found from the results shown in FIG. 25 that two molecules of acetonitrile were present as a solvent of crystallization.

Figure 18:
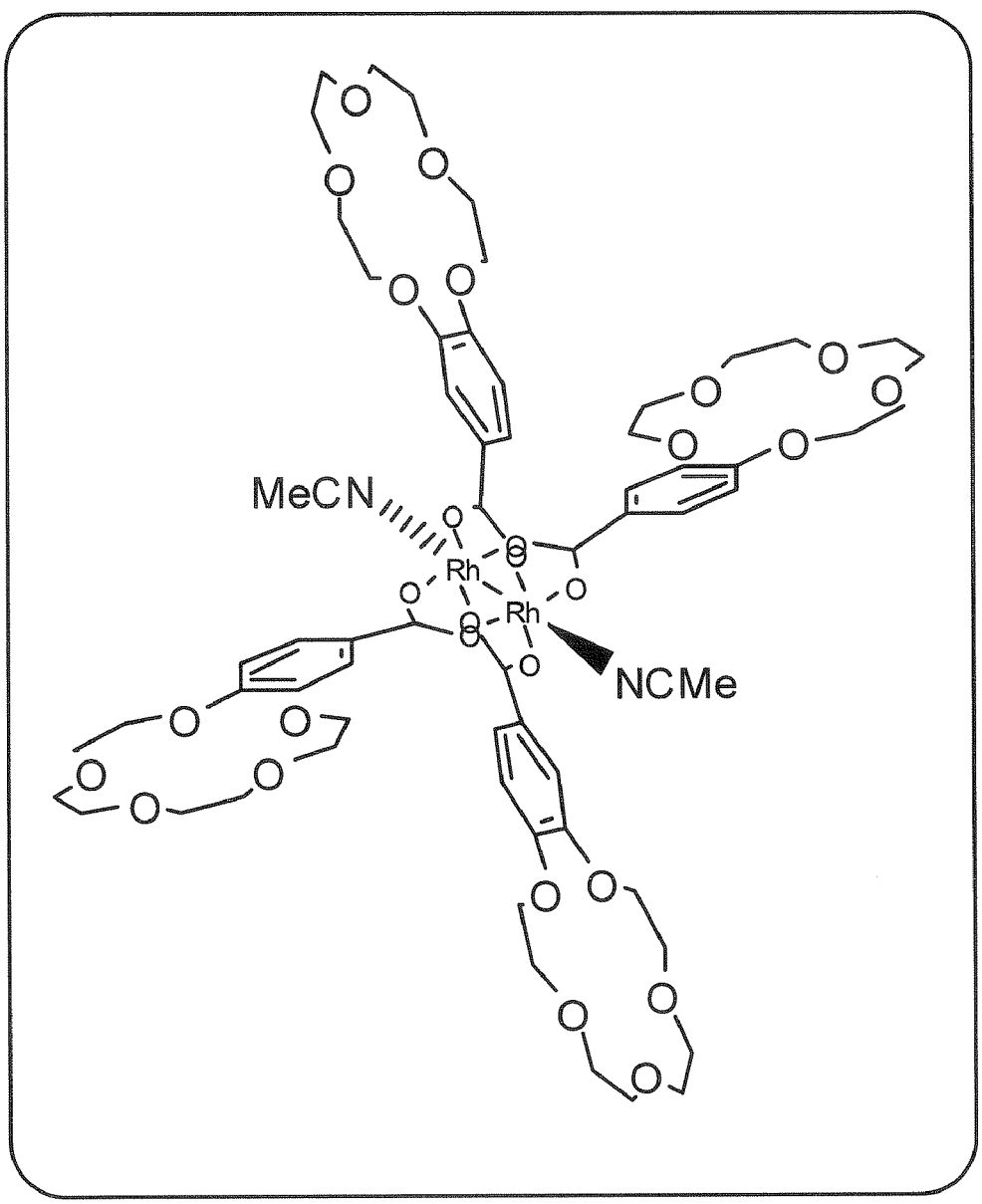
FIG. 18 is a chemical structural formula showing a structure of a rhodium carboxylate (a rhodium (benzo-15-crown-ether)-4'-carboxylate binuclear complex), which is a precursor of a catalyst for purification of automobile exhaust gas obtained in Example 8.
Figure 19:
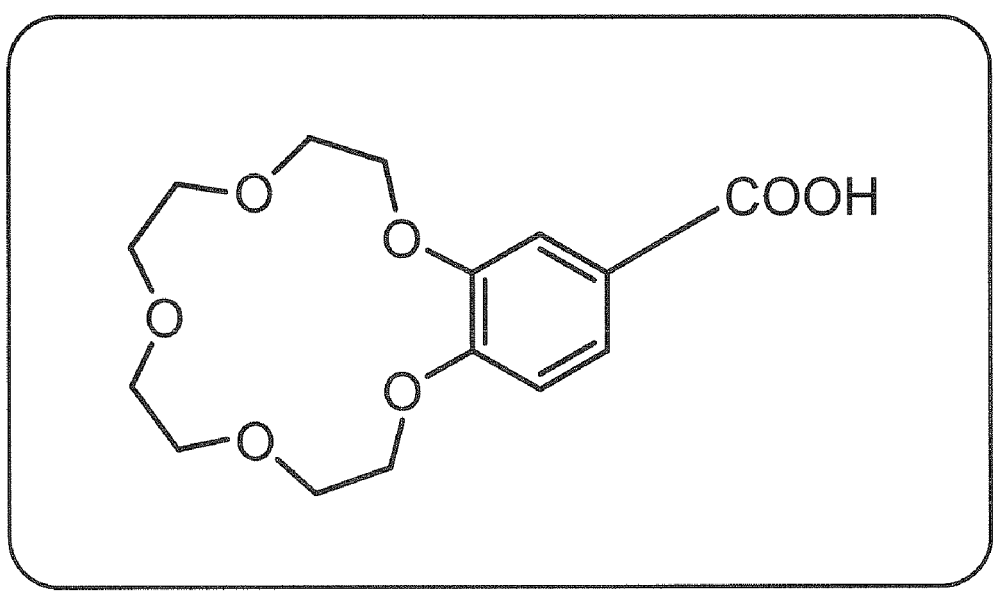
FIG. 19 is a chemical structural formula showing a structure of a carboxylic acid ((benzo-15-crown-ether)-4'-carboxylic acid), which is a precursor of the rhodium carboxylate used in Example 8.
Figure 20:
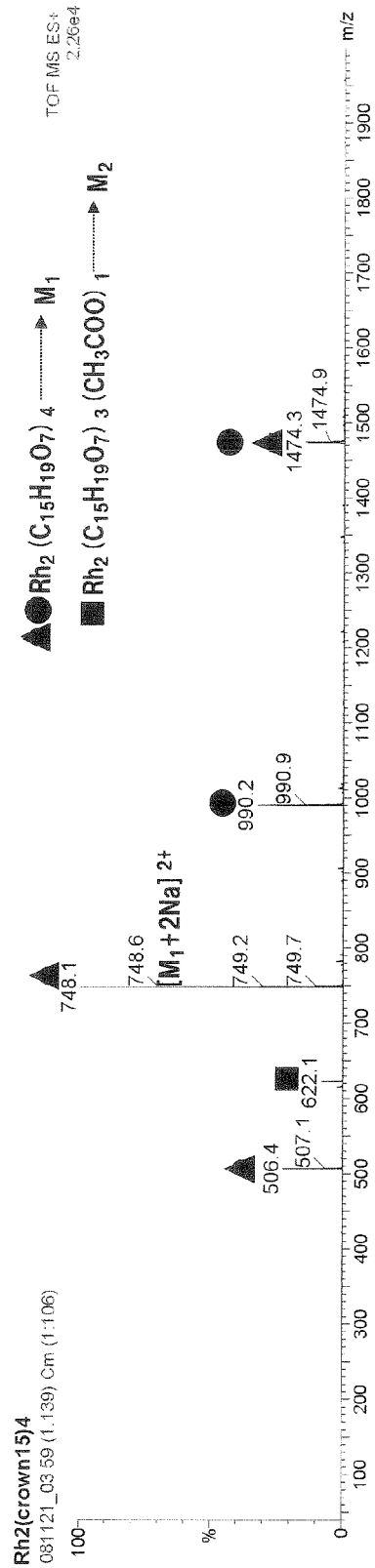
FIG. 20 is a graph showing results of mass spectrometry on the rhodium (benzo-15-crown-ether)-4'-carboxylate, which is a kind of binuclear rhodium carboxylate and which is the precursor of the catalyst for purification of automobile exhaust gas obtained in Example 8.
Figure 21:
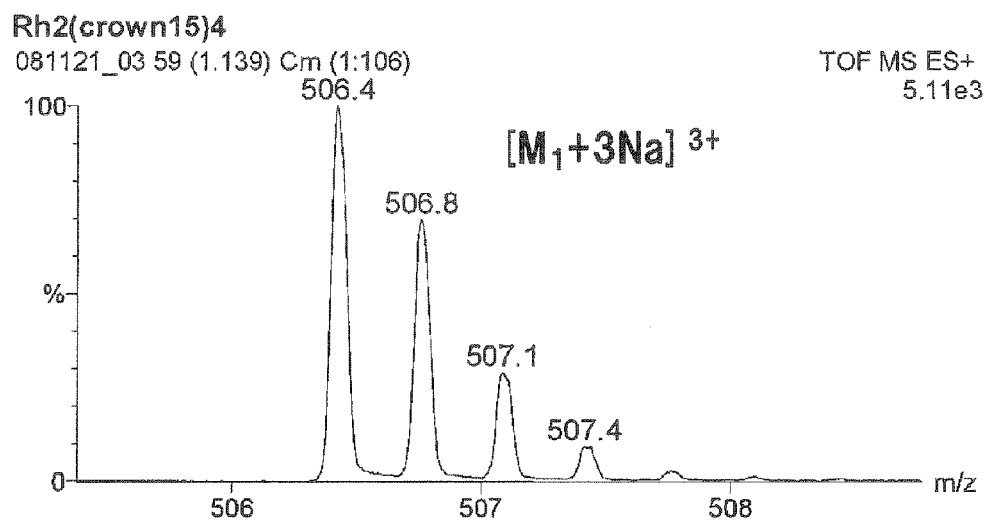
FIG. 21 is a graph showing a partial enlargement (a portion of a pattern of $[M_1+3Na]^{3+}$) of the graph showing the results of the mass spectrometry shown in FIG. 20.
Figure 22:
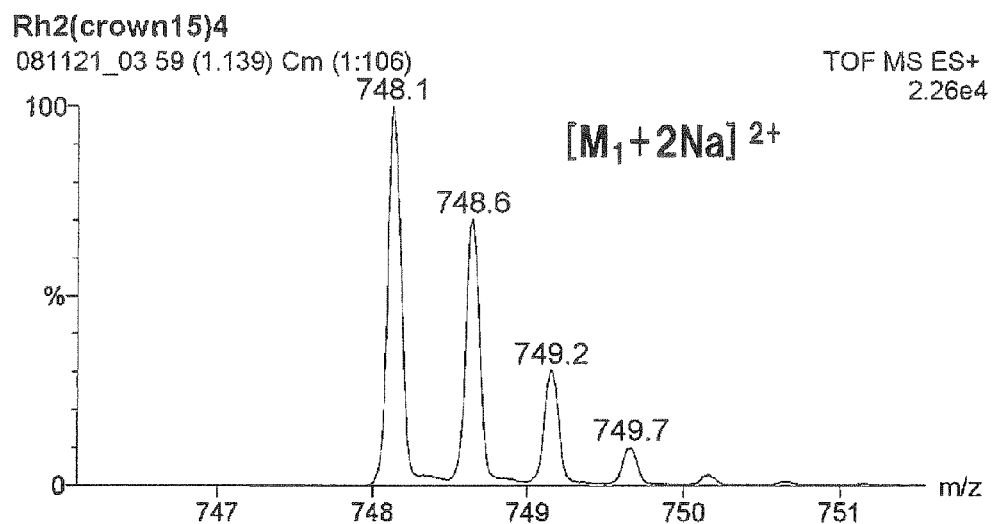
FIG. 22 is a graph showing a partial enlargement (a portion of a pattern of $[M_1+2Na]^{2+}$) of the graph showing the results of the mass spectrometry shown in FIG. 20.
Figure 23:
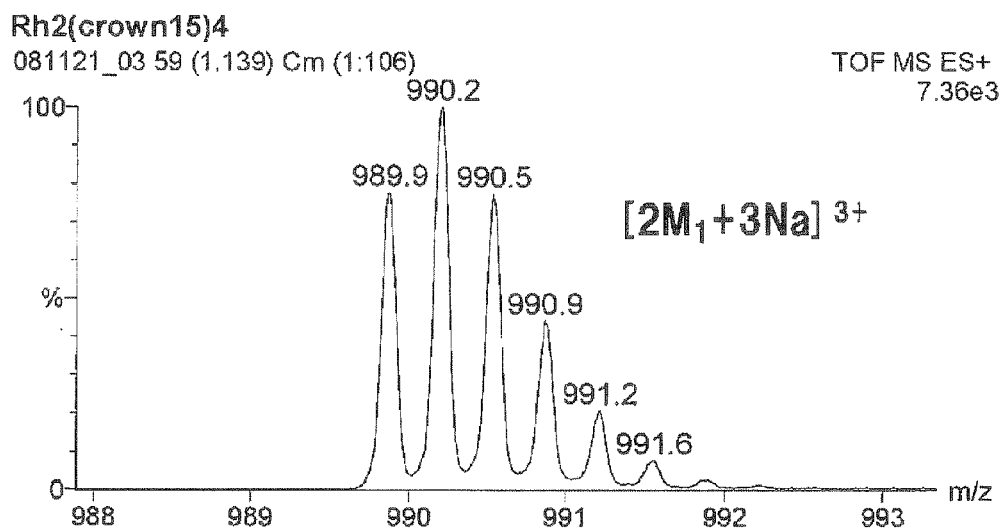
FIG. 23 is a graph showing a partial enlargement (a portion of a pattern of $[2M_1+3Na]^{3+}$) of the graph showing the results of the mass spectrometry shown in FIG. 20.
Figure 24:
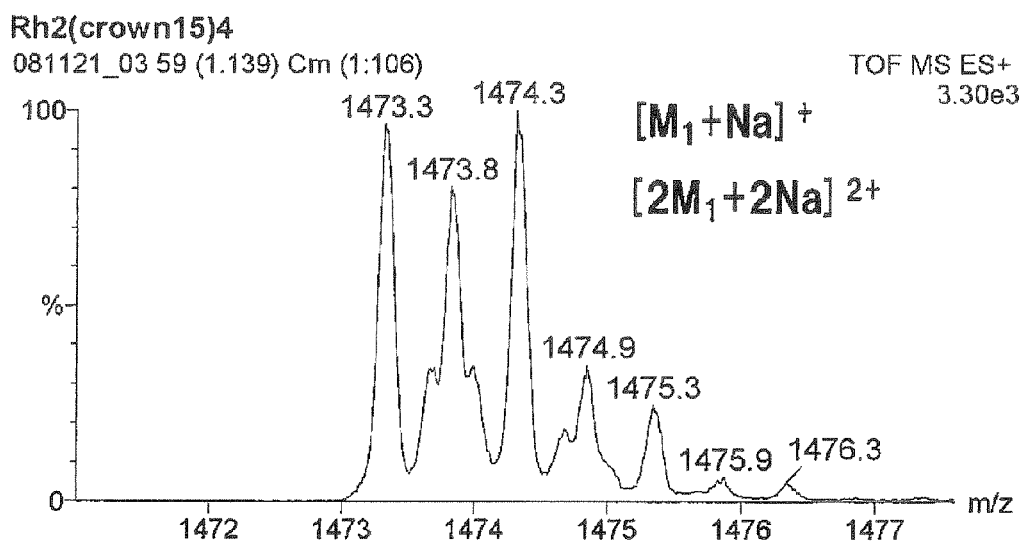
FIG. 24 is a graph showing a partial enlargement (a portion of patterns of $[2M_1+2Na]^{2+}$ and $[M_1+Na]^+$) of the graph showing results of the mass spectrometry shown in FIG. 20.

Next, a rhodium-containing liquid was prepared by dissolving 71 mg of the thus obtained rhodium carboxylate (the rhodium (benzo-15-crown-ether)-4'-carboxylate binuclear complex) shown in FIG. 18 in 1.0 L of chloroform. Thereafter, a liquid mixture was obtained by adding 10 g of Nd-AZL (the same Nd-AZL as that used in Example 4) to the rhodium-containing liquid. Subsequently, the obtained liquid mixture was stirred for 12 hours under a temperature condition of 30° C. Then, a powder was collected from the liquid mixture by filtration. Thereafter, the powder was calcined in the atmosphere under a temperature condition of 300° C. for 3 hours. Thus, a catalyst for purification of automobile exhaust gas, that rhodium was supported on Nd-AZL, was obtained. Note that the amount of Rh supported in the obtained catalyst for purification of automobile exhaust gas was analyzed by ICP (high-frequency inductively coupled plasma analysis: an analyzer manufactured by Rigaku Corporation under the product name of "ICP analyzer model CIROS-120" was used, wavelength of measurement: 343.489 nm). Table 5 shows the value thereof.

Figure 26:
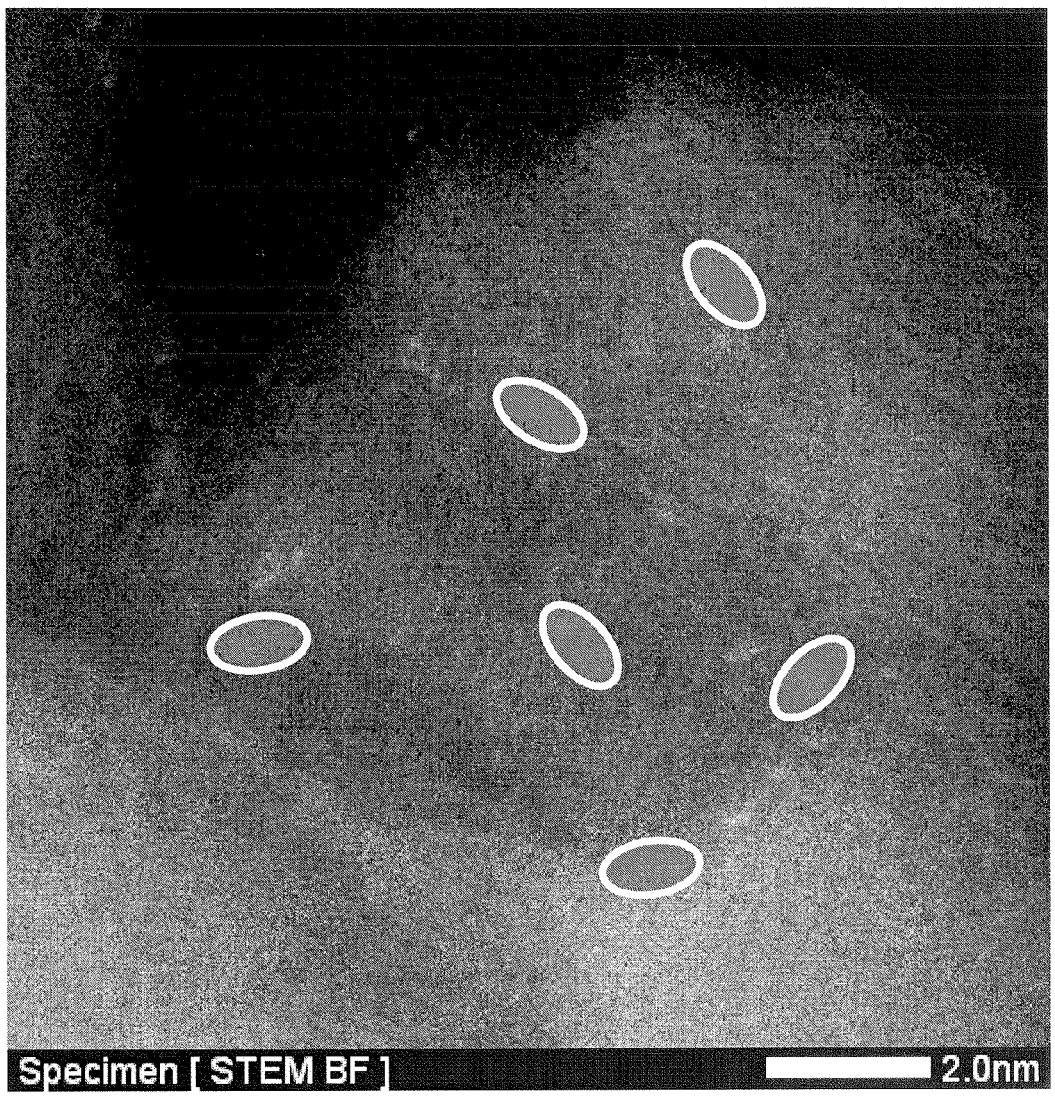
FIG. 26 is a scanning transmission electron microscope photograph (a STEM image) of a region on a support of a powdery catalyst for purification of automobile exhaust gas obtained in Example 8, the region being selected at random and having dimensions of 12 nm in length and 12 nm in width.

The catalyst for purification of automobile exhaust gas obtained in Example 8 was subjected to a measurement similar to that in Example 1 by using a scanning transmission electron microscope equipped with a spherical aberration corrector (Cs-STEM). FIG. 26 shows a STEM photograph obtained by the measurement.

As is apparent from the results shown in FIG. 26, it was found that multiple two-atom clusters made of rhodium atoms were dispersedly supported on the support in the catalyst for purification of automobile exhaust gas obtained in Example 8. In addition, regarding rhodium supported on the support of the catalyst for purification of automobile exhaust gas obtained in Example 8, it was found from the results shown in FIG. 26 that 73 at. % of all rhodium atoms were supported as two-atom clusters. Note that, in FIG. 26, rhodium is present as two-atom clusters in the regions surrounded by white circles.

Moreover, as is apparent from FIG. 26, each distance between adjacent ones of the two-atom clusters measured from the STEM image was 1.5 nm or more in the catalyst for purification of automobile exhaust gas of the present invention (Example 8). In addition, in the catalyst for purification of automobile exhaust gas of the present invention (Example 8), it was found on the basis of the STEM image that the average distance between adjacent ones of the two-atom clusters (an average value of distances between adjacent ones of the two-atom clusters in view of five two-atom clusters was employed in each of Examples and Comparative Examples) was 2.5 nm or more. Note that it is predictable that each "distance between adjacent ones of the two-atom clusters" determined from the STEM image can be substantially equal to the molecular size (2.6 nm) of the rhodium carboxylate (the rhodium (benzo-15-crown-ether)-4'-carboxylate binuclear complex) used for supporting rhodium on the support. Here, it was found that the actual value of the "average distance between adjacent ones of the two-atom clusters" was 3.7 nm, which was greater than the molecular size of the rhodium carboxylate used (the rhodium (benzo-15-crown-ether)-4'-carboxylate binuclear complex). This suggests that the use of rigid (benzo-15-crown-ether)-4'-carboxylic acid as the ligand reliably secures the distance between molecules of the rhodium binuclear complex. Note that when the ligand is made of a single alkyl chain, another molecule of the rhodium binuclear complex can enter the radius of a molecule of the rhodium binuclear complex. Accordingly, a case may occur in which the distance corresponding to the molecular size is not necessarily secured between molecules of the binuclear complex. Accordingly, it can be understood that by the method for manufacturing a catalyst for purification of automobile exhaust gas of the present invention (Example 8), the average distance between adjacent ones of the two-atom clusters can be controlled to a value equal to or greater than the molecular size of the rhodium carboxylate used at the time of the supporting. Note that as is apparent form the structure of the rhodium carboxylate represented by general formula (4), since the bond between the carboxyl group ($-CO_2$) and the benzene ring (the benzene ring in the organic group represented by general formula (5)) in the ligand is a single bond, rotation around this bond is free. Accordingly, when the rhodium carboxylate is supported on the support, the benzene ring and the crown ether portion can be parallel to the support.

Figure 29:
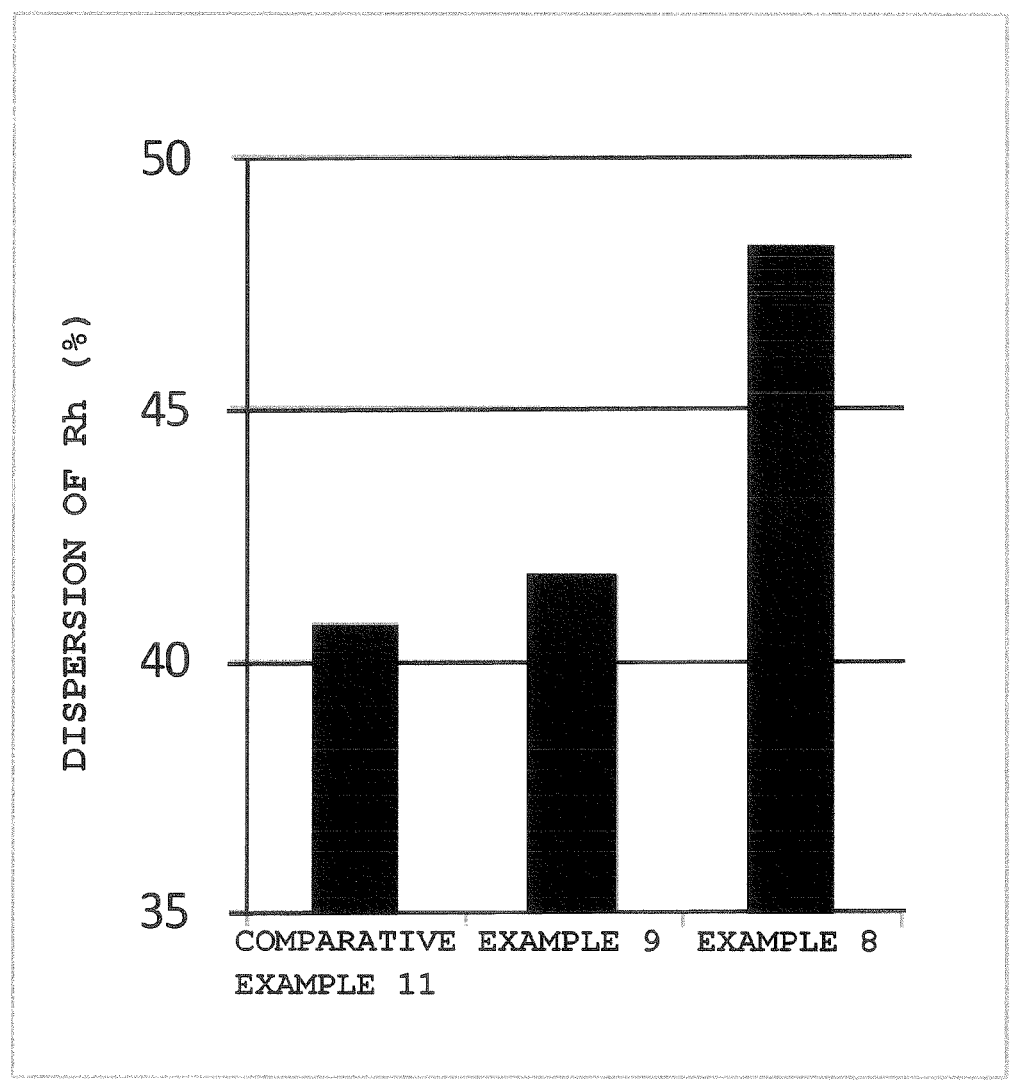
FIG. 29 is a graph showing a second dispersion of rhodium of the catalyst for purification of automobile exhaust gas obtained in each of Examples 8 and 9 and Comparative Example 11.

In addition, the second dispersion of rhodium of the catalyst for purification of automobile exhaust gas obtained in Example 8 was determined in a similar manner to that in Example 7. As a result, the second dispersion of rhodium was 48%. Table 5 and FIG. 29 show the obtained result.

Example 9

A catalyst for purification of automobile exhaust gas, that rhodium was supported on Nd-AZL, was obtained in a similar method to that in Example 8, except that the rhodium-containing liquid was prepared by using 37.8 mg of a rhodium octanoate binuclear complex (Aldrich, 442100, compositional formula: [$Rh_2(C_7H_{15}-CO_2)_4$]) in place of the rhodium carboxylate shown in FIG. 18, and 1.0 L of toluene in place of chloroform. Note that the amount of rhodium supported in the obtained catalyst for purification of automobile exhaust gas was analyzed by ICP, and table 5 shows the value thereof.

The catalyst for purification of automobile exhaust gas thus obtained in Example 9 was subjected to a measurement similar to that in Example 1 by using a scanning transmission electron microscope equipped with a spherical aberration corrector (Cs-STEM). As a result, it was found that 68 at. % of all rhodium atoms were supported as two-atom clusters, and that the "average distance between adjacent ones of the two-atom clusters" was 1 nm or more.

Moreover, the second dispersion of rhodium of the catalyst for purification of automobile exhaust gas obtained in Example 9 was determined in a similar manner to that in Example 7. As a result, the second dispersion of rhodium was 42%. Table 5 and FIG. 29 show the obtained result.

Example 10

A catalyst for purification of automobile exhaust gas, that rhodium was supported on Nd-AZL, was obtained in a similar manner to that in Example 8, except that the rhodium-containing liquid was prepared by using 57 mg of a rhodium myristate binuclear complex (compositional formula: [$Rh_2(C_{13}H_{27}-CO_2)_4$]) in place of the rhodium carboxylate shown in FIG. 18 and 1.0 mL of toluene in place of chloroform. Note that the amount of rhodium supported in the obtained catalyst for purification of automobile exhaust gas was analyzed by ICP, and Table 5 shows the value thereof.

Figure 27:
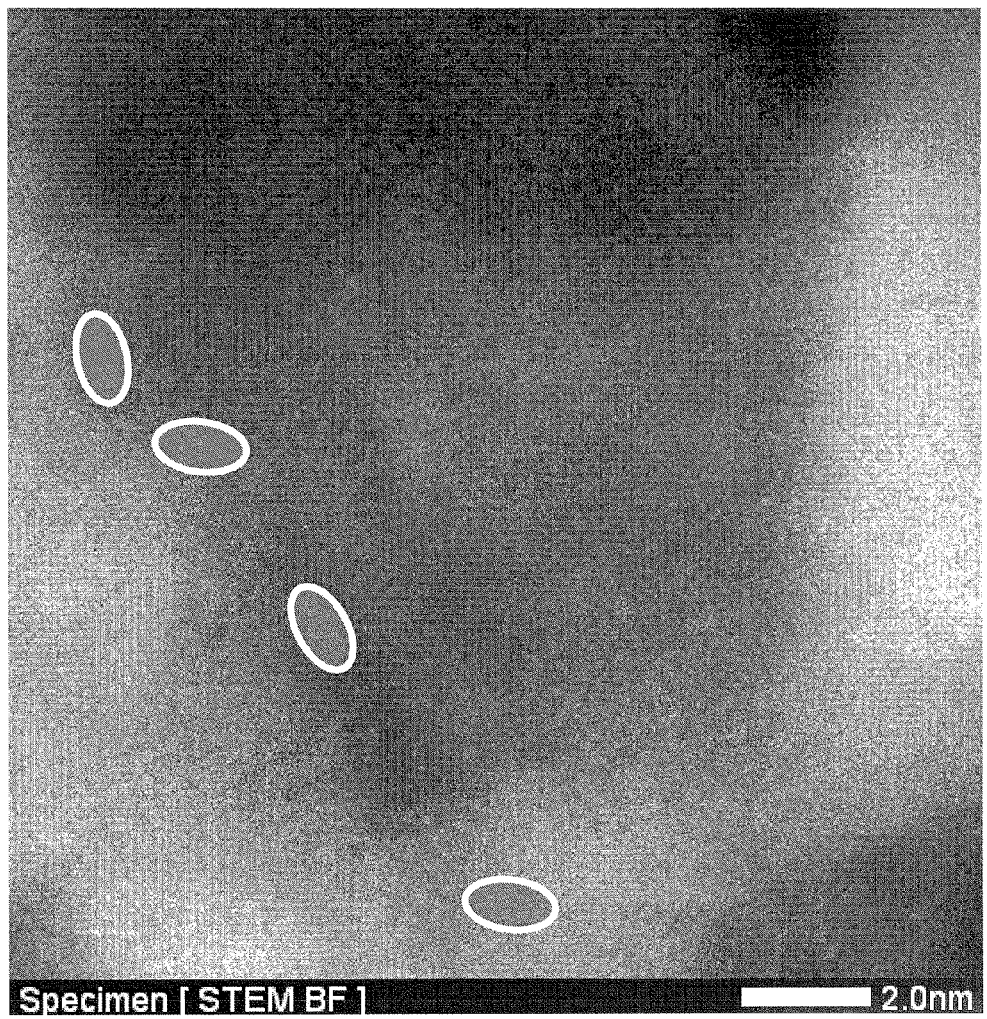
FIG. 27 is a scanning transmission electron microscope photograph (a STEM image) of a region on a support of a powdery catalyst for purification of automobile exhaust gas obtained in Example 10, the region being selected at random and having dimensions of 12 nm in length and 12 nm in width.

In addition, the catalyst for purification of automobile exhaust gas obtained in Example 10 was subjected to a measurement similar to that in Example 1 by using a scanning transmission electron microscope equipped with a spherical aberration corrector (Cs-STEM). FIG. 27 shows a STEM photograph obtained by the measurement.

As is apparent from the results shown in FIG. 27, it was found that multiple two-atom clusters made of rhodium atoms were dispersedly supported on the support in the catalyst for purification of automobile exhaust gas obtained in Example 10. In addition, regarding rhodium supported on the support of the catalyst for purification of automobile exhaust gas obtained in Example 10, it was found from the results shown in FIG. 27 that 70 at. % of all rhodium atoms were supported as two-atom clusters. Note that, in FIG. 27, rhodium is present as two-atom clusters in the regions surrounded by white circles.

In addition, as is apparent from FIG. 27, each distance between adjacent ones of the two-atom clusters measured from the STEM image was 1.5 nm or more in the catalyst for purification of automobile exhaust gas of the present invention (Example 10). Moreover, in the catalyst for purification of automobile exhaust gas of the present invention (Example 10), it was found from the measurement by the Cs-STEM that the average distance between adjacent ones of the two-atom clusters was 3.5 nm or more. Note that it was found that the "distance between adjacent ones of the two-atom clusters" determined from the STEM image was substantially equal to the molecular size (3.6 nm) of the rhodium carboxylate (the rhodium myristate binuclear complex) used for supporting rhodium on the support. This was presumably because the rhodium carboxylate used (the rhodium myristate binuclear complex) was solvated with toluene present therearound. From such results, it can be understood that, by the method for manufacturing a catalyst for purification of automobile exhaust gas of the present invention (Example 10), the average distance between adjacent ones of the two-atom clusters can be controlled by the molecular size of the rhodium carboxylate used at the time of the supporting.

In addition, the second dispersion of rhodium of the catalyst for purification of automobile exhaust gas obtained in Example 10 was determined in a similar manner to that in Example 7. As a result, the second dispersion of rhodium was 45%. Table 5 shows the obtained results.

Figure 28:
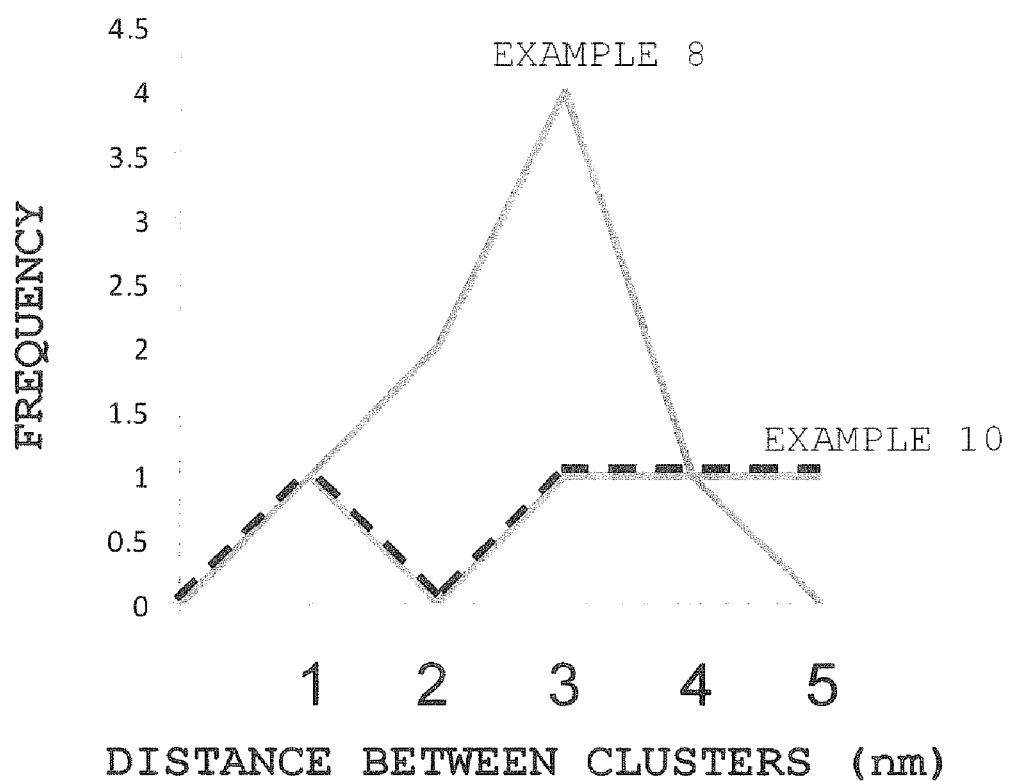
FIG. 28 is a graph showing a distribution of the distance between two-atom clusters of rhodium in the catalyst for purification of automobile exhaust gas obtained in each of Examples 8 and 10.

Moreover, each of the catalysts for purification of automobile exhaust gas obtained in Examples 8 and 10 was measured for the distribution of the distances between adjacent ones of the two-atom clusters by using a scanning transmission electron microscope equipped with a spherical aberration corrector (Cs-STEM). Note that the measurement was performed on a region of the catalyst obtained in Example 8 which was selected at random and which had dimensions of 12 nm in length and 12 nm in width, and on a region of the catalyst obtained in Example 10, which was selected at random and which had dimensions of 15 nm in length and 15 nm in width. FIG. 28 shows the obtained results. As is apparent from the results shown in FIG. 28, it was found that when the rhodium carboxylate having the sterically bulky ligand like the rhodium benzo-15-crown-ether)-4'-carboxylate binuclear complex was used (Example 8), a higher dispersiveness was achieved, and a higher uniformity in dispersion was achieved.

Comparative Example 11

A catalyst for purification of automobile exhaust gas for comparison, that rhodium was supported on Nd-AZL, was obtained in a similar manner to that in Example 8, except that the rhodium-containing liquid was prepared by using 32.0 mg of a rhodium acetate binuclear complex (Wako Pure Chemical Industries, Ltd., 186-01153, compositional formula: [$Rh_2(CH_3-CO_2)_4$]) in place of the rhodium carboxylate shown in FIG. 18 and 1.0 L of acetone in place of chloroform. Note that the amount of Rh supported in the obtained catalyst for purification of automobile exhaust gas was analyzed by ICP, and Table 5 shows the value thereof.

In addition, the catalyst for purification of automobile exhaust gas thus obtained in Comparative Example 11 was subjected to a measurement similar to that in Example 1 by using a scanning transmission electron microscope equipped with a spherical aberration corrector (Cs-STEM). As a result, 62 at. % of all rhodium atoms were supported as two-atom clusters. Moreover, it was found from the obtained STEM image that the "average distance between adjacent ones of the two-atom clusters" in the catalyst for purification of automobile exhaust gas obtained in Comparative Example 1 was less than 1 nm, and that the value thereof was 0.8 nm. In consideration of such results, it is assumed that since the rhodium, acetate binuclear complex used for supporting rhodium on the support in Comparative Example 11 had a molecular size of as small as 0.9 nm, the distance between adjacent ones of the two-atom clusters became less than 1 nm. In addition, the second dispersion of rhodium of the catalyst for purification of automobile exhaust gas obtained in Comparative Example 11 was determined in a similar manner to that in Example 7. As a result, the dispersion of rhodium was 41%. Table 5 and FIG. 29 show the obtained results.

TABLE 5

|  | Kind of rhodium carboxylate | Support | Solvent | Amount of rhodium supported (% by mass) | Ratio of two-atom clusters present (at %) | Dispersion of rhodium (%) | Average distance between adjacent ones of two-atom clusters (nm) |
|---|---|---|---|---|---|---|---|
| Example 8 | Rhodium (benzo-15-crown-ether)-4'-carboxylate binuclear complex | Nd-AZL | Chloroform | 0.098 | 73 | 48 | 3.7 |
| Example 9 | $Rh_2(C_7H_{15}\text{—COO})_4$ | Nd-AZL | Toluene | 0.100 | 68 | 42 | 2.3 |
| Example 10 | $Rh_2(C_{13}H_{27}\text{—COO})_4$ | Nd-AZL | Toluene | 0.100 | 70 | 45 | 3.5 |
| Comparative Example 11 | $Rh_2(CH_3\text{—}CO_2)_4$ | Nd-AZL | Acetone | 0.110 | 62 | 41 | 0.8 |

As is apparent from the above-described results of the Cs-STEM measurements and the results shown in Table 5 and FIG. 29, it was found that a catalyst in which 50 at. % or more of all rhodium atoms supported on the support were supported as two-atom clusters, and in which the "average distance between adjacent ones of the two-atom clusters" was 1.0 nm or more can be obtained by the method for manufacturing a catalyst for purification of automobile exhaust gas of the present invention (Examples 8 to 10). Moreover, it was found that especially when the rhodium carboxylate having a sterically bulky ligand like the rhodium (benzo-15-crown 5-ether)-4'-carboxylate binuclear complex was used (Example 8), a catalyst in which 73 at. % or more of all Rh atoms supported on the support were supported as two-atom clusters, and in which the "average distance between adjacent ones of the two-atom clusters" was 2.5 nm or more can be obtained. In addition, it was found that a catalyst having such an extremely high dispersion that the second dispersion of rhodium was 48% or more can be obtained especially by the method for manufacturing a catalyst for purification of automobile exhaust gas of the present invention employed in Example 8. From such results, it was found that when the rhodium carboxylate having the sterically bulky ligand like the rhodium (benzo-15-crown-ether)-4'-carboxylate binuclear complex was used (Example 8), a higher dispersiveness was achieved, and a higher uniformity of the dispersion was achieved.

[Evaluation of Performances of Catalysts for Purification of Automobile Exhaust Gas Obtained in Examples 8 and 9 and Comparative Example 11]

<Evaluation Test of Purification Ratios of CO, NO, and $C_3H_6$>

Figure 30:
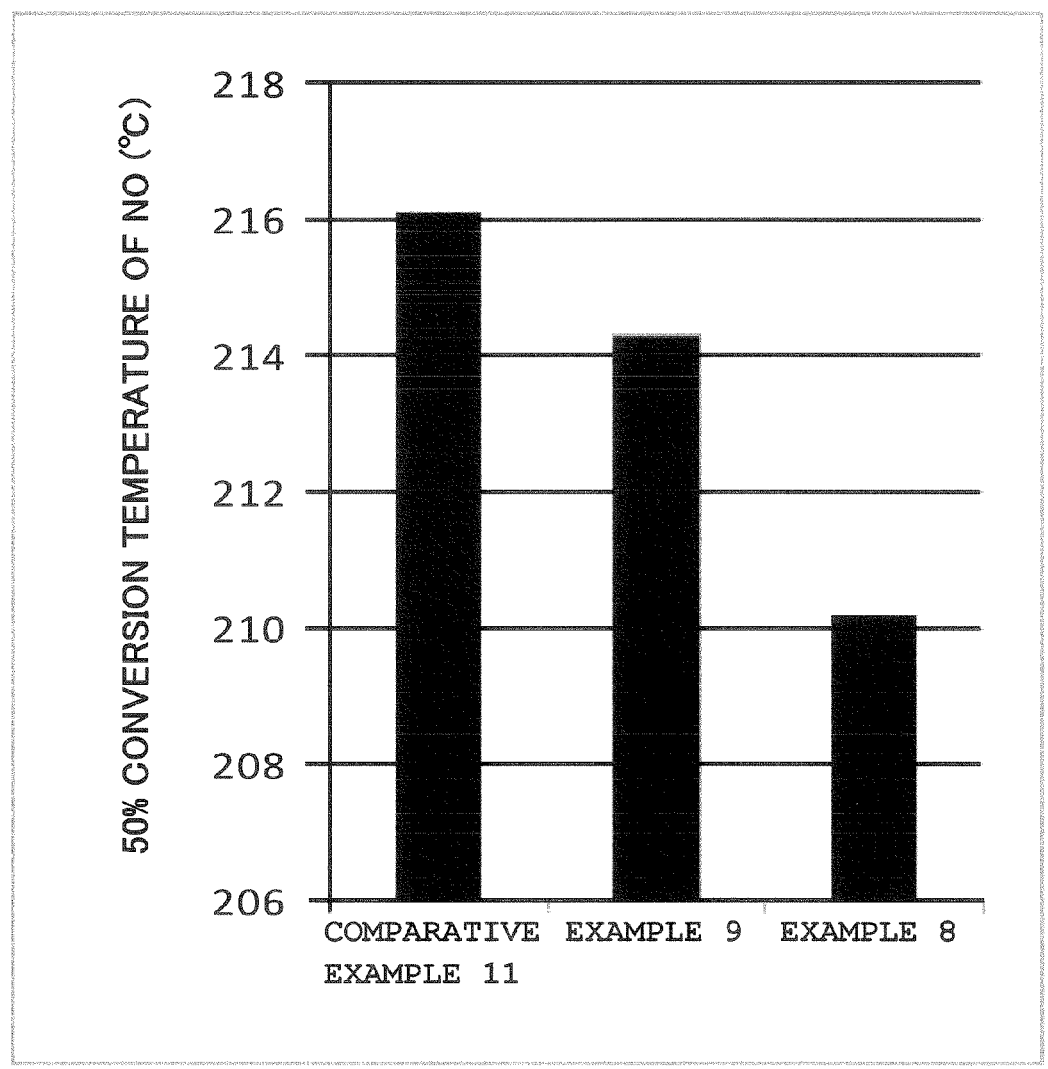
FIG. 30 is a graph showing a 50% conversion temperature (T50) of NO of the catalyst for purification of automobile exhaust gas obtained in each of Examples 8 and 9 and Comparative Example 11.

By employing the same method as those in the evaluation test of purification ratios of CO, NO, and $C_3H_6$ (I), which were employed in the evaluation of the performances of the catalyst for purification of automobile exhaust gas obtained in Example 7, the purification ratios of CO, NO, and $C_3H_6$ of the catalyst for purification of automobile exhaust gas obtained in each of Examples 8 and 9 and Comparative Example 11 were evaluated. FIG. 30 shows a graph of the 50% conversion temperature of NO (a temperature (T50) at which the conversion of NO was 50% relative to the concentration of NO in the entering gas) determined on the basis of the thus obtained results.

As is apparent from the results shown in FIG. 30, it was found that the NO purification ratio of each of the catalysts for purification of exhaust gas of the present invention (Examples 8 and Examples 9) was sufficiently higher than that of the catalyst for purification of exhaust gas for comparison (Comparative Example 11), and had a sufficiently high catalytic activity. In addition, it was found that each of the catalysts for purification of exhausts gas of the present invention (Examples 8 and 9) exhibited higher purification ratios of CO and $C_3H_6$ than the catalyst for purification of exhaust gas for comparison (Comparative Example 11), and had sufficiently high catalytic activities.

Moreover, from the results as described above, it is conceivable that each of the catalysts for purification of exhaust gas obtained in Examples 8 and 9 was superior to the catalyst for purification of exhaust gas obtained in Comparative Example 1 because of the following reasons: the distance between adjacent ones of the two-atom clusters of Rh was sufficiently large; the dispersion of Rh was sufficiently high; the size of the hydrocarbon group of the carboxylic acid ligand in the complex (the molecular size of the rhodium carboxylate) was sufficiently large; and because of the rigidity of the ligands, a phenomenon was sufficiently prevented in which the distance between two-atom clusters of rhodium was shortened when a ligand of one molecule of the rhodium binuclear complex entered a space between a ligand and another ligand of another molecule of the rhodium binuclear complex. In addition, from the results as described above, it was found that a catalyst in which rhodium in an atomic state was supported in a sufficiently highly dispersed state can be manufactured efficiently and reliably by each of the methods for manufacturing a catalyst for purification of automobile exhaust gas of the present invention (Example 8 and Example 9). In addition, it was found that a catalyst for purification of automobile exhaust gas of the present invention obtainable by such methods (Examples 8 and 9) had a sufficiently high catalytic activity, because 50 at. % or more of rhodium was supported as two-atom clusters, and the average distance between the two-atom clusters was 2 nm or more. In addition, in each of the catalysts for purification of automobile exhaust gas obtained in Examples 8 and Example 9, the second dispersion of Rh determined by performing the low-temperature CO-pulse measurement method including the above-described durability test was 20% or more. This showed that it was possible to keep the sufficiently highly dispersed state of the Rh even after the durability test.

As has been described above, according to the present invention, it is possible to provide a catalyst for purification of automobile exhaust gas having rhodium in an atomic state supported in a sufficiently highly dispersed state, and having a sufficiently high catalytic activity, and also to provide a method for manufacturing a catalyst for purification of automobile exhaust gas capable of manufacturing the aforementioned catalyst efficiently and reliably. Such a catalyst for purification of automobile exhaust gas of the present invention can be used as a three-way catalyst or the like used for purification of exhaust gas emitted from an automobile.

What is claimed is:

1. A catalyst for purification of automobile exhaust gas, comprising:

a support; and rhodium supported on the support in an atomic state, wherein an amount of the rhodium supported is 0.05 to 0.30% by mass relative to the total amount of the support and the rhodium, 50 at.% or more of the rhodium is supported on the support as two-atom clusters of rhodium, and an average distance between adjacent ones of the two-atom clusters is 1.0 nm or more.

2. The catalyst for purification of automobile exhaust gas according to claim 1, wherein the average distance between adjacent ones of the two-atom clusters is 1.5 nm or more.

3. The catalyst for purification of automobile exhaust gas according to claim 1, wherein a second dispersion of rhodium which is determined on the basis of a second amount of CO adsorbed and the amount of the rhodium supported is 20 to 50%, the second amount of CO adsorbed being measured by a low-temperature CO pulse measurement method under a temperature condition of −78° C.

4. The catalyst for purification of automobile exhaust gas according to claim 1, wherein the rhodium is supported on the support in an atomic state by using at least one rhodium carboxylate represented by the following general formulae (1) to (4):

wherein in formula (1), R is selected from the group consisting of hydrocarbon groups having a carbon number of 4 to 20,

wherein in formula (2), $R^1$ is selected from the group consisting of hydrocarbon groups, which may have a hydroxy group in a side chain thereof, the hydrocarbon groups having a carbon number of 4 to 20, $R^2$ is selected from the group consisting of hydrocarbon groups having a carbon number of 1 to 3, $R^3$ is selected from the group consisting of hydrocarbon groups having a carbon number of 1 to 20, n represents any integer of 0 and 1, m represents any integer of 0 to 6, and the sum of n and m satisfies a condition of being 1 or greater,

wherein in formula (3), $R^4$ and $R^5$ may be the same or different, and each of $R^4$ and $R^5$ is selected from the group consisting of a hydrogen atom and hydrocarbon groups having a carbon number of 1 to 3, X is selected from the group consisting of a OH group, an $NH_2$ group, and a $NO_2$ group, and l represents any integer of 1 to 5, and

wherein in formula (4), Z represents a benzo-crown ether group represented by the following general formula (5):

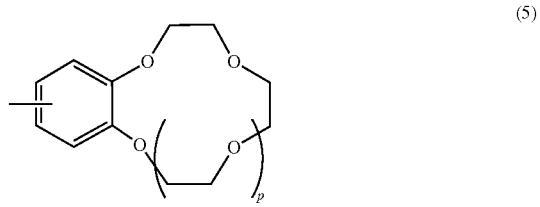

wherein in formula (5), p represents any integer of 1 to 3.

5. A method for manufacturing a catalyst for purification of automobile exhaust gas according to claim 1, the method comprising:

bringing a rhodium-containing liquid into contact with a support, the rhodium-containing liquid containing at least one rhodium carboxylate represented by the following general formulae (1) to (4):

wherein in formula (1), R is selected from the group consisting of hydrocarbon groups having a carbon number of 4 to 20,

wherein in formula (2), $R^1$ selected from the group consisting of hydrocarbon groups, which may have a hydroxy group in a side chain thereof, the hydrocarbon groups having a carbon number of 4 to 20, $R^2$ selected from the group consisting of hydrocarbon groups having a carbon number of 1 to 3, $R^3$ is selected from the group consisting of hydrocarbon groups having a carbon number of 1 to 20, n represents any integer of 0 and 1, m represents any integer of 0 to 6, and the sum of n and m satisfies a condition of being 1 or greater,

wherein in formula (3), $R^4$ and $R^5$ may be the same or different, and each of $R^4$ and $R^5$ is selected from the group consisting of a hydrogen atom and hydrocarbon groups having a carbon number of 1 to 3, X is selected from the group consisting of a OH group, an $NH_2$ group, and a $NO_2$ group, and l represents any integer of 1 to 5, and

wherein in formula (4), Z represents a benzo-crown ether group represented by the following general formula (5):

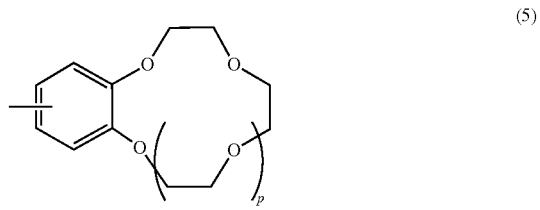

wherein in formula (5), p represents any integer of 1 to 3, thereby an unsaturated coordination site of the rhodium carboxylate being allowed to be directly bonded to a hydroxy group and/or an oxygen atom on the support, and the rhodium carboxylate being supported on the support; and performing calcination, thereby a catalyst for purification of automobile exhaust gas being obtained.

6. The method for manufacturing a catalyst for purification of automobile exhaust gas according to claim 5, wherein
the rhodium carboxylate is represented by general formulae (2) to (4), and
a solvent of the rhodium-containing liquid is a water-based solvent.

7. The method for manufacturing a catalyst for purification of automobile exhaust gas according to claim 5, wherein
the catalyst for purification of automobile exhaust gas is a catalyst for purification of automobile exhaust gas in which the average distance between adjacent ones of the two-atom clusters is 1.5 nm or more.

8. The method for manufacturing a catalyst for purification of automobile exhaust gas according to claim 5, wherein
the catalyst for purification of automobile exhaust gas is a catalyst for purification of automobile exhaust gas in which a first dispersion of rhodium which is determined on the basis of a first amount of CO adsorbed and the amount of the rhodium supported is 40 to 80%, the first amount of CO adsorbed being measured by a CO-pulse measurement method under a temperature condition of 50° C.

9. The method for manufacturing a catalyst for purification of automobile exhaust gas according to claim 5, wherein
the catalyst for purification of automobile exhaust gas is a catalyst for purification of automobile exhaust gas in which a second dispersion of rhodium which is determined on the basis of a second amount of CO adsorbed and the amount of the rhodium supported is 20 to 50%, the second amount of CO adsorbed being measured by a low-temperature CO pulse measurement method under a temperature condition of −78° C.

10. A catalyst for purification of automobile exhaust gas, comprising:
a support; and
rhodium supported on the support in an atomic state, wherein
an amount of the rhodium supported is 0.05 to 0.30% by mass relative to the total amount of the support and the rhodium,
50 at. % or more of the rhodium is supported on the support as two-atom clusters of rhodium,
an average distance between adjacent ones of the two-atom clusters is 1.0 nm or more, and
a first dispersion of rhodium which is determined on the basis of a first amount of CO adsorbed and the amount of the rhodium supported is 40 to 80%, the first amount of CO adsorbed being measured by a CO-pulse measurement method under a temperature condition of 50° C.

11. The catalyst for purification of automobile exhaust gas according to claim 10, wherein
the average distance between adjacent ones of the two-atom clusters is 1.5 nm or more.

12. The catalyst for purification of automobile exhaust gas according to claim 10, wherein
the rhodium is supported on the support in an atomic state by using at least one rhodium carboxylate is represented by the following general formulae (1) to (4):

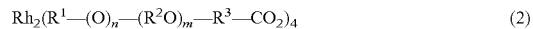

wherein in formula (1), R is selected from the group consisting of hydrocarbon groups having a carbon number of 4 to 20,

 (2)

wherein in formula (2), $R^1$ is selected from the group consisting of hydrocarbon groups, which may have a hydroxy group in a side chain thereof, the hydrocarbon groups having a carbon number of 4 to 20, $R^2$ is selected from the group consisting of hydrocarbon groups having a carbon number of 1 to 3, $R^3$ is selected from the group consisting of hydrocarbon groups having a carbon number of 1 to 20, n represents any integer of 0 and 1, m represents any integer of 0 to 6, and the sum of n and m satisfies a condition of being 1 or greater,

 (3)

wherein in formula (3), $R^4$ and $R^5$ may be the same or different, and each of $R^4$ and $R^5$ is selected from the group consisting of a hydrogen atom and hydrocarbon groups having a carbon number of 1 to 3, X is selected from the group consisting of a OH group, an $NH_2$ group, and a $NO_2$ group, and l represents any integer of 1 to 5, and $Rh_2(Z—CO_2)_4$ (4)

wherein in formula (4), Z represents a benzo-crown ether group represented by the following general formula (5):

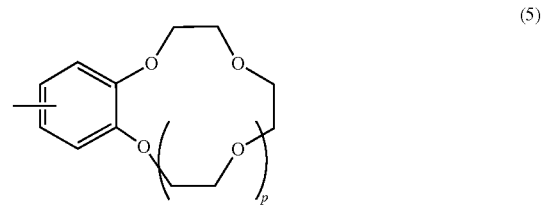 (5)

wherein in formula (5), p represents any integer of 1 to 3.

13. A method for manufacturing a catalyst for purification of automobile exhaust gas according to claim 10, the method comprising:
bringing a rhodium-containing liquid into contact with a support, the rhodium-containing liquid containing at least one rhodium carboxylate represented by the following general formulae (1) to (4):

 (1)

wherein in formula (1), R is selected from the group consisting of hydrocarbon groups having a carbon number of 4 to 20,

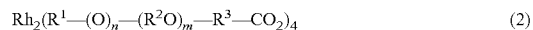 (2)

wherein in formula (2), $R^1$ is selected from the group consisting of hydrocarbon groups, which may have a hydroxy group in a side chain thereof, the hydrocarbon groups having a carbon number of 4 to 20, $R^2$ is selected from the group consisting of hydrocarbon groups having a carbon number of 1 to 3, $R^3$ is selected from the group consisting of hydrocarbon groups having a carbon number of 1 to 20, n represents any integer of 0 and 1, m represents any integer of 0 to 6, and the sum of n and m satisfies a condition of being 1 or greater,

 (3)

wherein in formula (3), $R^4$ and $R^5$ may be the same or different, and each of $R^3$ and $R^4$ is selected from the group consisting of a hydrogen atom and hydrocarbon groups having a carbon number of 1 to 3, X is selected from the group consisting of a OH group, an $NH_2$ group, and a $NO_2$ group, and l represents any integer of 1 to 5, and

 (4)

wherein in formula (4), Z represents a benzo-crown ether group represented by the following general formula (5):

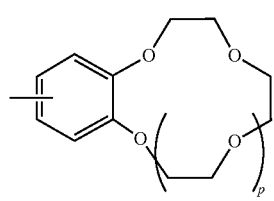 (5)

wherein in formula (5), p represents any integer of 1 to 3, thereby an unsaturated coordination site of the rhodium carboxylate being allowed to be directly bonded to a hydroxy group and/or an oxygen atom on the support, and the rhodium carboxylate being supported on the support; and performing calcination, thereby a catalyst for purification of automobile exhaust gas being obtained.

14. The method for manufacturing a catalyst for purification of automobile exhaust gas according to claim 13, wherein
at least one rhodium carboxylate is represented by general formulae (2) to (4), and
a solvent of the rhodium-containing liquid is a water-based solvent.

15. The method for manufacturing a catalyst for purification of automobile exhaust gas according to claim 13, wherein
the catalyst for purification of automobile exhaust gas is a catalyst for purification of automobile exhaust gas in which the average distance between adjacent ones of the two-atom clusters is 1.5 nm or more.

16. The method for manufacturing a catalyst for purification of automobile exhaust gas according to claim 13, wherein
the catalyst for purification of automobile exhaust gas is a catalyst for purification of automobile exhaust gas in which a second dispersion of rhodium which is determined on the basis of a second amount of CO adsorbed and the amount of the rhodium supported is 20 to 50%, the second amount of CO adsorbed being measured by a low-temperature CO pulse measurement method under a temperature condition of $-78°$ C.

* * * * *